(12) United States Patent
Black et al.

(10) Patent No.: US 12,139,435 B2
(45) Date of Patent: *Nov. 12, 2024

(54) STRENGTHENED GLASS ARTICLES EXHIBITING IMPROVED HEADFORM IMPACT PERFORMANCE AND AUTOMOTIVE INTERIOR SYSTEMS INCORPORATING THE SAME

(71) Applicant: Corning Incorporated, Corning, NY (US)

(72) Inventors: Matthew Lee Black, Naples, NY (US); Timothy Michael Gross, Painted Post, NY (US); Khaled Layouni, Fontainebleau (FR)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,588

(22) Filed: Aug. 10, 2023

(65) Prior Publication Data

US 2023/0391665 A1 Dec. 7, 2023

Related U.S. Application Data

(60) Continuation of application No. 17/127,175, filed on Dec. 18, 2020, now Pat. No. 11,767,257, which is a (Continued)

(51) Int. Cl.
*C03C 21/00* (2006.01)
*B60K 37/02* (2006.01)
(Continued)

(52) U.S. Cl.
CPC ............ *C03C 21/002* (2013.01); *C03C 27/10* (2013.01); *B60K 35/60* (2024.01); *C03C 2204/00* (2013.01); *G06F 3/041* (2013.01)

(58) Field of Classification Search
None
See application file for complete search history.

(56) References Cited

U.S. PATENT DOCUMENTS

| | | | |
|---|---|---|---|
| 4,455,338 A | 6/1984 | Henne | |
| 4,899,507 A | 2/1990 | Mairlot | |

(Continued)

FOREIGN PATENT DOCUMENTS

| | | |
|---|---|---|
| CN | 102566841 A | 7/2012 |
| CN | 203825589 U | 9/2014 |

(Continued)

OTHER PUBLICATIONS

International Search Report and Written Opinion of the European International Searching Authority; PCT/US2019/056939; Mailed Mar. 10, 2020; 14 pgs.

(Continued)

*Primary Examiner* — David Sample
(74) *Attorney, Agent, or Firm* — William M. Johnson; Payal A. Patel; Frank Brock Riggs

(57) ABSTRACT

Embodiments of this disclosure pertain to glass articles that comprise a maximum CS magnitude ($CS_{max}$) of about 900 MPa or greater, a CS magnitude of 750 MPa or greater at a depth of about 5 micrometers, and a maximum CT magnitude ($CT_{max}$) disposed at a depth from the first major surface in a range from about $0.25t$ to about $0.75t$. Embodiments of a curved glass article are also disclosed. In one or more embodiments, such curved glass articles include the first major concave surface comprising a maximum radius of curvature of about 100 mm or greater and a first maximum CS value ($CS_{max1}$) of greater than about 800 MPa, a second major convex surface comprising a second maximum CS value (CSmax2), wherein the $CS_{max2}$ is less than $CS_{max1}$. Embodiments of an automotive interior system including (Continued)

such curved glass articles and methods of making glass articles are also disclosed.

20 Claims, 34 Drawing Sheets

Related U.S. Application Data division of application No. 16/656,914, filed on Oct. 18, 2019, now Pat. No. 10,906,837.

(60) Provisional application No. 62/788,327, filed on Jan. 4, 2019, provisional application No. 62/747,361, filed on Oct. 18, 2018.

(51) Int. Cl.
  *C03C 27/10* (2006.01)
  *G06F 3/041* (2006.01)
  *B60K 35/60* (2024.01)

(56) References Cited

U.S. PATENT DOCUMENTS

| | | | |
|---|---|---|---|
| 4,985,099 A | 1/1991 | Mertens et al. | |
| 6,086,983 A | 7/2000 | Yoshizawa | |
| 6,332,690 B1 | 12/2001 | Murofushi | |
| 6,582,799 B1 | 6/2003 | Brown et al. | |
| 7,375,782 B2 | 5/2008 | Yamazaki et al. | |
| 8,344,369 B2 | 1/2013 | Yamazaki et al. | |
| 8,549,885 B2 | 10/2013 | Dannoux et al. | |
| 8,833,106 B2 | 9/2014 | Dannoux et al. | |
| 8,854,623 B2 | 10/2014 | Fontaine et al. | |
| 8,912,447 B2 | 12/2014 | Leong et al. | |
| 9,061,934 B2 | 6/2015 | Bisson et al. | |
| 9,593,042 B2 | 3/2017 | Hu et al. | |
| 9,802,485 B2 | 10/2017 | Masuda et al. | |
| 9,895,975 B2 | 2/2018 | Lee et al. | |
| 9,902,640 B2 | 2/2018 | Dannoux et al. | |
| 9,931,817 B2 | 4/2018 | Rickerl | |
| 10,071,933 B2 | 9/2018 | Wang et al. | |
| 10,131,118 B2 | 11/2018 | Kang et al. | |
| 10,906,837 B2 * | 2/2021 | Black | C03C 21/002 |
| 11,767,257 B2 * | 9/2023 | Black | C03C 27/10 |
| | | | 428/410 |
| 2007/0223121 A1 | 9/2007 | Franck et al. | |
| 2009/0179840 A1 | 7/2009 | Tanaka et al. | |
| 2009/0185127 A1 | 7/2009 | Tanaka et al. | |
| 2010/0031590 A1 | 2/2010 | Buchwald et al. | |
| 2011/0102346 A1 | 5/2011 | Orsley et al. | |
| 2012/0202030 A1 | 8/2012 | Kondo et al. | |
| 2013/0088441 A1 | 4/2013 | Chung et al. | |
| 2014/0220327 A1 | 8/2014 | Adib et al. | |
| 2015/0210588 A1 | 7/2015 | Chang et al. | |
| 2015/0239776 A1 | 8/2015 | Amin et al. | |
| 2015/0246507 A1 | 9/2015 | Brown et al. | |
| 2015/0329413 A1 | 11/2015 | Beall et al. | |
| 2016/0102011 A1 | 4/2016 | Hu et al. | |
| 2016/0122240 A1 | 5/2016 | Oram et al. | |
| 2016/0214889 A1 | 7/2016 | Garner et al. | |
| 2016/0297176 A1 | 10/2016 | Rickerl | |
| 2016/0306451 A1 | 10/2016 | Isoda et al. | |
| 2016/0373187 A1 | 12/2016 | Oda et al. | |
| 2016/0375808 A1 | 12/2016 | Etienne et al. | |
| 2017/0008377 A1 | 1/2017 | Fisher et al. | |
| 2017/0021661 A1 | 1/2017 | Pelucchi | |
| 2017/0022092 A1 | 1/2017 | Demartino et al. | |
| 2017/0197876 A1 | 7/2017 | Oram et al. | |
| 2017/0220927 A1 | 8/2017 | Takigawa et al. | |
| 2017/0247291 A1 | 8/2017 | Hatano et al. | |
| 2017/0327402 A1 | 11/2017 | Fujii et al. | |
| 2017/0349473 A1 | 12/2017 | Moriya et al. | |
| 2018/0050948 A1 | 2/2018 | Faik et al. | |
| 2018/0065881 A1 | 3/2018 | Hashimoto et al. | |
| 2018/0079680 A1 | 3/2018 | Akiba et al. | |
| 2018/0105461 A1 | 4/2018 | Schneider | |
| 2018/0111569 A1 | 4/2018 | Faik et al. | |
| 2018/0147985 A1 | 5/2018 | Brown et al. | |
| 2018/0149777 A1 | 5/2018 | Brown | |
| 2018/0149907 A1 | 5/2018 | Gahagan et al. | |
| 2018/0188869 A1 | 7/2018 | Boggs et al. | |
| 2018/0188870 A1 | 7/2018 | Boggs et al. | |
| 2018/0210118 A1 | 7/2018 | Gollier et al. | |
| 2018/0245125 A1 | 8/2018 | Tsai et al. | |
| 2018/0251400 A1 | 9/2018 | Bookbinder et al. | |
| 2018/0297892 A1 | 10/2018 | Lee et al. | |
| 2019/0011954 A1 | 1/2019 | Chu et al. | |
| 2019/0077262 A1 | 3/2019 | Benjamin et al. | |
| 2019/0330103 A1 | 10/2019 | Ozeki et al. | |
| 2019/0375673 A1 | 12/2019 | Hashimoto et al. | |
| 2020/0023738 A1 * | 1/2020 | Black | H05K 5/03 |
| 2020/0156993 A1 | 5/2020 | Kinoshita et al. | |

FOREIGN PATENT DOCUMENTS

| | | |
|---|---|---|
| CN | 104679341 A | 6/2015 |
| CN | 204463066 U | 7/2015 |
| CN | 104843976 A | 8/2015 |
| CN | 105511127 A | 4/2016 |
| CN | 108779025 A | 11/2018 |
| DE | 4415878 A1 | 11/1995 |
| DE | 102004022008 A1 | 12/2004 |
| DE | 102013214108 A1 | 2/2015 |
| FR | 2918411 A1 | 1/2009 |
| GB | 2011316 A | 7/1979 |
| JP | 03-059337 U | 6/1991 |
| JP | 2015-092422 A | 5/2015 |
| JP | 2015-178454 A | 10/2015 |
| JP | 2016-031696 A | 3/2016 |
| JP | 5976561 B2 | 8/2016 |
| JP | 2016-173794 A | 9/2016 |
| JP | 2016-203609 A | 12/2016 |
| JP | 2017-515779 A | 6/2017 |
| TW | 201704030 A | 2/2017 |
| TW | 201908265 A | 3/2019 |
| WO | 98/01649 A1 | 1/1998 |
| WO | 2007/108861 A1 | 9/2007 |
| WO | 2012/058084 A2 | 5/2012 |
| WO | 2015/031594 A2 | 3/2015 |
| WO | 2016/010050 A1 | 1/2016 |
| WO | 2016/044360 A1 | 3/2016 |
| WO | 2016/196531 A1 | 12/2016 |
| WO | 2016/196546 A1 | 12/2016 |
| WO | 2017/155932 A1 | 9/2017 |
| WO | 2017/205605 A1 | 11/2017 |
| WO | 2018/005646 A1 | 1/2018 |
| WO | 2018/009504 A1 | 1/2018 |
| WO | 2018/075853 A1 | 4/2018 |
| WO | 2018/081068 A1 | 5/2018 |
| WO | 2018/125683 A1 | 7/2018 |
| WO | 2018/186402 A1 | 10/2018 |
| WO | 2018/200807 A1 | 11/2018 |
| WO | 2019/021930 A1 | 1/2019 |
| WO | 2020/112432 A1 | 6/2020 |

OTHER PUBLICATIONS

International Search Report and Written Opinion of the International Searching Authority; PCT/US2019/056933; Mailed Jun. 4, 2020; 20 Pages; European Patent Office.

Invitation To Pay Additional Search Fees of the European International Searching Authority; PCT/US2019/056933; Mailed Mar. 10, 2020; 15 pgs.

Japanese Patent Application No. 2020-521042, office action dated Nov. 30, 2022, 2 pages, Japanese Patent Office.

Taiwanese Patent Application No. 108137622, Office Action dated Jun. 7, 2023, 3 pages (English Translation Only); Taiwanese Patent Office.

Chinese Patent Application No. 202211409887.0, Office Action

(56) References Cited

OTHER PUBLICATIONS dated Mar. 7, 2024, 4 pages (English Translation only), Chinese Patent Office.

* cited by examiner

STRENGTHENED GLASS ARTICLES EXHIBITING IMPROVED HEADFORM IMPACT PERFORMANCE AND AUTOMOTIVE INTERIOR SYSTEMS INCORPORATING THE SAME

CROSS-REFERENCE TO RELATED APPLICATIONS

This application is a continuation application and claims the benefit of priority under USC § 120 of U.S. patent application Ser. No. 17/127,175 filed on Dec. 18, 2020, which is a divisional application and claims the benefit of priority under 35 U.S.C. § 120 of U.S. patent application Ser. No. 16/656,914, filed Oct. 18, 2019, now patent U.S. Ser. No. 10/906,837, granted Feb. 2, 2021, which claims the benefit of priority under 35 U.S.C. § 119 of U.S. Provisional Application Ser. No. 62/788,327 filed on Jan. 4, 2019, and U.S. Provisional Application Ser. No. 62/747,361 filed on Oct. 18, 2018, the contents of which are relied upon and incorporated herein by reference in their entirety.

BACKGROUND

The disclosure relates to strengthened glass articles exhibiting improved headform impact performance and automotive interior systems incorporating such articles, and more particularly to strengthened glass articles having a stress profile that results in improved headform impact performance when used in automotive interior systems.

Automotive interiors systems can include curved surfaces that incorporate displays and/or touch panel. The materials used to form cover glass for such curved surfaces are typically limited to polymers, which do not exhibit the durability and optical performance of glass. As such, curved glass articles are desirable, especially when used as covers for displays and/or touch panels. In addition, automotive interiors systems typically need to rigorous headform impact test requirements. In some instances, the curved glass articles used in the automotive interiors systems should not break after being impacted in the headform impact test. Accordingly, there is a need for glass articles with properties that result in automotive interior systems exhibiting improved headform impact performance, automotive interior systems that incorporate such glass articles and methods for forming such glass articles.

SUMMARY

A first aspect of this disclosure pertains to a glass article comprising: a first major surface, a second major surface opposing the first major surface, a minor surface connecting the first major surface and the second major surface defining a thickness (t) (millimeters); a compressive stress (CS) region extending from the first major surface to a depth of compression (DOC), the CS region comprising a maximum CS magnitude ($CS_{max}$) of about 900 MPa or greater and a CS magnitude of 750 MPa or greater are a depth of about 5 micrometers; and a central tension (CT) region having a maximum CT magnitude ($CT_{max}$) disposed at a depth from the first major surface in a range from about 0.25t to about 0.75t, wherein the CS region and the CT region define a stress profile along the thickness. In one or more embodiments, the $CT_{max}$ magnitude is about 80 MPa or less.

A second aspect of this disclosure pertains to a curved glass article comprising a first major concave surface, a second major convex surface opposing the first major concave surface, a minor surface connecting the first major concave surface and the second major convex surface defining a thickness (t) (millimeters); the first major concave surface comprising a maximum radius of curvature of about 20 mm or greater or about 100 mm or greater and a first compressive stress (CS) region extending from the first major concave surface to a first depth of compressive stress ($DOC_1$), the first CS region having a first maximum CS value ($CS_{max1}$) of greater than about 800 MPa; the second major convex surface comprising a second CS region extending from the second major convex surface to a second depth of compressive stress ($DOC_2$), the second CS region having a second maximum CS value (CSmax2); a central tension (CT) region disposed between the first CS region and the second CS region having a maximum CT value ($CT_{curved\text{-}max}$), wherein the CS region and the CT region define a stress profile along the thickness; wherein the CSmax2 is less than $CS_{max1}$. In one or more embodiments, $DOC_1$ differs from $DOC_2$.

A third aspect of this disclosure pertains to an automotive interior system comprising: a base; and a glass article according to one or more embodiments of the first aspect or second aspect disposed on the base, and wherein, when an impactor having a mass of 6.8 kg impacts the first major surface at an impact velocity of 5.35 m/s to 6.69 m/s, the deceleration of the impactor is 120 g (g-force) or less. In one or more embodiments, the deceleration of the impactor is not greater than 80 g for any 3 ms interval over a time of impact. In one or more embodiments, when the impactor breaks the glass article, the glass article ejects particles having a maximum dimension of 1 mm or less at 10 mm or less for the glass article.

A fourth aspect of this disclosure pertains to an automotive interior system comprising: a base; and a glass article according to one or more embodiments of the first aspect disposed on the base, and wherein, when an impactor having a mass of 6.8 kg impacts the first major surface at an impact velocity of 5.35 m/s to 6.69 m/s, the glass article is elastically deformed.

A fifth aspect of this disclosure pertains to an automotive interior system comprising: a frame; and a glass article according to one or more embodiments of the second aspect disposed on the frame, wherein, when an impactor having a mass of 6.8 kg impacts the first major surface at an impact velocity of 5.35 m/s to 6.69 m/s, the glass article is elastically deformed.

A sixth aspect of this disclosure pertains to a method for forming a glass article comprising: strengthening a glass sheet having a first major surface, a second major surface, and a minor surface connecting the first major surface and the second major surface defining a thickness (t) to provide a first strengthened glass article according to one or more embodiments of the first aspect.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
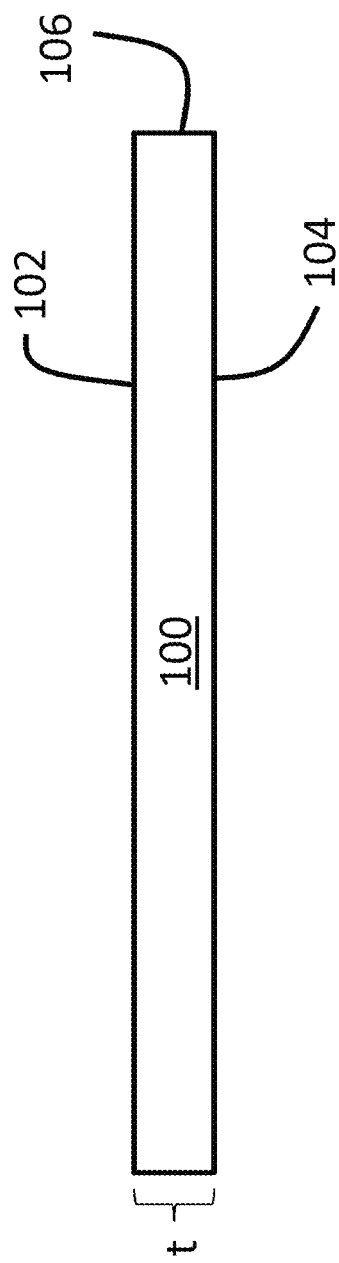
FIG. 1 is a side view of a glass article according to one or more embodiments.

Reference will now be made in detail to various embodiments, examples of which are illustrated in the accompanying drawings.

As used herein, the term "glass article" is used in its broadest sense to include any object made wholly or partly of glass. Glass articles include laminates of glass and non-glass materials, laminates of glass and crystalline materials, and glass-ceramics (which include an amorphous phase and a crystalline phase). Unless otherwise specified, all glass compositions are expressed in terms of mole percent (mol %)on an oxide basis.

A "stress profile" is a plot of stress with respect to position of a glass article. A compressive stress (CS) region, where the glass article is under compressive stress, extends from a first surface to a depth of compression (DOC) of the article. A central tension region extends from the DOC into the central portion of the glass article and includes the region where the glass article is under tensile stress.

As used herein, depth of compression (DOC) refers to the depth at which the stress within the glass article changes from compressive to tensile stress. At the DOC, the stress crosses from a positive (compressive) stress to a negative (tensile) stress and thus exhibits a stress value of zero. According to the convention normally used in mechanical arts, compression is expressed as a negative (<0) stress and tension is expressed as a positive (>0) stress. Throughout this description, however, compressive stress (CS) and central tension (CT) is expressed as a positive or absolute value—i.e., as recited herein, CS=|CS| and CT=|CT|. Maximum central tension (maximum CT or CT max) refers to the maximum tensile stress in the central tension region. Maximum compressive stress (maximum CS or $CT_{max}$) refers to the maximum CS stress in the CS region.

A "knee" of a stress profile is a depth of a glass article where the slope of the stress profile transitions from steep to gradual. The knee may refer to a transition area over a span of depths where the slope is changing.

As used herein, the terms "depth of exchange", "depth of layer" (DOL), "chemical depth of layer", and "depth of chemical layer" may be used interchangeably, describing in general the depth at which ion exchange facilitated by an ion exchange process (IOX) takes place for a particular ion. DOL refers to the depth within a glass article (i.e., the distance from a surface of the glass article to its interior region) at which an ion of a metal oxide or alkali metal oxide (e.g., the metal ion or alkali metal ion) diffuses into the glass article where the concentration of the ion reaches a minimum value, as determined by Glow Discharge-Optical Emission Spectroscopy (GD-OES)). In some embodiments, the DOL is given as the depth of exchange of the slowest-diffusing or largest ion introduced by an ion exchange (IOX) process.

Unless otherwise specified, CT and CS are expressed herein in megaPascals (MPa), thickness is express in millimeters and DOC and DOL are expressed in microns (micrometers).

CS at the surface is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

The maximum CT value is measured using a scattered light polariscope (SCALP) technique known in the art.

DOC may be measured by FSM or SCALP depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth (or DOL) of potassium ions in such glass articles is measured by FSM.

Refracted near-field (RNF) method may also be used to measure attributes of the stress profile. When the RNF method is utilized, the maximum CT value provided by SCALP is utilized. In particular, the stress profile measured by the RNF method is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Aspects of this disclosure pertains to a glass article that are suitable for use as cover glass in automotive interiors systems. The phrase "automotive interiors" includes the interiors of trains, automobiles (e.g., cars, trucks, buses and the like), seacraft (boats, ships, submarines, and the like), and aircraft (e.g., drones, airplanes, jets, helicopters and the like). In one or more embodiments, the glass articles may be used in a curved configuration.

Figure 4:
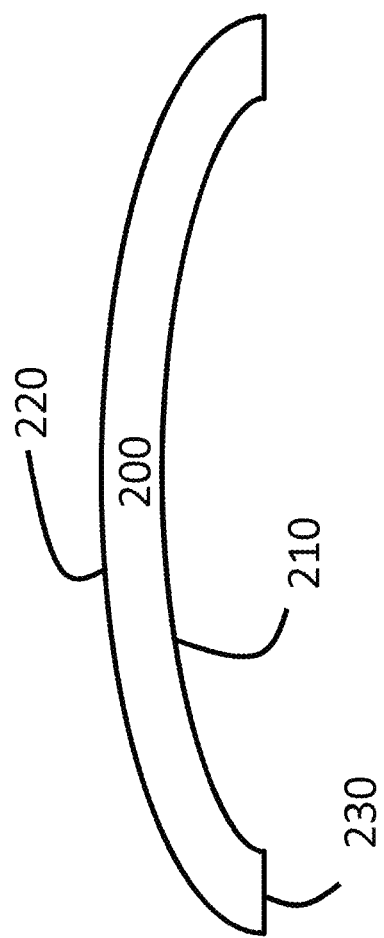
FIG. 4 is a side view of a curved glass article according to one or more embodiments.

The glass articles may be curved into a curved shape or configuration using hot forming methods known in the art or may be cold-bent. As used herein, the terms "cold-bent," or "cold-bending" refers to curving the glass article at a cold-bend temperature which is less than the softening point of the glass. Often, the cold-bend temperature is room temperature. The term "cold-bendable" refers to the capability of a glass article to be cold-bent. A feature of a cold-bent glass article is asymmetric surface compressive stress between the first major surface 210 and the second major surface 220 (as shown in FIG. 4). In one or more embodiments, prior to the cold-bending process or being cold-bent, the respective compressive stresses in the first major surface 210 and the second major surface 220 of the glass article are substantially equal. In one or more embodiments in which the glass article is unstrengthened, the first major surface 210 and the second major surface 220 exhibit no appreciable compressive stress, prior to cold-bending. In one or more embodiments in which the glass article is strengthened (as described herein), the first major surface 210 and the second major surface 220 exhibit substantially equal compressive stress with respect to one another, prior to cold-bending. In one or more embodiments, after cold-bending, the CS on the surface having a concave shape after cold-bending (e.g., first major surface 210) increases, while the CS on the surface having a convex shape after cold-bending (e.g., the second major surface 220) decreases. In other words, the compressive stress on the concave surface (e.g., first major surface 210) is greater after cold-bending than before cold-bending. Without being bound by theory, the cold-bending process increases the compressive stress of the glass article being shaped to compensate for tensile stresses imparted during cold-bending. In one or more embodiments, the cold-bending process causes the concave surface (second major surface 220) to experience compressive stresses, while the surface forming a convex shape (i.e., the second major surface 220 in FIG. 4) after cold-bending experiences tensile stresses. The tensile stress experienced by the convex (i.e., the second major surface 220 following cold-bending results in a net decrease in surface compressive stress, such that the compressive stress in convex surface (i.e., the second major surface 220) of a strengthened glass article following cold-bending is less than the compressive stress on the same surface (i.e., second major surface 220) when the glass article is flat.

As used herein, thickness (t) as used herein refers to the maximum thickness of the glass article.

In known glass articles, a stress profile may be generated by a chemical strengthening processes and can have an error function profile shape. In such known glass articles, the CT region includes a maximum central tension magnitude that, when the glass article is curved, causes the automotive interior system to exhibit poor headform impact performance. In addition, such known glass articles tend break in the headform impact tests.

In some instances, the known glass articles are cold-bent to have a curved shape and such cold-bending causes the maximum CT magnitude to increase to unacceptably high value, when the CT generated from strengthening is superimposed on the cold-bend induced stresses.

Aspects of this disclosure pertain to strengthened glass articles that have stress profiles that, when cold-bent, result in a significantly lower maximum central tension magnitude than known glass articles with typical complementary error function stress profiles.

The maximum bend induced stress is given by Equation (1):

$$\sigma_{max}=(E/1-v^2)*(t/2)*(1/R), \quad \text{Equation (1)}$$

where E is Young's modulus, v is Poisson's ratio, t is thickness, and R is bend radius.

The stress through the thickness of a glass article is given by Equation (2):

$$\sigma=\sigma_{max}-(\sigma_{max}/(t/2)) \quad \text{Equation (2)}$$

This expression shows that the tensile stress is greatest on the surface and decreases linearly to the center of the glass. When the cold-bending a strengthened glass article, this bend induced stress is superimposed with the stress profile imparted from strengthening (e.g., by chemical strengthening processes, such as ion exchange). If the magnitude of the maximum CT from the strengthening is near or closer to a major surface (as it is with complementary error function profiles), the resultant magnitude of the maximum CT following cold-bending becomes very high since the bend induced tension is also greatest near the major surface.

As will be described in terms of the various embodiments of the glass article described herein, if the magnitude of the maximum CT from strengthening is positioned toward center of the glass article, the resultant magnitude of the maximum CT following cold-bending is substantially lower. Such curved glass articles exhibit superior headform impact performance. In particular, maintaining the magnitude of the maximum CT of such curved glass articles to a lower value reduces or prevents fragmentation behavior of the glass article at failure, and results in improved headform impact performance.

A first aspect of this disclosure pertains to a glass article 100 that includes a first major surface 102, a second major surface 104 opposing the first major surface, a minor surface 106 connecting the first major surface and the second major surface defining a thickness (t) (millimeters), as illustrated in FIG. 1. In one or more embodiments, the glass article is in a substantially flat configuration (e.g., having a radius of curvature of about 5000 mm or greater) or a permanently curved configuration. In one or more embodiments, the glass article 100 may be cold-bent into a curved configuration.

Figure 2:
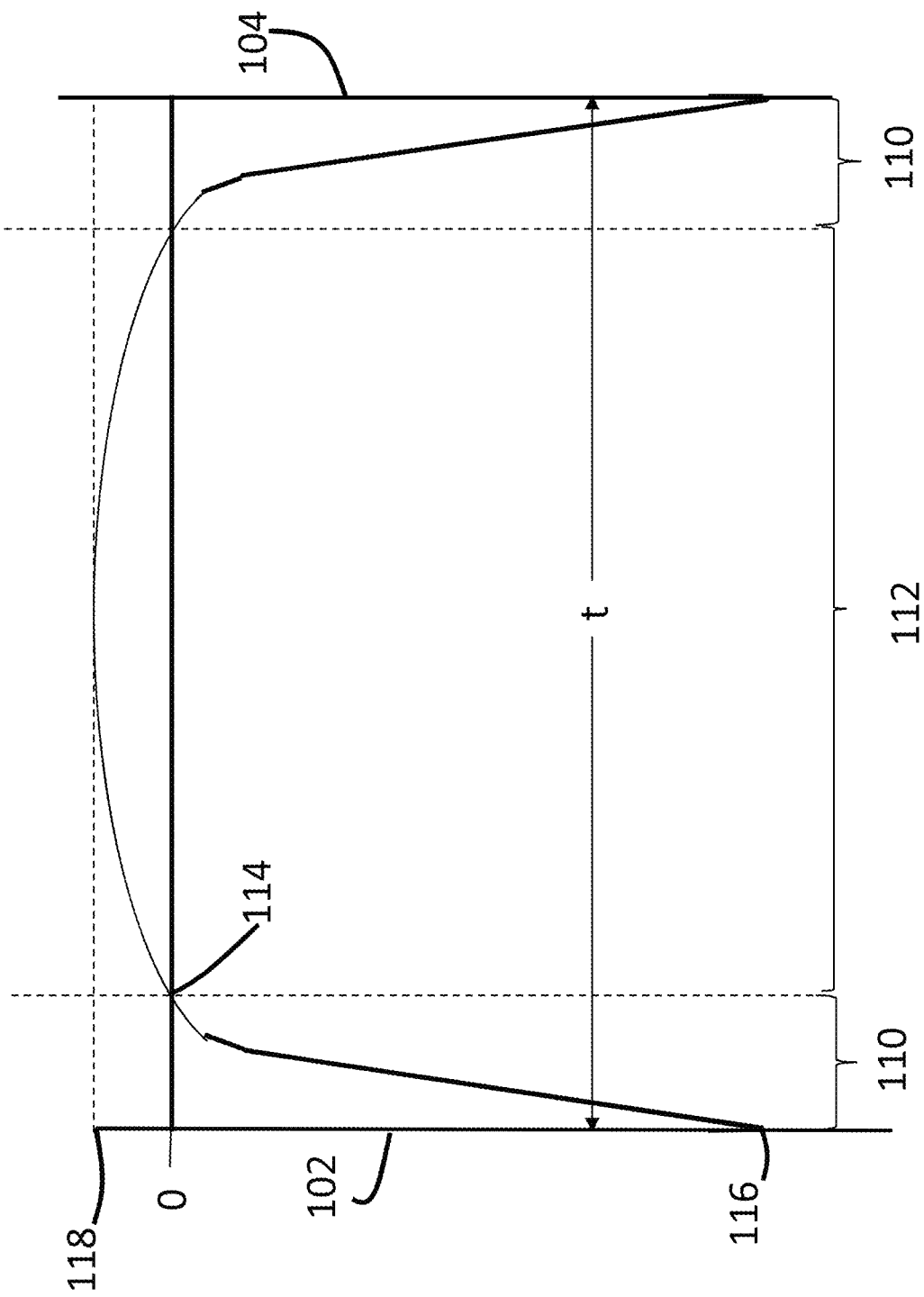
FIG. 2 is an exemplary stress profile of the glass article shown in FIG. 1.

As illustrated in FIG. 2, the glass article has a CS region 110, extending from the first major surface 102 to a first depth of compression (DOC1) 114. The CS region includes a maximum CS magnitude ($CS_{max}$) 116. The glass article has a CT region 112 disposed in the central region. In the embodiment shown, the CT region extends from the DOC to an opposing CS region 110. The CT region defines a maximum CT magnitude ($CT_{max}$) 118. The CS region and the CT region define a stress profile that extends along the thickness of the glass article.

In one or more embodiments, the glass article may be strengthened mechanically by utilizing a mismatch of the coefficient of thermal expansion between portions of the article to create a compressive stress region and a central region exhibiting a tensile stress. In some embodiments, the glass article may be strengthened thermally by heating the glass to a temperature above the glass transition point and then rapidly quenching.

In one or more embodiments, the glass article may be chemically strengthening by ion exchange. In the ion exchange process, ions at or near the surface of the glass article are replaced by—or exchanged with—larger ions having the same valence or oxidation state. In those embodiments in which the glass article comprises an alkali aluminosilicate glass, ions in the surface layer of the article and the larger ions are monovalent alkali metal cations, such as Li+, Na+, K+, Rb+, and Cs+. Alternatively, monovalent cations in the surface layer may be replaced with monovalent cations other than alkali metal cations, such as Ag+ or the like. In such embodiments, the monovalent ions (or cations) exchanged into the glass article generate a stress.

Ion exchange processes are typically carried out by immersing a glass article in one or more molten salt baths containing the larger ions to be exchanged with the smaller ions in the glass article. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass article in a salt bath (or baths), use of multiple salt baths, additional steps such as annealing, washing, and the like, are generally determined by the composition of the glass article (including the structure of the article and any crystalline phases present) and the desired CS, DOC and CT values of the glass article that results from strengthening. Exemplary molten bath composition may include nitrates, sulfates, and chlorides of the larger alkali metal ion. Typical nitrates include KNO3, NaNO3, LiNO3, NaSO4 and combinations thereof. The temperature of the molten salt bath typically is in a range from about 380° C. up to about 450° C., while immersion times range from about 15 minutes up to about 100 hours depending on glass article thickness, bath temperature and glass (or monovalent ion) diffusivity. However, temperatures and immersion times different from those described above may also be used.

In one or more embodiments, the glass articles may be immersed in a molten salt bath of 100% NaNO3, 100% KNO3, or a combination of NaNO3 and KNO3 having a temperature from about 370° C. to about 480° C. In some embodiments, the glass article may be immersed in a molten mixed salt bath including from about 1% to about 99% KNO3 and from about 1% to about 99% NaNO3. In one or more embodiments, the glass article may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass article may be immersed in a molten, mixed salt bath including NaNO3 and KNO3 (e.g., 49%/51%, 50%/50%, 51%/49%) having a temperature less than about 420° C. (e.g., about 400° C. or about 380° C.). for less than about 5 hours, or even about 4 hours or less. In one or more embodiments, the glass article is immersed in a first mixed molten salt bath (e.g., 75% KNO3/25% NaNO3) having a temperature of 430° C. for 8 hours, and then immersed in a second pure molten salt bath of KNO3 having a lower temperature than the first mixed molten salt bath for a shorter duration (e.g., about 4 hours).

Ion exchange conditions can be tailored to provide a "spike" or to increase the slope of the stress profile at or near the surface of the resulting glass article. The spike may result in a greater surface CS value. This spike can be achieved by single bath or multiple baths, with the bath(s) having a single composition or mixed composition, due to the unique properties of the glass compositions used in the glass articles described herein.

In one or more embodiments, where more than one monovalent ion is exchanged into the glass article, the different monovalent ions may exchange to different depths within the glass article (and generate different magnitudes stresses within the glass article at different depths). The resulting relative depths of the stress-generating ions can be determined and cause different characteristics of the stress profile.

In one or more embodiments, the glass article has a CSmax that is about 900 MPa or greater, about 920 MPa or greater, about 940 MPa or greater, about 950 MPa or greater, about 960 MPa or greater, about 980 MPa or greater, about 1000 MPa or greater, about 1020 MPa or greater, about 1040 MPa or greater, about 1050 MPa or greater, about 1060 MPa or greater, about 1080 MPa or greater, about 1100 MPa or greater, about 1120 MPa or greater, about 1140 MPa or greater, about 1150 MPa or greater, about 1160 MPa or greater, about 1180 MPa or greater, about 1200 MPa or greater, about 1220 MPa or greater, about 1240 MPa or greater, about 1250 MPa or greater, about 1260 MPa or greater, about 1280 MPa or greater, or about 1300 MPa or greater. In one or more embodiments, the CSmax is in a range from about 900 MPa to about 1500 MPa, from about 920 MPa to about 1500 MPa, from about 940 MPa to about 1500 MPa, from about 950 MPa to about 1500 MPa, from about 960 MPa to about 1500 MPa, from about 980 MPa to about 1500 MPa, from about 1000 MPa to about 1500 MPa, from about 1020 MPa to about 1500 MPa, from about 1040 MPa to about 1500 MPa, from about 1050 MPa to about 1500 MPa, from about 1060 MPa to about 1500 MPa, from about 1080 MPa to about 1500 MPa, from about 1100 MPa to about 1500 MPa, from about 1120 MPa to about 1500 MPa, from about 1140 MPa to about 1500 MPa, from about 1150 MPa to about 1500 MPa, from about 1160 MPa to about 1500 MPa, from about 1180 MPa to about 1500 MPa, from about 1200 MPa to about 1500 MPa, from about 1220 MPa to about 1500 MPa, from about 1240 MPa to about 1500 MPa, from about 1250 MPa to about 1500 MPa, from about 1260 MPa to about 1500 MPa, from about 1280 MPa to about 1500 MPa, from about 1300 MPa to about 1500 MPa, from about 900 MPa to about 1480 MPa, from about 900 MPa to about 1460 MPa, from about 900 MPa to about 1450 MPa, from about 900 MPa to about 1440 MPa, from about 900 MPa to about 1420 MPa, from about 900 MPa to about 1400 MPa, from about 900 MPa to about 1380 MPa, from about 900 MPa to about 1360 MPa, from about 900 MPa to about 1350 MPa, from about 900 MPa to about 1340 MPa, from about 900 MPa to about 1320 MPa, from about 900 MPa to about 1300 MPa, from about 900 MPa to about 1280 MPa, from about 900 MPa to about 1260 MPa, from about 900 MPa to about 1250 MPa, from about 900 MPa to about 1240 MPa, from about 900 MPa to about 1220 MPa, from about 900 MPa to about 1210 MPa, from about 900 MPa to about 1200 MPa, from about 900 MPa to about 1180 MPa, from about 900 MPa to about 1160 MPa, from about 900 MPa to about 1150 MPa, from about 900 MPa to about 1140 MPa, from about 900 MPa to about 1120 MPa, from about 900 MPa to about 1100 MPa, from about 900 MPa to about 1080 MPa, from about 900 MPa to about 1060 MPa, from about 900 MPa to about 1050 MPa, or from about 950 MPa to about 1050 MPa, or from about 1000 MPa to about 1050 MPa. CSmax may be measured at a major surface or may be found at a depth from the major surface within the CS region.

In one or more embodiments, the glass article has a stress profile with a CS magnitude of 700 MPa or greater, or about 750 MPa or greater at a depth within the glass article of about micrometers from the first major surface 102 ($CS_5$). In one or more embodiments, the $CS_5$ is about 760 MPa or greater, about 770 MPa or greater, about 775 MPa or greater, about 780 MPa or greater, about 790 MPa or greater, about 800 MPa or greater, about 810 MPa or greater, about 820 MPa or greater, about 825 MPa or greater, or about 830 MPa or greater. In one or more embodiments, the $CS_5$ is in a range from about 700 MPa to about 900 MPa, from about 725 MPa to about 900 MPa, from about 750 MPa to about 900 MPa, from about 775 MPa to about 900 MPa, from about 800 MPa to about 900 MPa, from about 825 MPa to about 900 MPa, from about 850 MPa to about 900 MPa, from about 700 MPa to about 875 MPa, from about 700 MPa to about 850 MPa, from about 700 MPa to about 825 MPa, from about 700 MPa to about 800 MPa, from about 700 MPa to about 775 MPa, from about 750 to about 800 MPa, from about 750 MPa to about 850 MPa, or from about 700 MPa to about 750 MPa.

In one or more embodiments, the glass article has a stress profile with a CS magnitude of 800 MPa or greater at a depth within the glass article of about 10 micrometers from the first major surface 102 ($CS_{10}$). In one or more embodiments, the $CS_{10}$ is about 810 MPa or greater, about 820 MPa or greater, about 830 MPa or greater, about 840 MPa or greater, about 850 MPa or greater, about 860 MPa or greater, about 870 MPa or greater, about 880 MPa or greater, about 890 MPa or greater, or about 900 MPa or greater. In one or more embodiments, the $CS_{10}$ is in a range from about 800 MPa to about 1000 MPa, from about 825 MPa to about 1000 MPa, from about 850 MPa to about 1000 MPa, from about 875 MPa to about 1000 MPa, from about 900 MPa to about 1000 MPa, from about 925 MPa to about 1000 MPa, from about 950 MPa to about 1000 MPa, from about 800 MPa to about 975 MPa, from about 800 MPa to about 950 MPa, from about 800 MPa to about 925 MPa, from about 800 MPa to about 900 MPa, from about 800 MPa to about 875 MPa, or from about 800 MPa to about 850 MPa.

In one or more embodiments, the glass article has a stress profile with a $CT_{max}$ that is present or located at a depth within the glass article from the first major surface in a range from about 0.25t to about 0.75t. In one or more embodiments, $CT_{max}$ is present or located at a depth in a range from about 0.25t to about 0.74t, from about 0.25t to about 0.72t, from about to about 0.70t, from about 0.25t to about 0.68t, from about 0.25t to about 0.66t, from about 0.25t to about 0.65t, from about 0.25t to about 0.62t, from about 0.25t to about 0.60t, from about 0.25t to about 0.58t, from about 0.25t to about 0.56t, from about 0.25t to about from about 0.25t to about 0.54t, from about 0.25t to about 0.52t, from about 0.25t to about 0.50t, from about 0.26t to about 0.75t, from about 0.28t to about 0.75t, from about to about 0.75t, from about 0.32t to about 0.75t, from about 0.34t to about 0.75t, from about 0.35t to about 0.75t, from about 0.36t to about 0.75t, from about 0.38t to about 0.75t, from about 0.40t to about 0.75t, from about 0.42t to about 0.75t, from about 0.44t to about from about 0.45t to about 0.75t, from about 0.46t to about 0.75t, from about 0.48t to about 0.50t, from about 0.30t to about 0.70t, from about 0.35t to about 0.65t, from about 0.4t to about 0.6t, or from about 0.45t to about 0.55t. In one or more embodiments, the foregoing ranges for the location of CTmax is present when the glass article is in a substantially flat configuration (e.g., the glass article has a radius of curvature of greater than about 5000 mm, or greater than about 10,000 mm).

In one or more embodiments, the $CT_{max}$ magnitude is about 80 MPa or less, about 78 MPa or less, about 76 MPa or less, about 75 MPa or less, about 74 MPa or less, about 72 MPa or less, about 70 MPa or less, about 68 MPa or less, about 66 MPa or less, about 65 MPa or less, about 64 MPa or less, about 62 MPa or less, about 60 MPa or less, about 58 MPa or less, about 56 MPa or less, about 55 MPa or less, about 54 MPa or less, about 52 MPa or less, or about 50 MPa or less. In one or more embodiments, the $CT_{max}$ magnitude is in a range from about 40 MPa to about 80 MPa, from about 45 MPa to about 80 MPa, from about 50 MPa to about 80 MPa, from about 55 MPa to about 80 MPa, from about 60 MPa to about 80 MPa, from about 65 MPa to about 80 MPa, from about 70 MPa to about 80 MPa, from about 40 MPa to about 75 MPa, from about 40 MPa to about 70 MPa, from about 40 MPa to about 65 MPa, from about 40 MPa to about 60 MPa, from about 40 MPa to about 55 MPa, or from about 40 MPa to about 50 MPa. In one or more embodiments, the foregoing ranges the magnitude of CTmax is present when the glass article is in a substantially flat configuration (e.g., the glass article has a radius of curvature of greater than about 5000 mm, or greater than about 10,000 mm).

In one or more embodiments, a portion of the stress profile has a parabolic-like shape. In some embodiments, the stress profile is free of a flat stress (i.e., compressive or tensile) portion or a portion that exhibits a substantially constant stress (i.e., compressive or tensile). In some embodiments, the CT region exhibits a stress profile that is substantially free of a flat stress or free of a substantially constant stress. In one or more embodiments, the stress profile is substantially free of any linear segments that extend in a depth direction or along at least a portion of the thickness t of the glass article. In other words, the stress profile is substantially continuously increasing or decreasing along the thickness t. In some embodiments, the stress profile is substantially free of any linear segments in a depth direction having a length of about 10 micrometers or more, about 50 micrometers or more, or about 100 micrometers or more, or about 200 micrometers or more. As used herein, the term "linear" refers to a slope having a magnitude of less than about 5 MPa/micrometer, or less than about 2 MPa/micrometer along the linear segment. In some embodiments, one or more portions of the stress profile that are substantially free of any linear segments in a depth direction are present at depths within the glass article of about 5 micrometers or greater (e.g., 10 micrometers or greater, or 15 micrometers or greater) from either one or both the first surface or the second surface. For example, along a depth of about 0 micrometers to less than about 5 micrometers from the first surface, the stress profile may include linear segments, but from a depth of about 5 micrometers or greater from the first surface, the stress profile may be substantially free of linear segments.

In one or more embodiments, all points of the CT region within 0.1t, 0.15t, 0.2t, or from the depth of CTmax comprise a tangent having a non-zero slope. In one or more embodiments, all such points comprise a tangent having a slope that is greater than about 0.5 MPa/micrometer in magnitude, greater than about 0.75 MPa/micrometer in magnitude, greater than about 1 MPa/micrometer in magnitude, greater than about 1.5 MPa/micrometer in magnitude, or greater about 2 MPa/micrometer in magnitude than, or greater than about MPa/micrometer in magnitude.

In one or more embodiments, all points of the stress profile at a depth from about or greater (e.g., from about 0.12t to about 0.24t, from about 0.14t to about 0.24t, from about 0.15t to about 0.24t, from about 0.16t to about 0.24t, from about 0.18t to about 0.24t, from about 0.12t to about 0.22t, from about 0.12t to about 0.2t, from about 0.12t to about from about 0.12t to about 0.16t, from about 0.12t to about 0.15t, from about 0.12t to about 0.14t, or from about 0.15t to about 0.2t) comprise a tangent having a non-zero slope.

In one or more embodiments, the glass article may be described in terms of the shape of the stress profile along at least a portion of the CT region (112 in FIG. 2). For example, in some embodiments, the stress profile along a substantial portion or the entire CT region may be approximated by equation. In some embodiments, the stress profile along the CT region may be approximated by equation (3):

$$\text{Stress}(x) = CT\max - (((CT\max \cdot (n+1))/0.5^n) \cdot |(x/t) - 0.5|^n) \quad (3)$$

In equation (1), the stress (x) is the stress value at position x. Here the stress is positive (tension). CTmax is the maximum central tension as a positive value in MPa. The value x is position along the thickness (t) in micrometers, with a range from 0 to t; x=0 is one surface (102, in FIG. 2), x=0.5t is the center of the glass article, stress(x)=CTmax, and x=t is the opposite surface (104, in FIG. 2). CTmax used in equation (1) may be in the range from about 40 MPa to about 80 MPa, and n is a fitting parameter from 1.5 to 5 (e.g., 2 to 4, 2 to 3 or 1.8 to 2.2) whereby n=2 can provide a parabolic stress profile, exponents that deviate from n=2 provide stress profiles with near parabolic stress profiles.

In one or more embodiments, the DOC of the glass article is about 0.2t or less. For example, DOC may be about 0.18t or less, about 0.18t or less, about 0.16t or less, about 0.15t or less, about 0.14t or less, about 0.12t or less, about 0.1t or less, about 0.08t or less, about or less, about 0.05t or less, about 0.04t or less, or about 0.03t or less. In one or more embodiments, DOC is in a range from about 0.02t to about 0.2t, from about 0.04t to about from about 0.05t to about 0.2t, from about 0.06t to about 0.2t, from about 0.08t to about from about 0.1t to about 0.2t, from about 0.12t to about 0.2t, from about 0.14t to about from about 0.15t to about 0.2t, from about 0.16t to about 0.2t, from about 0.02t to about from about 0.02t to about 0.16t, from about 0.02t to about 0.15t, from about 0.02t to about 0.14t, from about 0.02t to about 0.12t, from about 0.02t to about 0.1t, from about 0.02t to about 0.08, from about 0.02t to about 0.06t, from about 0.02t to about 0.05t, from about to about 0.8t, from about 0.12t to about 0.16t, or from about 0.14t to about 0.17t.

Figure 3:
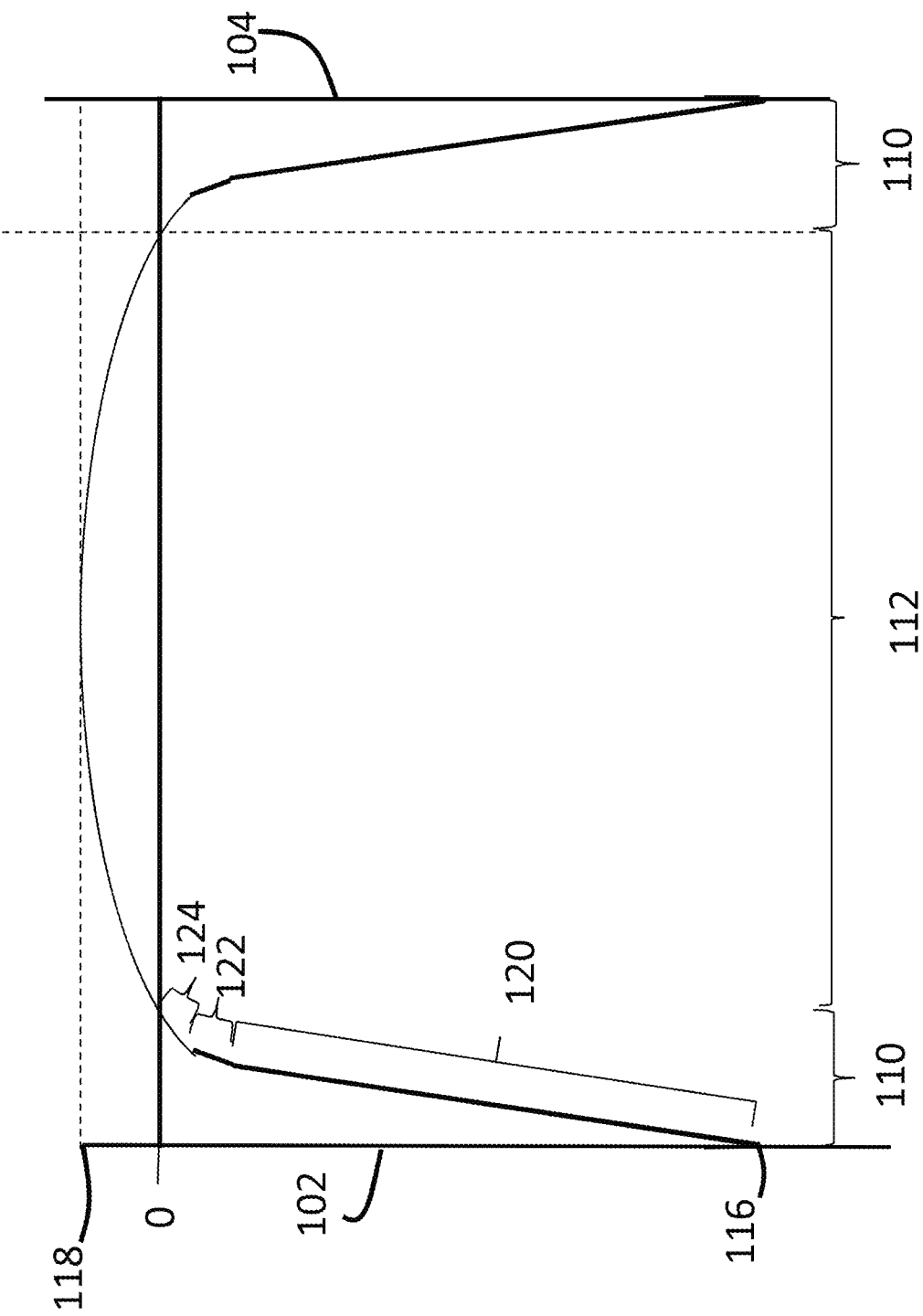
FIG. 3 is an exemplary stress profile of the glass article shown in FIG. 1.

In one or more embodiments, the glass article has a DOL that is in a range from about 10 micrometers to about 50 micrometers, from about 12 micrometers to about 50 micrometers, from about 14 micrometers to about 50 micrometers, from about 15 micrometers to about 50 micrometers, from about 16 micrometers to about 50 micrometers, from about 18 micrometers to about 50 micrometers, from about 20 micrometers to about 50 micrometers, from about 22 micrometers to about 50 micrometers, from about 24 micrometers to about 50 micrometers, from about 25 micrometers to about 50 micrometers, from about 26 micrometers to about 50 micrometers, from about 28 micrometers to about 50 micrometers, from about 30 micrometers to about 50 micrometers, from about 10 micrometers to about 48 micrometers, from about 10 micrometers to about 46 micrometers, from about 10 micrometers to about 45 micrometers, from about 10 micrometers to about 44 micrometers, from about 10 micrometers to about 42 micrometers, from about 10 micrometers to about 40 micrometers, from about 10 micrometers to about 38 micrometers, from about 10 micrometers to about 36 micrometers, from about 10 micrometers to about 35 micrometers, from about 10 micrometers to about 34 micrometers, from about 10 micrometers to about 32 micrometers, from about 10 micrometers to about 30 micrometers, from about 10 micrometers to about 28 micrometers, from about 10 micrometers to about 26 micrometers, from about 10 micrometers to about 25 micrometers, from about 20 micrometers to about 40 micrometers, from about 25 micrometers to about 40 micrometers, from about 20 micrometers to about 35 micrometers, or from about 25 micrometers to about micrometers. In one or more embodiments, at least a portion of the stress profile comprises a spike region 120 extending from the first major surface, a tail region 124 and a knee region 122 between the spike region and the tail region, as illustrated in FIG. 3. The spike region 120 is within the CS region of the stress profile. In one or more embodiments, wherein all points of the stress profile in the spike region comprise a tangent having a slope in magnitude that is in a range from about 15 MPa/micrometer to about 200 MPa/micrometer, from about 20 MPa/micrometer to about 200 MPa/micrometer, from about 25 MPa/micrometer to about 200 MPa/micrometer, from about 30 MPa/micrometer to about 200 MPa/micrometer, from about 35 MPa/micrometer to about 200 MPa/micrometer, from about MPa/micrometer to about 200 MPa/micrometer, from about 45 MPa/micrometer to about 200 MPa/micrometer, from about 100 MPa/micrometer to about 200 MPa/micrometer, from about 150 MPa/micrometer to about 200 MPa/micrometer, from about 15 MPa/micrometer to about 190 MPa/micrometer, from about 15 MPa/micrometer to about 180 MPa/micrometer, from about 15 MPa/micrometer to about 170 MPa/micrometer, from about 15 MPa/micrometer to about 160 MPa/micrometer, from about 15 MPa/micrometer to about 150 MPa/micrometer, from about 15 MPa/micrometer to about 140 MPa/micrometer, from about MPa/micrometer to about 130 MPa/micrometer, from about 15 MPa/micrometer to about 120 MPa/micrometer, from about 15 MPa/micrometer to about 100 MPa/micrometer, from about 15 MPa/micrometer to about 750 MPa/micrometer, from about 15 MPa/micrometer to about 50 MPa/micrometer, from about 50 MPa/micrometer to about 150 MPa/micrometer, or from about 75 MPa/micrometer to about 125 MPa/micrometer.

In one or more embodiments, and all points in the tail region comprise a tangent having a slope in magnitude that is in a range from about 0.01 MPa/micrometer to about 3 MPa/micrometer, from about 0.05 MPa/micrometer to about 3 MPa/micrometer, from about MPa/micrometer to about 3 MPa/micrometer, from about 0.25 MPa/micrometer to about 3 MPa/micrometer, from about 0.5 MPa/micrometer to about 3 MPa/micrometer, from about MPa/micrometer to about 3 MPa/micrometer, from about 1 MPa/micrometer to about 3 MPa/micrometer, from about 1.25 MPa/micrometer to about 3 MPa/micrometer, from about 1.5 MPa/micrometer to about 3 MPa/micrometer, from about 1.75 MPa/micrometer to about 3 MPa/micrometer, from about 2 MPa/micrometer to about 3 MPa/micrometer, from about MPa/micrometer to about 2.9 MPa/micrometer, from about 0.01 MPa/micrometer to about 2.8 MPa/micrometer, from about 0.01 MPa/micrometer to about 2.75 MPa/micrometer, from about 0.01 MPa/micrometer to about 2.7 MPa/micrometer, from about 0.01 MPa/micrometer to about 2.6 MPa/micrometer, from about 0.01 MPa/micrometer to about 2.5 MPa/micrometer, from about 0.01 MPa/micrometer to about 2.4 MPa/micrometer, from about 0.01 MPa/micrometer to about 2.2 MPa/micrometer, from about 0.01 MPa/micrometer to about 2.1 MPa/micrometer, from about 0.01 MPa/micrometer to about 2 MPa/micrometer, from about 0.01 MPa/micrometer to about 1.75 MPa/micrometer, from about 0.01 MPa/micrometer to about 1.5 MPa/micrometer, from about 0.01 MPa/micrometer to about 1.25 MPa/micrometer, from about 0.01 MPa/micrometer to about 1 MPa/micrometer, from about 0.01 MPa/micrometer to about 0.75 MPa/micrometer, from about 0.01 MPa/micrometer to about 0.5 MPa/micrometer, from about 0.01 MPa/micrometer to about MPa/micrometer, from about 0.1 MPa/micrometer to about 2 MPa/micrometer, from about 0.5 MPa/micrometer to about 2 MPa/micrometer, or from about 1 MPa/micrometer to about 3 MPa/micrometer.

In one or more embodiments, the CS magnitude within the spike region is in a range from about greater than 200 MPa to about 1500 MPa. For example, the CS magnitude in the spike region may be in a range from about 250 MPa to about 1500 MPa, from about 300 MPa to about 1500 MPa, from about 350 MPa to about 1500 MPa, from about 400 MPa to about 1500 MPa, from about 450 MPa to about 1500 MPa, from about 500 MPa to about 1500 MPa, from about 550 MPa to about 1500 MPa, from about 600 MPa to about 1500 MPa, from about 750 MPa to about 1500 MPa, from about 800 MPa to about 1500 MPa, from about 850 MPa to about 1500 MPa, from about 900 MPa to about 1500 MPa, from about 950 MPa to about 1500 MPa, from about 1000 MPa to about 1500 MPa, from about 1050 MPa to about 1500 MPa, from about 1100 MPa to about 1500 MPa, from about 1200 MPa to about 1500 MPa, from about 250 MPa to about 1450 MPa, from about 250 MPa to about 1400 MPa, from about 250 MPa to about 1350 MPa, from about 250 MPa to about 1300 MPa, from about 250 MPa to about 1250 MPa, from about 250 MPa to about 1200 MPa, from about 250 MPa to about 1150 MPa, from about 250 MPa to about 1100 MPa, from about 250 MPa to about 1050 MPa, from about 250 MPa to about 1000 MPa, from about 250 MPa to about 950 MPa, from about 250 MPa to about 90 MPa, from about 250 MPa to about 850 MPa, from about 250 MPa to about 800 MPa, from about 250 MPa to about 750 MPa, from about 250 MPa to about 700 MPa, from about 250 MPa to about 650 MPa, from about 250 MPa to about 600 MPa, from about 250 MPa to about 550 MPa, from about 250 MPa to about 500 MPa, from about 800 MPa to about 1400 MPa, from about 900 MPa to about 1300 MPa, from about 900 MPa to about 1200 MPa, from about 900 MPa to about 1100 MPa, or from about 900 MPa to about 1050 MPa.

In one or more embodiments, the CS magnitude in the knee region is in a range from about 5 MPa to about 200 MPa, from about 10 MPa to about 200 MPa, from about 15 MPa to about 200 MPa, from about 20 MPa to about 200 MPa, from about 25 MPa to about 200 MPa, from about 30 MPa to about 200 MPa, from about 35 MPa to about 200 MPa, from about 40 MPa to about 200 MPa, from about 45 MPa to about 200 MPa, from about 50 MPa to about 200 MPa, from about 55 MPa to about 200 MPa, from about 60 MPa to about 200 MPa, from about 65 MPa to about 200 MPa, from about 75 MPa to about 200 MPa, from about 80 MPa to about 200 MPa, from about 90 MPa to about 200 MPa, from about 100 MPa to about 200 MPa, from about 125 MPa to about 200 MPa, from about 150 MPa to about 200 MPa, from about 5 MPa to about 190 MPa, from about 5 MPa to about 180 MPa, from about MPa to about 175 MPa, from about 5 MPa to about 170 MPa, from about 5 MPa to about 160 MPa, from about 5 MPa to about 150 MPa, from about 5 MPa to about 140 MPa, from about 5 MPa to about 130 MPa, from about 5 MPa to about 125 MPa, from about 5 MPa to about 120 MPa, from about 5 MPa to about 110 MPa, from about 5 MPa to about 100 MPa, from about 5 MPa to about 75 MPa, from about 5 MPa to about 50 MPa, from about 5 MPa to about 25 MPa, or from about 10 MPa to about 100 MPa.

In one or more embodiments, the knee region of the stress profile extends from about micrometers to about 50 micrometers from the first major surface. For example, the knee region of the stress profile extends from about 12 micrometers to about 50 micrometers, from about 14 micrometers to about 50 micrometers, from about 15 micrometers to about 50 micrometers, from about 16 micrometers to about 50 micrometers, from about 18 micrometers to about 50 micrometers, from about 20 micrometers to about 50 micrometers, from about 22 micrometers to about 50 micrometers, from about 24 micrometers to about 50 micrometers, from about 25 micrometers to about 50 micrometers, from about 26 micrometers to about 50 micrometers, from about 28 micrometers to about 50 micrometers, from about 30 micrometers to about 50 micrometers, from about 32 micrometers to about 50 micrometers, from about 34 micrometers to about 50 micrometers, from about 35 micrometers to about 50 micrometers, from about 36 micrometers to about 50 micrometers, from about 38 micrometers to about 50 micrometers, from about 40 micrometers to about 50 micrometers, from about 10 micrometers to about 48 micrometers, from about 10 micrometers to about 46 micrometers, from about 10 micrometers to about 45 micrometers, from about 10 micrometers to about 44 micrometers, from about 10 micrometers to about 42 micrometers, from about 10 micrometers to about 40 micrometers, from about 10 micrometers to about 38 micrometers, from about 10 micrometers to about 36 micrometers, from about 10 micrometers to about 35 micrometers, from about 10 micrometers to about 34 micrometers, from about 10 micrometers to about 32 micrometers, from about 10 micrometers to about 30 micrometers, from about 10 micrometers to about 28 micrometers, from about 10 micrometers to about 26 micrometers, from about 10 micrometers to about 25 micrometers, from about 10 micrometers to about 24 micrometers, from about 10 micrometers to about 22 micrometers, or from about 10 micrometers to about 20 micrometers, from the first major surface.

In one or more embodiments, the tail region extends from about the knee region to the depth of $CT_{max}$. In one or more embodiments, the tail region comprises one or both of a compressive stress tail region, and a tensile stress tail region.

In one or more embodiments, the glass article comprises one or more of a frame, a display or touch panel disposed on the first or second major surface. In one or more embodiments, the display may be a liquid crystal display, an organic light-emitting diode (OLED) display, a transmissive display or other display. In one or embodiments, the glass article includes an adhesive or adhesive layer disposed between the first or second major surface and the frame, display or touch panel.

In one or more embodiments, the display module includes touch functionality and such functionality is accessible through the glass article 100. In one or more embodiments, displayed images or content shown by the display module is visible through the glass article.

In one or more embodiments, the thickness of the glass article is in a range from about mm to about 2 mm. For example, the thickness may be in a range from about 0.06 mm to about 2 mm, from about 0.08 mm to about 2 mm, from about 0.1 mm to about 2 mm, from about 0.12 mm to about 2 mm, from about 0.05 mm to about 2 mm, from about 0.14 mm to about 2 mm, from about 0.15 mm to about 2 mm, from about 0.16 mm to about 2 mm, from about 0.18 mm to about 2 mm, from about 0.2 mm to about 2 mm, from about 0.25 mm to about 2 mm, from about 0.3 mm to about 2 mm, from about 0.4 mm to about 2 mm, from about 0.5 mm to about 2 mm, from about 0.55 mm to about 2 mm, from about 0.6 mm to about 2 mm, from about 0.05 mm to about 2 mm, from about 0.6 mm to about 2 mm, from about 0.7 mm to about 2 mm, from about 0.8 mm to about 2 mm, from about 0.9 mm to about 2 mm, from about 1 mm to about 2 mm, from about 1.1 mm to about 2 mm, from about 1.2 mm to about 2 mm, from about 1.5 mm to about 2 mm, from about 0.05 mm to about 1.8 mm, from about 0.05 mm to about 1.6 mm, from about 0.05 mm to about 1.5 mm, from about mm to about 1.4 mm, from about 0.05 mm to about 1.2 mm, from about 0.05 mm to about 1.1 mm, from about 0.05 mm to about 1 mm, from about 0.05 mm to about 0.9 mm, from about 0.05 mm to about 0.8 mm, from about 0.05 mm to about 0.7 mm, from about 0.05 mm to about 0.6 mm, from about 0.05 mm to about 0.55 mm, from about 0.05 mm to about mm, from about 0.05 mm to about 0.4 mm, from about 0.05 mm to about 0.3 mm, or from about 0.7 mm to about 1.5 mm.

In one or more embodiments, the glass substrate has a width (W) in a range from about 5 cm to about 250 cm, from about 10 cm to about 250 cm, from about 15 cm to about 250 cm, from about 20 cm to about 250 cm, from about 25 cm to about 250 cm, from about cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, the glass substrate has a length (L) in a range from about 5 cm to about 250 cm, from about 10 cm to about 250 cm, from about 15 cm to about 250 cm, from about 20 cm to about 250 cm, from about 25 cm to about 250 cm, from about cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

The glass article of any one of the preceding claims, wherein either one of or both the first major surface 102 and the second major surface 104 comprises a surface treatment. The surface treatment may cover at least a portion of the first major surface 102 and/or the second major surface 104. Exemplary surface treatments include an easy-to-clean surface, an anti-glare surface, an anti-reflective surface, a haptic surface, and a decorative surface. In one or more embodiments, the at least a portion of the first major surface and 102/or the second major surface 104 may include any one, any two or all three of an anti-glare surface, an anti-reflective surface, a haptic surface, and a decorative surface. For example, first major surface 102 may include an anti-glare surface and the second major surface 104 may include an anti-reflective surface. In another example, the first major surface 102 includes an anti-reflective surface and the second major surface 104 includes an anti-glare surface. In yet another example, the first major surface 102 comprises either one of or both the anti-glare surface and the anti-reflective surface, and the second major surface 104 includes the decorative surface.

The anti-reflective surface may be formed using an etching process and may exhibit a transmission haze 20% or less (e.g., about 15% or less, or about 10% or less), and a distinctiveness of image (DOI) of about 80 or less. As used herein, the terms "transmission haze" and "haze" refer to the percentage of transmitted light scattered outside an angular cone of about ±2.5° in accordance with ASTM procedure D1003. For an optically smooth surface, transmission haze is generally near zero. As used herein, the term "distinctness of image" is defined by method A of ASTM procedure D5767 (ASTM 5767), entitled "Standard Test Methods for Instrumental Measurements of Distinctness-of-Image Gloss of Coating Surfaces," the contents of which are incorporated herein by reference in their entirety. In accordance with method A of ASTM 5767, substrate reflectance factor measurements are made on the anti-glare surface at the specular viewing angle and at an angle slightly off the specular viewing angle. The values obtained from these measurements are combined to provide a DOI value. In particular, DOI is calculated according to the equation $$DOI = \left[1 - \frac{Ros}{Rs}\right] \times 100, \quad (1)$$

where Ros is the relative reflection intensity average between 0.2° and 0.4 away from the specular reflection direction, and Rs is the relative reflection intensity average in the specular direction (between +0.05° and −0.05°, centered around the specular reflection direction). If the input light source angle is +20° from the sample surface normal (as it is throughout this disclosure), and the surface normal to the sample is taken as 0°, then the measurement of specular reflected light Rs is taken as an average in the range of about −19.95° to −20.05°, and Ros is taken as the average reflected intensity in the range of about −20.2° to −20.4° (or from −19.6° to −19.8°, or an average of both of these two ranges). As used herein, DOI values should be directly interpreted as specifying a target ratio of Ros/Rs as defined herein. In some embodiments, the anti-glare surface has a reflected scattering profile such that >95% of the reflected optical power is contained within a cone of +/−10°, where the cone is centered around the specular reflection direction for any input angle.

The resulting the anti-glare surface may include a textured surface with plurality of concave features having an opening facing outwardly from the surface. The opening may have an average cross-sectional dimension of about 30 micrometers or less. In one or more embodiments, the anti-glare surface exhibits low sparkle (in terms of low pixel power deviation reference or PPDr) such as PPDr of about 6% or less, as used herein, the terms "pixel power deviation referenced" and "PPDr" refer to the quantitative measurement for display sparkle. Unless otherwise specified, PPDr is measured using a display arrangement that includes an edge-lit liquid crystal display screen (twisted nematic liquid crystal display) having a native sub-pixel pitch of 60 μm×180 μm and a sub-pixel opening window size of about 44 μm×about 142 μm. The front surface of the liquid crystal display screen had a glossy, anti-reflection type linear polarizer film. To determine PPDr of a display system or an anti-glare surface that forms a portion of a display system, a screen is placed in the focal region of an "eye-simulator" camera, which approximates the parameters of the eye of a human observer. As such, the camera system includes an aperture (or "pupil aperture") that is inserted into the optical path to adjust the collection angle of light, and thus approximate the aperture of the pupil of the human eye. In the PPDr measurements described herein, the iris diaphragm subtends an angle of 18 milliradians.

The anti-reflective surface may be formed by a multilayer coating stack formed from alternating layers of a high refractive index material and a low refractive index material. Such coatings stacks may include 6 layers or more. In one or more embodiment, the anti-reflective surface may exhibit a single-side average light reflectance of about 2% or less (e.g., about 1.5% or less, about 1% or less, about 0.75% or less, about 0.5% or less, or about 0.25% or less) over the optical wavelength regime in the range from about 400 nm to about 800 nm. The average reflectance is measured at an incident illumination angle greater than about 0 degrees to less than about 10 degrees.

The decorative surface may include any aesthetic design formed from a pigment (e.g., ink, paint and the like) and can include a wood-grain design, a brushed metal design, a graphic design, a portrait, or a logo. In one or more embodiments, the decorative surface exhibits a deadfront effect in which the decorative surface disguises or masks the underlying display from a viewer when the display is turned off but permits the display to be viewed when the display is turned on. The decorative surface may be printed onto the glass article. In one or more embodiments, the anti-glare surface includes an etched surface. In one or more embodiments, the anti-reflective surface includes a multi-layer coating. In one or more embodiments, the easy-to-clean surface includes an oleophobic coating that imparts anti-fingerprint properties. In one or more embodiments, the haptic surface includes a raised or recessed surface formed from depositing a polymer or glass material on the surface to provide a user with tactile feedback when touched.

In one or more embodiments, one or both of the first major surface and the second major surface comprise a periphery surrounding an interior portion. In one or more embodiments, the periphery comprises a surface treatment, while the interior portion is substantially free of any surface treatment or comprises a different surface treatment than the periphery. In one or more embodiments, a decorative surface is disposed on at least a portion of the periphery and the interior portion is substantially free of the decorative surface. Decorative surfaces may include any one of a black boarder, wood-grain design, a brushed metal design, a graphic design, a portrait, and a logo.

In one or more embodiments, the glass article is substantially free of an anti-splinter layer (which may be a film or coating). In such embodiments, one of the first or second major surface is substantially free of any anti-splinter layers.

In one or more embodiments, when the glass article is curved from a substantially flat configuration to a curved configuration such that the first major surface comprises a concave shape having a radius of curvature of about 250 mm, the $CS_{max}$ increases by more than about 8%, more than about 10%, more than about 12%, more than about 14%, more than about 15%, more than about 16%, more than about 18% or more than about 20%.

In more than one embodiments, when the glass article is curved from a substantially flat configuration to a curved configuration such that the first major surface comprises a concave shape having a radius of curvature of about 500 mm, the DOC increases by about 200% or more, or about 300% or more, and a second depth of compression ($DOC_2$) measured from the second major surface decreases by less than 15%. In one or more embodiments, DOC increases by about 210% or more, about 220% or more, about 230% or more, 240% or more, 250% or more, 260% or more, 270% or more, 280% or more, 290% or more, about 300% or more, about 310% or more, about 320% or more, about 325% or more, about 330% or more, about 340% or more, about 350% or more, about 360% or more, about 370% or more, about 380% or more, about 310% or more, about 390% or more, or about 400%. For example, DOC, increases by an amount in a range from about 200% to about 500%, from about 225% to about 500%, from about 250% to about 500%, from about 275% to about 500%, from about 300% to about 500%, from about 325% to about 500%, from about 350% to about 500%, from about 375% to about 500%, from about 400% to about 500%, from about 425% to about 500%, from about 450% to about 500%, from about 200% to about 475%, from about 200% to about 450%, from about 200% to about 425%, from about 200% to about 400%, from about 200% to about 375%, from about 200% to about 350%, from about 200% to about 325%, from about 200% to about 300%, from about 200% to about 275%, from about 200% to about 250%, or from about 200% to about 225%. In one or more such embodiments, when the glass article is curved to from a substantially flat configuration to a curved configuration such that the first major surface comprises a concave shape having a radius of curvature of about 500 mm, the $CT_{max}$ increases by 250% or less (e.g., 225% or less, 200% or less, 175% or less, 150% or less, 125% or less, 100% or less, 75% or less, 50% or less, or 25% or less).

In one or more embodiments, when the glass article is curved to from a substantially flat configuration to a curved configuration such that the first major surface comprises a concave shape having a radius of curvature of about 250 mm, the DOC increases by more than about 600%, and a second depth of compression ($DOC_2$) measured from the second major surface decreases by about less than 25%. For example, DOC may increase by about 625% or more, about 650% or more or about 700% or more. DOC2 may decrease by about 20% or less, about 15% or less, or about 10% or less. In one or more such embodiments, when the glass article is curved to from a substantially flat configuration to a curved configuration such that the first major surface comprises a concave shape having a radius of curvature of about 250 mm, the CTmax increases by 400% or less (e.g., 375% or less, 350% or less, 325% or less, 300% or less, 275% or less, 250% or less, 225% or less, 200% or less, 175% or less, 150% or less, 125% or less, 100% or less, 75% or less, 50% or less, or 25% or less).

A second aspect of this disclosure pertains to a curved glass article 200 as shown in FIG. 4. In one or more embodiments, the curved glass article comprises a first major concave surface 210, a second major convex surface 220 opposing the first major concave surface, a minor surface 230 connecting the first major concave surface and the second major convex surface defining a thickness (t) (millimeters). In one or more embodiments, the curved glass article comprises a first CS region extending from the first major concave surface to a first depth of compressive stress ($DOC_1$). The first CS region has first maximum CS value ($CS_{max1}$). In one or more embodiments, the second major convex surface comprises a second CS region extending from the second major convex surface to a second depth of compressive stress ($DOC_2$), the second CS region having a second maximum CS value (CSmax2). The curved glass article includes a central tension (CT) region disposed between the first CS region and the second CS region having a maximum CT value ($CT_{curved-max}$). The CS region and the CT region define a stress profile along the thickness.

In one or more embodiments, the thickness of the curved glass article is in a range from about 0.05 mm to about 2 mm. For example, the thickness may be in a range from about mm to about 2 mm, from about 0.08 mm to about 2 mm, from about 0.1 mm to about 2 mm, from about 0.12 mm to about 2 mm, from about 0.05 mm to about 2 mm, from about mm to about 2 mm, from about 0.15 mm to about 2 mm, from about 0.16 mm to about 2 mm, from about 0.18 mm to about 2 mm, from about 0.2 mm to about 2 mm, from about 0.25 mm to about 2 mm, from about 0.3 mm to about 2 mm, from about 0.4 mm to about 2 mm, from about 0.5 mm to about 2 mm, from about 0.55 mm to about 2 mm, from about 0.6 mm to about 2 mm, from about 0.05 mm to about 2 mm, from about 0.6 mm to about 2 mm, from about 0.7 mm to about 2 mm, from about 0.8 mm to about 2 mm, from about 0.9 mm to about 2 mm, from about 1 mm to about 2 mm, from about 1.1 mm to about 2 mm, from about 1.2 mm to about 2 mm, from about 1.5 mm to about 2 mm, from about 0.05 mm to about 1.8 mm, from about 0.05 mm to about 1.6 mm, from about 0.05 mm to about 1.5 mm, from about mm to about 1.4 mm, from about 0.05 mm to about 1.2 mm, from about 0.05 mm to about 1.1 mm, from about 0.05 mm to about 1 mm, from about 0.05 mm to about 0.9 mm, from about 0.05 mm to about 0.8 mm, from about 0.05 mm to about 0.7 mm, from about 0.05 mm to about 0.6 mm, from about 0.05 mm to about 0.55 mm, from about 0.05 mm to about mm, from about 0.05 mm to about 0.4 mm, from about 0.05 mm to about 0.3 mm, or from about 0.7 mm to about 1.5 mm.

In one or more embodiments, the curved glass substrate has a width (W) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, the curved glass substrate has a length (L) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, the first major concave surface 210 has a maximum radius of curvature of about 20 mm or greater, about 50 mm or greater, or about 100 mm or greater (e.g., about 125 mm or greater, 150 mm or greater, 175 mm or greater, 200 mm or greater, 250 mm or greater, 300 mm or greater, 350 mm or greater, 400 mm or greater, 500 mm or greater, 600 mm or greater, 750 mm or greater, 1000 mm or greater, 1250 mm or greater, 1500 mm or greater, 1750 mm or greater, 2000 mm or greater, 2250 mm or greater 2500 mm or greater).

In one or more embodiments, $CSmax_2$ is less than $CSmax_1$. In one or more embodiments, $CS_{max1}$ is greater than about 800 MPa. In one or more embodiments, CSmax1 is about 800 MPa or greater, about 820 MPa or greater, about 840 MPa or greater, about 850 MPa or greater, about 860 MPa or greater, about 880 MPa or greater, 900 MPa or greater, about 920 MPa or greater, about 940 MPa or greater, about 950 MPa or greater, about 960 MPa or greater, about 980 MPa or greater, about 1000 MPa or greater, about 1020 MPa or greater, about 1040 MPa or greater, about 1050 MPa or greater, about 1060 MPa or greater, about 1080 MPa or greater, about 1100 MPa or greater, about 1120 MPa or greater, about 1140 MPa or greater, about 1150 MPa or greater, about 1160 MPa or greater, about 1180 MPa or greater, about 1200 MPa or greater, about 1220 MPa or greater, about 1240 MPa or greater, about 1250 MPa or greater, about 1260 MPa or greater, about 1280 MPa or greater, or about 1300 MPa or greater. In one or more embodiments, the CSmax1 is in a range from about 800 MPa to about 1500 MPa, from about 820 MPa to about 1500 MPa, from about 840 MPa to about 1500 MPa, from about 850 MPa to about 1500 MPa, from about 860 MPa to about 1500 MPa, from about 880 MPa to about 1500 MPa, from about 900 MPa to about 1500 MPa, from about 920 MPa to about 1500 MPa, from about 940 MPa to about 1500 MPa, from about 950 MPa to about 1500 MPa, from about 960 MPa to about 1500 MPa, from about 980 MPa to about 1500 MPa, from about 1000 MPa to about 1500 MPa, from about 1020 MPa to about 1500 MPa, from about 1040 MPa to about 1500 MPa, from about 1050 MPa to about 1500 MPa, from about 1060 MPa to about 1500 MPa, from about 1080 MPa to about 1500 MPa, from about 1100 MPa to about 1500 MPa, from about 1120 MPa to about 1500 MPa, from about 1140 MPa to about 1500 MPa, from about 1150 MPa to about 1500 MPa, from about 1160 MPa to about 1500 MPa, from about 1180 MPa to about 1500 MPa, from about 1200 MPa to about 1500 MPa, from about 1220 MPa to about 1500 MPa, from about 1240 MPa to about 1500 MPa, from about 1250 MPa to about 1500 MPa, from about 1260 MPa to about 1500 MPa, from about 1280 MPa to about 1500 MPa, from about 1300 MPa to about 1500 MPa, from about 800 MPa to about 1480 MPa, from about 800 MPa to about 1460 MPa, from about 800 MPa to about 1450 MPa, from about 800 MPa to about 1440 MPa, from about 800 MPa to about 1420 MPa, from about 800 MPa to about 1400 MPa, from about 800 MPa to about 1380 MPa, from about 800 MPa to about 1360 MPa, from about 800 MPa to about 1350 MPa, from about 800 MPa to about 1340 MPa, from about 800 MPa to about 1320 MPa, from about 800 MPa to about 1300 MPa, from about 800 MPa to about 1280 MPa, from about 800 MPa to about 1260 MPa, from about 800 MPa to about 1250 MPa, from about 800 MPa to about 1240 MPa, from about 800 MPa to about 1220 MPa, from about 800 MPa to about 1210 MPa, from about 800 MPa to about 1200 MPa, from about 800 MPa to about 1180 MPa, from about 800 MPa to about 1160 MPa, from about 800 MPa to about 1150 MPa, from about 800 MPa to about 1140 MPa, from about 800 MPa to about 1120 MPa, from about 800 MPa to about 1100 MPa, from about 800 MPa to about 1080 MPa, from about 800 MPa to about 1060 MPa, from about 800 MPa to about 1050 MPa, or from about 950 MPa to about 1050 MPa, or from about 1000 MPa to about 1050 MPa.

In one or more embodiments, CSmax2 is about 600 MPa or greater, 620 MPa or greater, 640 MPa or greater, 650 MPa or greater, 660 MPa or greater, 680 MPa or greater, 700 MPa or greater, 720 MPa or greater, 740 MPa or greater, 750 MPa or greater, 760 MPa or greater, 780 MPa or greater, 800 MPa or greater, about 820 MPa or greater, about 840 MPa or greater, about 850 MPa or greater, about 860 MPa or greater, about 880 MPa or greater, 900 MPa or greater, about 920 MPa or greater, about 940 MPa or greater, about 950 MPa or greater, about 960 MPa or greater, about 980 MPa or greater, about 1000 MPa or greater, about 1020 MPa or greater, about 1040 MPa or greater, about 1050 MPa or greater, about 1060 MPa or greater, about 1080 MPa or greater, about 1100 MPa or greater, about 1120 MPa or greater, about 1140 MPa or greater, about 1150 MPa or greater, about 1160 MPa or greater, about 1180 MPa or greater, about 1200 MPa or greater, about 1220 MPa or greater, about 1240 MPa or greater, about 1250 MPa or greater, about 1260 MPa or greater, about 1280 MPa or greater, or about 1300 MPa or greater. In one or more embodiments, the CSmax1 is in a range from about 800 MPa to about 1500 MPa, from about 820 MPa to about 1500 MPa, from about 840 MPa to about 1500 MPa, from about 850 MPa to about 1500 MPa, from about 860 MPa to about 1500 MPa, from about 880 MPa to about 1500 MPa, from about 900 MPa to about 1500 MPa, from about 920 MPa to about 1500 MPa, from about 940 MPa to about 1500 MPa, from about 950 MPa to about 1500 MPa, from about 960 MPa to about 1500 MPa, from about 980 MPa to about 1500 MPa, from about 1000 MPa to about 1500 MPa, from about 1020 MPa to about 1500 MPa, from about 1040 MPa to about 1500 MPa, from about 1050 MPa to about 1500 MPa, from about 1060 MPa to about 1500 MPa, from about 1080 MPa to about 1500 MPa, from about 1100 MPa to about 1500 MPa, from about 1120 MPa to about 1500 MPa, from about 1140 MPa to about 1500 MPa, from about 1150 MPa to about 1500 MPa, from about 1160 MPa to about 1500 MPa, from about 1180 MPa to about 1500 MPa, from about 1200 MPa to about 1500 MPa, from about 1220 MPa to about 1500 MPa, from about 1240 MPa to about 1500 MPa, from about 1250 MPa to about 1500 MPa, from about 1260 MPa to about 1500 MPa, from about 1280 MPa to about 1500 MPa, from about 1300 MPa to about 1500 MPa, from about 800 MPa to about 1480 MPa, from about 800 MPa to about 1460 MPa, from about 800 MPa to about 1450 MPa, from about 800 MPa to about 1440 MPa, from about 800 MPa to about 1420 MPa, from about 800 MPa to about 1400 MPa, from about 800 MPa to about 1380 MPa, from about 800 MPa to about 1360 MPa, from about 800 MPa to about 1350 MPa, from about 800 MPa to about 1340 MPa, from about 800 MPa to about 1320 MPa, from about 800 MPa to about 1300 MPa, from about 800 MPa to about 1280 MPa, from about 800 MPa to about 1260 MPa, from about 800 MPa to about 1250 MPa, from about 800 MPa to about 1240 MPa, from about 800 MPa to about 1220 MPa, from about 800 MPa to about 1210 MPa, from about 800 MPa to about 1200 MPa, from about 800 MPa to about 1180 MPa, from about 800 MPa to about 1160 MPa, from about 800 MPa to about 1150 MPa, from about 800 MPa to about 1140 MPa, from about 800 MPa to about 1120 MPa, from about 800 MPa to about 1100 MPa, from about 800 MPa to about 1080 MPa, from about 800 MPa to about 1060 MPa, from about 800 MPa to about 1050 MPa, or from about 950 MPa to about 1050 MPa, or from about 1000 MPa to about 1050 MPa.

In one or more embodiments of the curved glass article, $DOC_1$ differs from $DOC_2$. In one or more embodiments, $DOC_1$ is greater than $DOC_2$. In one or more embodiments, one of both of the value of $DOC_1$ and $DOC_2$ of the curved glass article are about 0.2t or less. For example, $DOC_1$ and/or $DOC_2$ may be about 0.18t or less, about 0.18t or less, about 0.16t or less, about 0.15t or less, about 0.14t or less, about 0.12t or less, about 0.1t or less, about 0.08t or less, about 0.06t or less, about 0.05t or less, about 0.04t or less, or about 0.03t or less. In one or more embodiments, $DOC_1$ and/or $DOC_2$ is in a range from about 0.02t to about 0.2t, from about 0.04t to about 0.2t, from about 0.05t to about 0.2t, from about 0.06t to about 0.2t, from about 0.08t to about 0.2t, from about 0.1t to about 0.2t, from about 0.12t to about 0.2t, from about 0.14t to about 0.2t, from about 0.15t to about 0.2t, from about 0.16t to about 0.2t, from about 0.02t to about 0.18t, from about 0.02t to about 0.16t, from about 0.02t to about from about 0.02t to about 0.14t, from about 0.02t to about 0.12t, from about 0.02t to about 0.1t, from about 0.02t to about 0.08, from about 0.02t to about 0.06t, from about 0.02t to about 0.05t, from about 0.1t to about 0.8t, from about 0.12t to about 0.16t, or from about to about 0.17t.

In one or more embodiments, when the curved glass article is in an uncurved configuration, the glass article comprises a maximum CT value ($CT_{uncurved-max}$) that is disposed at a depth from the first major surface in a range from about 0.25t to about 0.75t. In one or more such embodiments, $CT_{uncurved-max}$ is disposed at a depth in a range from about to about 0.74t, from about 0.25t to about 0.72t, from about 0.25t to about 0.70t, from about 0.25t to about 0.68t, from about 0.25t to about 0.66t, from about 0.25t to about 0.65t, from about 0.25t to about 0.62t, from about 0.25t to about 0.60t, from about 0.25t to about from about 0.25t to about 0.56t, from about 0.25t to about 0.55t, from about 0.25t to about 0.54t, from about 0.25t to about 0.52t, from about 0.25t to about 0.50t, from about to about 0.75t, from about 0.28t to about 0.75t, from about 0.30t to about 0.75t, from about 0.32t to about 0.75t, from about 0.34t to about 0.75t, from about 0.35t to about 0.75t, from about 0.36t to about 0.75t, from about 0.38t to about 0.75t, from about 0.40t to about from about 0.42t to about 0.75t, from about 0.44t to about 0.75t, from about 0.45t to about 0.75t, from about 0.46t to about 0.75t, from about 0.48t to about 0.50t, from about to about 0.70t, from about 0.35t to about 0.65t, from about 0.4t to about 0.6t, or from about 0.45t to about 0.55t. In one or more embodiments, the foregoing ranges for the location of $CT_{uncurved-max}$ is present when the uncurved glass article has a radius of curvature of greater than about 5000 mm, or greater than about 10,000 mm.

In one or more embodiments, $CT_{uncurved-max}$ has a magnitude of less than about 400 MPa (e.g., about 390 MPa or less, 380 MPa or less, 375 MPa or less, 370 MPa or less, 360 MPa or less, 350 MPa or less, 340 MPa or less, 330 MPa or less, 325 MPa or less, 320 MPa or less, 310 MPa or less, 300 MPa or less, 275 MPa or less, 250 MPa or less, 225 MPa or less, 200 MPa or less, 175 MPa or less, 150 MPa or less, 125 MPa or less, 100 MPa or less, MPa or less, 80 MPa or less, 75 MPa or less, 70 MPa or less, 65 MPa or less, 60 MPa or less, 55 MPa or less or about 50 MPa or less). The foregoing $CT_{uncurved-max}$ magnitude values are present when the $CS_{max1}$ is greater than about 800 MPa. In one or more embodiments, the glass article exhibits the relationship of $CT_{curved-max}/CT_{uncurved-max} \geq 1.4$ (e.g., 1.5 or greater, 1.6 or greater, 1.7 or greater, 1.8 or greater, 1.9 or greater or about 2 or greater).

In one or more embodiments, $CT_{curved-max}$ has a magnitude of less than about 400 MPa (e.g., about 390 MPa or less, 380 MPa or less, 375 MPa or less, 370 MPa or less, 360 MPa or less, 350 MPa or less, 340 MPa or less, 330 MPa or less, 325 MPa or less, 320 MPa or less, 310 MPa or less, 300 MPa or less, 275 MPa or less, 250 MPa or less, 225 MPa or less, 200 MPa or less, 175 MPa or less, 150 MPa or less, 125 MPa or less, 100 MPa or less, MPa or less, 80 MPa or less, 75 MPa or less, 70 MPa or less, 65 MPa or less, 60 MPa or less, 55 MPa or less or about 50 MPa or less. In one or more embodiments, $CT_{curved-max}$ is in a range from about 30 MPa to about 80 MPa, from about 35 MPa to about 80 MPa, from about MPa to about 80 MPa, from about 45 MPa to about 80

MPa, from about 50 MPa to about MPa, from about 55 MPa to about 80 MPa, from about 60 MPa to about 80 MPa, from about 65 MPa to about 80 MPa, from about 70 MPa to about 80 MPa, from about 30 MPa to about 75 MPa, from about 30 MPa to about 70 MPa, from about 30 MPa to about 65 MPa, from about 30 MPa to about 60 MPa, from about 30 MPa to about 55 MPa, from about 30 MPa to about 50 MPa, from about 30 MPa to about 45 MPa, from about 30 MPa to about 40 MPa, from about 40 MPa to about 70 MPa, from about 50 MPa to about 70 MPa, or from about 60 MPa to about 80 MPa. Such ranges for CTcurved-max are present when the curved glass article has a radius of curvature in a range from about 250 mm to about 2500 mm, from about 300 mm to about 2500 mm, from about 350 mm to about 2500 mm, from about 400 mm to about 2500 mm, from about 450 mm to about 2500 mm, from about 500 mm to about 2500 mm, from about 550 mm to about 2500 mm, from about 600 mm to about 2500 mm, from about 650 mm to about 2500 mm, from about 700 mm to about 2500 mm, from about 750 mm to about 2500 mm, from about 800 mm to about 2500 mm, from about 900 mm to about 2500 mm, from about 1000 mm to about 2500 mm, from about 250 mm to about 2000 mm, from about 250 mm to about 1500 mm, from about 250 mm to about 1000 mm, from about 500 mm to about 1000 mm, from about 600 mm to about 1000 mm, from about 700 mm to about 1000 mm, and all ranges and sub-ranges of the foregoing.

In one or more embodiments, $CT_{curved\text{-}max}$ is disposed at a depth of about 0.12t or less from the second convex major surface. For example, the depth of $CT_{curved\text{-}max}$ may be about 0.11t or less, 0.1t or less, 0.09t or less, 0.08t or less, 0.075t or less, 0.07t or less, 0.06t or less, 0.05t or less, 0.04t or less, 0.03t or less or about 0.025t or less.

In one or more embodiments, CSmax1 of the curved glass article is about 900 MPa or greater, about 920 MPa or greater, about 940 MPa or greater, about 950 MPa or greater, about 960 MPa or greater, about 980 MPa or greater, about 1000 MPa or greater, about 1020 MPa or greater, about 1040 MPa or greater, about 1050 MPa or greater, about 1060 MPa or greater, about 1080 MPa or greater, about 1100 MPa or greater, about 1120 MPa or greater, about 1140 MPa or greater, about 1150 MPa or greater, about 1160 MPa or greater, about 1180 MPa or greater, about 1200 MPa or greater, about 1220 MPa or greater, about 1240 MPa or greater, about 1250 MPa or greater, about 1260 MPa or greater, about 1280 MPa or greater, or about 1300 MPa or greater. In one or more embodiments, the CSmax is in a range from about 900 MPa to about 1500 MPa, from about 920 MPa to about 1500 MPa, from about 940 MPa to about 1500 MPa, from about 950 MPa to about 1500 MPa, from about 960 MPa to about 1500 MPa, from about 980 MPa to about 1500 MPa, from about 1000 MPa to about 1500 MPa, from about 1020 MPa to about 1500 MPa, from about 1040 MPa to about 1500 MPa, from about 1050 MPa to about 1500 MPa, from about 1060 MPa to about 1500 MPa, from about 1080 MPa to about 1500 MPa, from about 1100 MPa to about 1500 MPa, from about 1120 MPa to about 1500 MPa, from about 1140 MPa to about 1500 MPa, from about 1150 MPa to about 1500 MPa, from about 1160 MPa to about 1500 MPa, from about 1180 MPa to about 1500 MPa, from about 1200 MPa to about 1500 MPa, from about 1220 MPa to about 1500 MPa, from about 1240 MPa to about 1500 MPa, from about 1250 MPa to about 1500 MPa, from about 1260 MPa to about 1500 MPa, from about 1280 MPa to about 1500 MPa, from about 1300 MPa to about 1500 MPa, from about 900 MPa to about 1480 MPa, from about 900 MPa to about 1460 MPa, from about 900 MPa to about 1450 MPa, from about 900 MPa to about 1440 MPa, from about 900 MPa to about 1420 MPa, from about 900 MPa to about 1400 MPa, from about 900 MPa to about 1380 MPa, from about 900 MPa to about 1360 MPa, from about 900 MPa to about 1350 MPa, from about 900 MPa to about 1340 MPa, from about 900 MPa to about 1320 MPa, from about 900 MPa to about 1300 MPa, from about 900 MPa to about 1280 MPa, from about 900 MPa to about 1260 MPa, from about 900 MPa to about 1250 MPa, from about 900 MPa to about 1240 MPa, from about 900 MPa to about 1220 MPa, from about 900 MPa to about 1210 MPa, from about 900 MPa to about 1200 MPa, from about 900 MPa to about 1180 MPa, from about 900 MPa to about 1160 MPa, from about 900 MPa to about 1150 MPa, from about 900 MPa to about 1140 MPa, from about 900 MPa to about 1120 MPa, from about 900 MPa to about 1100 MPa, from about 900 MPa to about 1080 MPa, from about 900 MPa to about 1060 MPa, from about 900 MPa to about 1050 MPa, or from about 950 MPa to about 1050 MPa, or from about 1000 MPa to about 1050 MPa. CSmax1 may be measured at a major surface or may be found at a depth from the major surface within the CS region.

In one or more embodiments, CSmax2 of the curved glass article has a value that is less than the value of CSmax1. In one or more embodiments, CSmax2 of the curved glass article is about 700 MPa or greater, about 750 MPa or greater, about 800 MPa or greater, about 850 MPa or greater, about 900 MPa or greater, about 920 MPa or greater, about 940 MPa or greater, about 950 MPa or greater, about 960 MPa or greater, about 980 MPa or greater, about 1000 MPa or greater, about 1020 MPa or greater, about 1040 MPa or greater, about 1050 MPa or greater, about 1060 MPa or greater, about 1080 MPa or greater, about 1100 MPa or greater, about 1120 MPa or greater, about 1140 MPa or greater, about 1150 MPa or greater, about 1160 MPa or greater, about 1180 MPa or greater, about 1200 MPa or greater, about 1220 MPa or greater, about 1240 MPa or greater, about 1250 MPa or greater, about 1260 MPa or greater, about 1280 MPa or greater, or about 1300 MPa or greater. In one or more embodiments, the CSmax is in a range from about 900 MPa to about 1500 MPa, from about 920 MPa to about 1500 MPa, from about 940 MPa to about 1500 MPa, from about 950 MPa to about 1500 MPa, from about 960 MPa to about 1500 MPa, from about 980 MPa to about 1500 MPa, from about 1000 MPa to about 1500 MPa, from about 1020 MPa to about 1500 MPa, from about 1040 MPa to about 1500 MPa, from about 1050 MPa to about 1500 MPa, from about 1060 MPa to about 1500 MPa, from about 1080 MPa to about 1500 MPa, from about 1100 MPa to about 1500 MPa, from about 1120 MPa to about 1500 MPa, from about 1140 MPa to about 1500 MPa, from about 1150 MPa to about 1500 MPa, from about 1160 MPa to about 1500 MPa, from about 1180 MPa to about 1500 MPa, from about 1200 MPa to about 1500 MPa, from about 1220 MPa to about 1500 MPa, from about 1240 MPa to about 1500 MPa, from about 1250 MPa to about 1500 MPa, from about 1260 MPa to about 1500 MPa, from about 1280 MPa to about 1500 MPa, from about 1300 MPa to about 1500 MPa, from about 900 MPa to about 1480 MPa, from about 900 MPa to about 1460 MPa, from about 900 MPa to about 1450 MPa, from about 900 MPa to about 1440 MPa, from about 900 MPa to about 1420 MPa, from about 900 MPa to about 1400 MPa, from about 900 MPa to about 1380 MPa, from about 900 MPa to about 1360 MPa, from about 900 MPa to about 1350 MPa, from about 900 MPa to about 1340 MPa, from about 900 MPa to about 1320 MPa, from about 900 MPa to about 1300 MPa, from about 900 MPa to about 1280 MPa, from about 900 MPa to about 1260 MPa, from about 900 MPa to about 1250 MPa, from about 900 MPa to about 1240 MPa, from about 900 MPa to about 1220 MPa, from about 900 MPa to about 1210 MPa, from about 900 MPa to about 1200 MPa, from about 900 MPa to about 1180 MPa, from about 900 MPa to about 1160 MPa, from about 900 MPa to about 1150 MPa, from about 900 MPa to about 1140 MPa, from about 900 MPa to about 1120 MPa, from about 900 MPa to about 1100 MPa, from about 900 MPa to about 1080 MPa, from about 900 MPa to about 1060 MPa, from about 900 MPa to about 1050 MPa, or from about 950 MPa to about 1050 MPa, or from about 1000 MPa to about 1050 MPa. CSmax2 may be measured at a major surface or may be found at a depth from the major surface within the CS region.

In one or more embodiments, one or both of $CSmax_1$ and $CSmax_2$ comprise a magnitude of 700 MPa or greater or about 800 MPa or greater at a depth of about 10 micrometers. At such a depth, one or both of $CSmax_1$ and $CSmax_2$ comprise a magnitude of 850 MPa or greater, 900 MPa or greater, 950 MPa or greater, 1000 MPa or greater, 1050 MPa or greater, 1100 MPa or greater, 1150 MPa or greater, or about 1200 MPa or greater.

In one or more embodiments, $CT_{curved-max}$ is disposed at a depth of about 0.12t or less from the second convex major surface. For example, the depth of $CT_{curved-max}$ may be about 0.11t or less, 0.1t or less, 0.09t or less, 0.08t or less, 0.075t or less, 0.07t or less, 0.06t or less, 0.05t or less, 0.04t or less, 0.03t or less or about 0.025t or less.

In one or more embodiments, the curved glass article comprises a conical surface, a cylindrical surface or a developable surface.

In one or more embodiments, either one of or both the first major surface and the second major surface comprises a surface treatment, as described with respect to the first aspect of this disclosure. In one or more embodiments, the surface treatment covers at least a portion of the first major surface and the second major surface.

In one or more embodiments, the curved glass article is substantially free of an anti-splinter layer (which may be a film or a coating).

In one or more embodiments, the curved glass article has a thickness in a range from about 0.05 mm to about 2 mm, a radius of curvature in a range from about 250 mm to about 2500 mm (e.g., from about 500 mm to about 2500 mm, from about 600 mm to about 2500 mm, from about 700 mm to about 2500 mm, from about 800 mm to about 2500 mm, from about 900 mm to about 2500 mm, or from about 1000 mm to about 2500 mm), and a $CT_{curved-max}$ magnitude of about 250 MPa or less (e.g., about 225 MPa or less, 200 MPa or less, 175 MPa or less, 150 MPa or less, 125 MPa or less, 100 MPa or less, 90 MPa or less, 80 MPa or less, 75 MPa or less, 70 MPa or less, 65 MPa or less, 60 MPa or less, 55 MPa or less or about 50 MPa or less).

The curved glass article of one or more embodiments, further comprises a frame, a display or touch panel disposed on the first or second major surface. In one or more specific embodiments, the curved glass article includes an adhesive disposed between the first or second major surface and the frame, display or touch panel. In one or more embodiments, the display may be liquid crystal display, an OLED display or the like.

Figure 5:
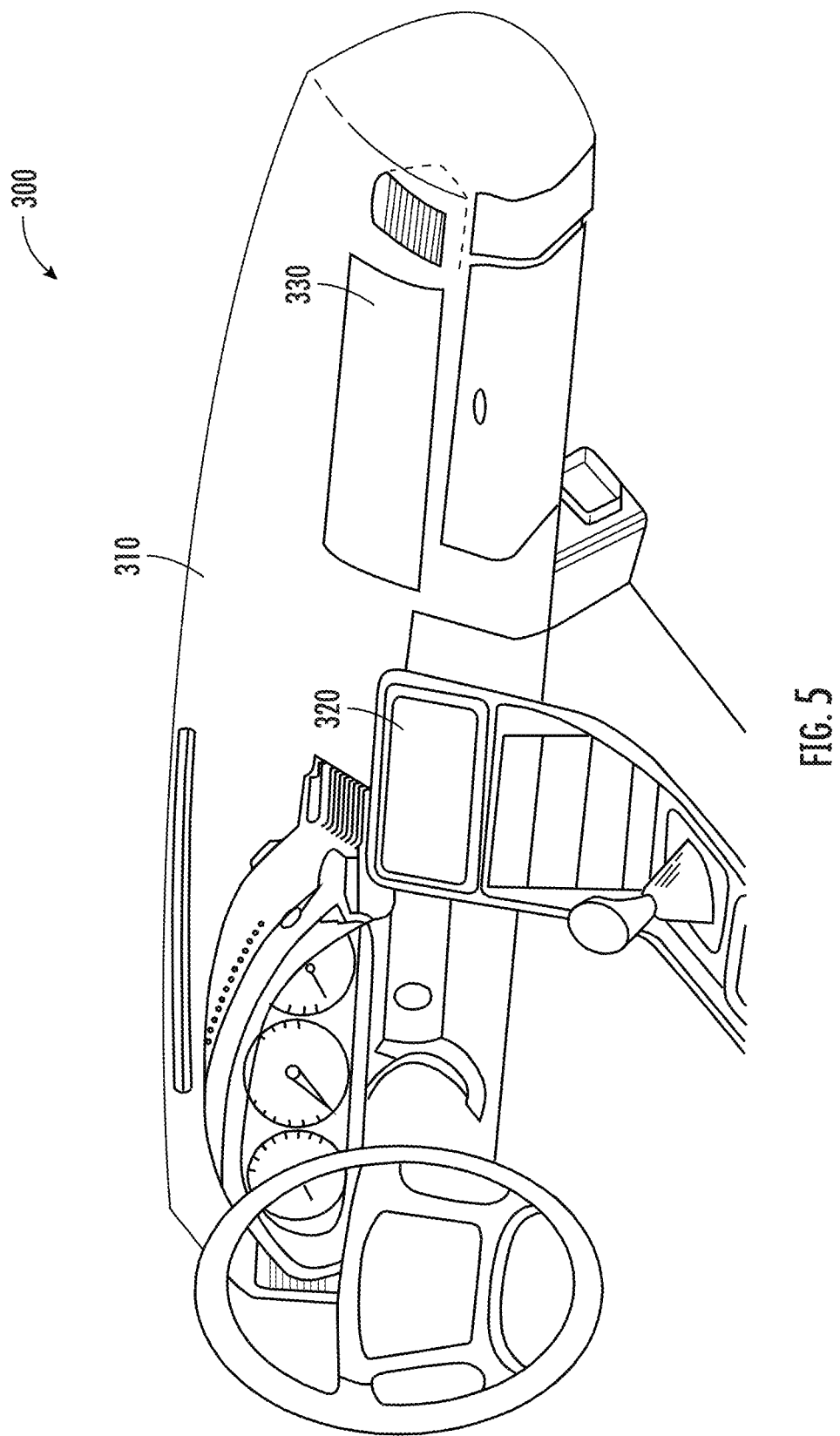
FIG. 5 is a perspective view of an automotive interior system according to one or more embodiments.

A third aspect of this disclosure pertains to an automotive interior system. As shown in FIG. 5, the automotive interior system 300 of one or more embodiments includes a base 310; and a glass article 320 or a curved glass article 330 disposed on the base. The automotive interior system may include a glass article according to one or more embodiments of the glass article according to the first aspect, or the curved glass article according to the second aspect. In one or more embodiments, the automotive interior system exhibits superior headform impact performance. For example, when an impactor having a mass of 6.8 kg impacts the first major surface of the glass article at an impact velocity of 5.35 m/s to 6.69 m/s, the deceleration of the impactor is 120 g (g-force) or less. The base 310 may include a dashboard, an arm rest, a pillar, a seat back, a floor board, a headrest, a door panel, or any portion of an automotive interior. In one or more embodiments, the deceleration of the impactor is not greater than 80 g for any 3 ms interval over a time of impact. In one or more embodiments of the automotive interior system, when the impactor breaks the glass article, the glass article ejects particles having a maximum dimension of 1 mm or less at a distance of 10 mm or less or about 5 mm or less from the glass article.

In one or more embodiments of the automotive interior system including curved glass article, the base may be curved and have a radius of curvature that is within 10% of the maximum radius of curvature of the curved glass article. In one or more embodiments the base may be substantially flat.

The automotive interior system may include a frame, touch panel, and/or display disposed between the glass article and the base. Optionally, the system may include a housing that at least partially surrounds the second major surface of the glass article and the minor surface. In one or more embodiments, the housing may partially surround the frame. The frame and/or housing, if used, may be formed from a stiff plastic material or a metal (e.g., steel, steel alloy, magnesium, magnesium alloy, aluminum, aluminum alloy or any other known metal used in the automotive industry or an alloy thereof). In one or more embodiments, the frame and/or housing material may be stiffened by including ribs or other structures to provide increased stiffness to eth frame and/or housing. In one or more embodiments, the automotive interior system includes an adhesive or other fastener between the glass article and a frame. The automotive interior system may include an adhesive between the glass article and the display and/or touch panel.

In one or more embodiments, the automotive interior system includes a base, and a glass article 310 disposed on the base with the second major surface adjacent the base, wherein, when an impactor having a mass of 6.8 kg impacts the first major surface at an impact velocity of 5.35 m/s to 6.69 m/s, the glass article is elastically deformed. As used herein, the phrase "elastically deformed" means the glass article experiences a temporary shape change that is self-reversing after the impact force is removed, such that the glass article returns to its original shape. In one or more embodiments, the deceleration of the impactor is 120 g (g-force) or less or is not greater than 80 g for any 3 ms interval over a time of impact.

In one or more embodiments, the automotive interior system includes a frame disposed between the glass article and the base, wherein when the impactor impacts the first major surface, a portion of the frame is plastically deformed. In one or more embodiments, the automotive interior system includes a housing disposed between the glass article and the base that at least partially encloses the second major surface and the minor surface, wherein, when the impactor impacts the first major surface, a portion of the housing is plastically deformed.

As used herein, phrase "plastically deformed" means permanent deformation of the material due to stress or impact. In instances of glass materials, such materials are brittle enough such that plastic deformation leads to fracture or breakage. Accordingly, in one or more embodiments, the glass article experiences only elastic deformation and not plastic deformation. In one or more embodiments, the plastic deformation of the frame and/or housing locally, elastically deforms the glass article. In one or more embodiments, such elastic deformation may be held permanently by the adhesive between the frame and the glass article (though the glass article itself does not experience plastic deformation). Such behavior may be observed by removing the glass article from the frame and observing the temporary nature of the shape change to the glass article caused by the plastically deformed frame. Such behavior may also be observed by measuring the stress on the first major surface and the second major surface of the glass articles, which should have different compressive stress values. In such evaluations, the glass article may be described as being cold-bent by the plastic deformation of the frame. In one or more embodiments, a portion of the glass article adjacent the plastically deformed portion of the frame or housing has a radius of curvature that is less than the radius of curvature of the glass article before impact. In one or more embodiments, the first or second major surface of the glass article comprises a plurality of radii of curvature (as measured along such major surface). In one or more embodiments, the plurality of radii of curvature are about 20 mm or greater (as described herein). In one or more embodiments, the glass article comprises a periphery adjacent the minor edge and a center, and wherein the periphery comprises a radius of curvature that is less than a radius of curvature at the center.

In one or more embodiments, the first or second major surface of the glass article comprises a concavely curved portion adjacent a convexly curved portion. The concavely curved portion and the convexly curved portion comprise a radius of curvature of about 20 mm or greater (as described herein). In one or more embodiments, the glass article comprises a periphery adjacent the minor edge and a center, and wherein the periphery comprises one of the convexly curved portion and the concavely curved portion, and the center comprises the other of the convexly curved portion and the concavely curved portion.

In one or more embodiments, the automotive interior system includes a frame, and a curved glass article 320 disposed on the frame with the second major surface adjacent the frame, wherein, when an impactor having a mass of 6.8 kg impacts the first major surface at an impact velocity of 5.35 m/s to 6.69 m/s, the glass article is elastically deformed. In one or more embodiments, the deceleration of the impactor is 120 g (g-force) or less or is not greater than 80 g for any 3 ms interval over a time of impact. In one or more embodiments, when the impactor impacts the first major surface, a portion of the frame is plastically deformed. In one or more embodiments, the automotive interior system includes a housing, wherein the frame is disposed between the glass article and the housing and the housing at least partially encloses the frame, the second major surface and the minor surface, wherein, when the impactor impacts the first major surface, a portion of the housing is plastically deformed.

In one or more embodiments, the plastically deformed portion of the frame or housing locally elastically deforms the glass article 320. In one or more embodiments, at least a portion of the glass article adjacent the plastically deformed portion of the frame or housing has a radius of curvature that is less than the radius of curvature of the glass article before impact. In one or more embodiments, the first or second major surface comprises a plurality of radii of curvature (which may be about 20 mm or greater, as described herein). In one or more embodiments, glass article 320 comprises a periphery adjacent the minor edge and a center, and wherein the periphery comprises a radius of curvature that is less than a radius of curvature at the center.

In one or more embodiments, the first or second major surface comprises a concavely curved portion adjacent a convexly curved portion. In one or more embodiments, the concavely curved portion and the convexly curved portion comprise a radius of curvature of about 20 mm or greater. In one or more embodiments, the glass article 320 comprises a periphery adjacent the minor edge and a center, and wherein the periphery comprises one of the convexly curved portion and the concavely curved portion, and the center comprises the other of the convexly curved portion and the concavely curved portion. In one or more embodiments, the frame is curved and has a radius of curvature that is within 10% of the maximum radius of curvature.

A fourth aspect of this disclosure pertains to a method for forming a glass article. In one or more embodiments, the method includes strengthening a glass sheet having a first major surface, a second major surface, and a minor surface connecting the first major surface and the second major surface defining a thickness (t) to provide a first strengthened glass article as described herein in accordance with one or more embodiments. In one or more embodiments, strengthening the glass sheet comprises chemically strengthening the glass sheet. Chemically strengthening the glass sheet may include immersing the glass sheet in a molten salt bath of $KNO_3$, $NaNO_3$ or a combination of $KNO_3$ and $NaNO_3$, having a temperature in a range from about 310° C. to about 450° C., for a duration of from about 2 hours to about 40 hours to provide a strengthened glass article. In some embodiments, chemically strengthening the glass sheet comprises immersing the strengthened glass article (after immersion in a first molten salt bath) in a second a molten salt bath of $KNO_3$, $NaNO_3$ or a combination of $KNO_3$ and $NaNO_3$, having a temperature in a range from about 310° C. to about 450° C., for a duration of from about 2 hours to about 40 hours. Without being bound by theory, it is believed that ion exchanging the glass sheet in two successive molten salt baths provides a stress profile with a greater CSmax, while maintaining a near constant DOL value, when compared to glass sheets that are ion exchanged in a single molten salt bath.

In one or more embodiments, one or both of the molten salt baths includes an additional salt that may be one or more of: $K_2CO_3$, $Na_2CO_3$, $K_3PO_4$, $Na_3PO_4$, $K_2SO_4$, $Na_2SO_4$, $K_3BO_3$, $Na_3BO_3$, KCl, NaCl, KF, and NaF. The additional salt is added to a conventional molten salt bath (e.g., nitrates such as $KNO_3$ and/or $NaNO_3$) as a dissolved liquid solute so that the ion exchange process is carried out and IOX efficiency can be enhanced. The selection of the additional salt(s) and how to use them may be guided by thermochemical calculations of a molten nitrate salt of a metal ion with an additional salt of the same metal ion but differing anion. Two factors can be obtained from this thermochemical calculation. One factor is solubility of a salt in the molten nitrate salt, which determines an upper limit of the additional salt in the molten nitrate salt solution. A second factor is a ratio of oxide activities ($a_{K2O}/a_{Na2O}$) where $a_{K2O}$ and $a_{Na2O}$ are the activities of $K_2O$ and $Na_2O$, respectively. The ratio of oxide activities ($a_{K2O}/a_{Na2O}$) can be used as a merit parameter to measure the IOX efficiency of $K^+ \leftrightarrow Na^+$ ion exchange of a salt solution.

In one or more embodiments, the method includes curving the strengthened glass article to have a curved configuration. In one or more embodiments, the curved configuration is permanent.

In one or more embodiments, the method includes affixing a frame, display or touch panel to the glass article or curved glass article as described herein to provide a module; and affixing the module to a base of an automotive interior system. In one or more embodiments, affixing the frame, display or touch panel to the glass article comprises curving the glass article before affixing the display or touch panel to the curved glass article. In one or more embodiments, affixing the frame, display or touch panel to the glass article comprises curving the glass article simultaneously with affixing the display or touch panel to the curved glass article. In one or more embodiments, a portion of the first major surface of the curved glass article comprises a concave surface and the opposing portion of the second major surface comprises a convex surface.

In one or more embodiments, the method includes affixing the frame, display or touch panel to the first major surface. and optionally, affixing the frame, display or touch panel to the second major surface. In one or more embodiments, the method includes disposing an adhesive layer between the curved glass article and the frame, display or touch panel.

EXAMPLES

Various embodiments will be further clarified by the following examples.

Example 1

Figure 6A:
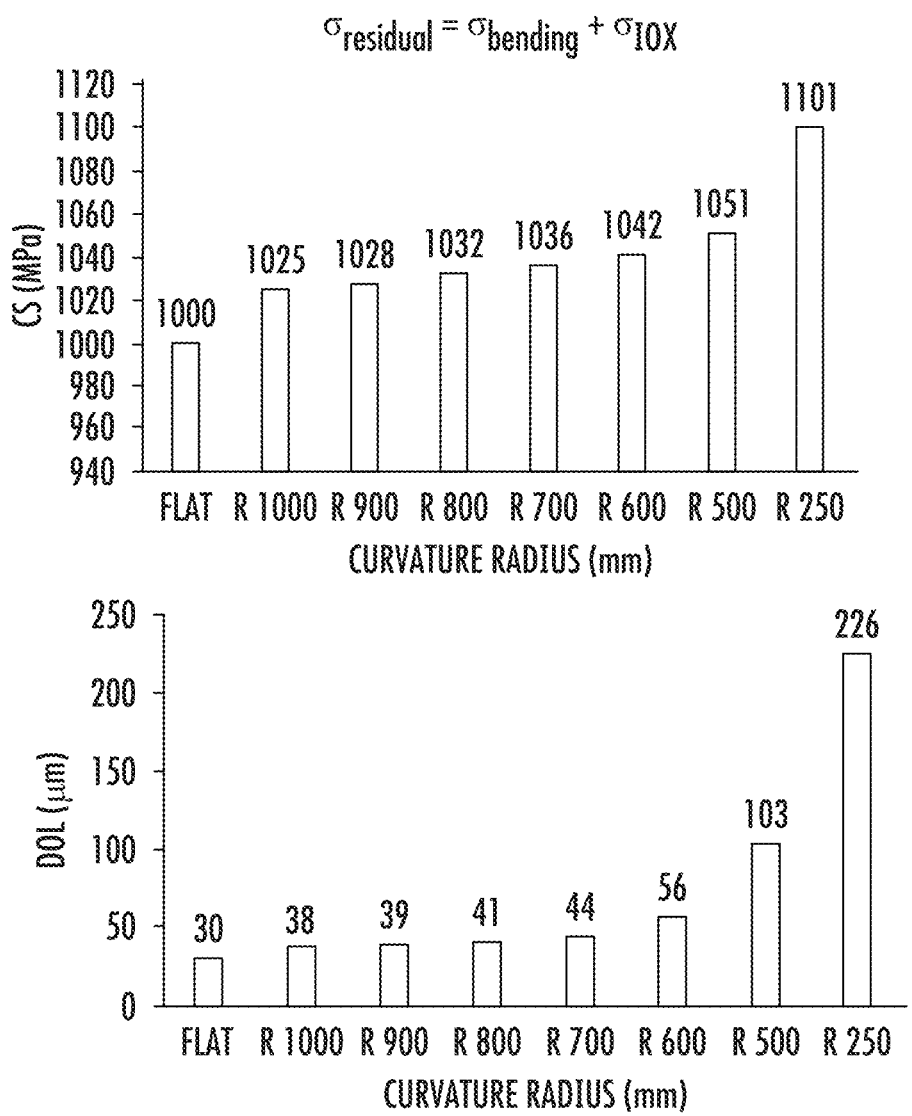
FIGS. 6A and 6B are bar charts showing measured maximum compressive stress and depth of layer values for a strengthened glass article of Example 1, after cold-bending to various radii of curvature.
Figure 6B:
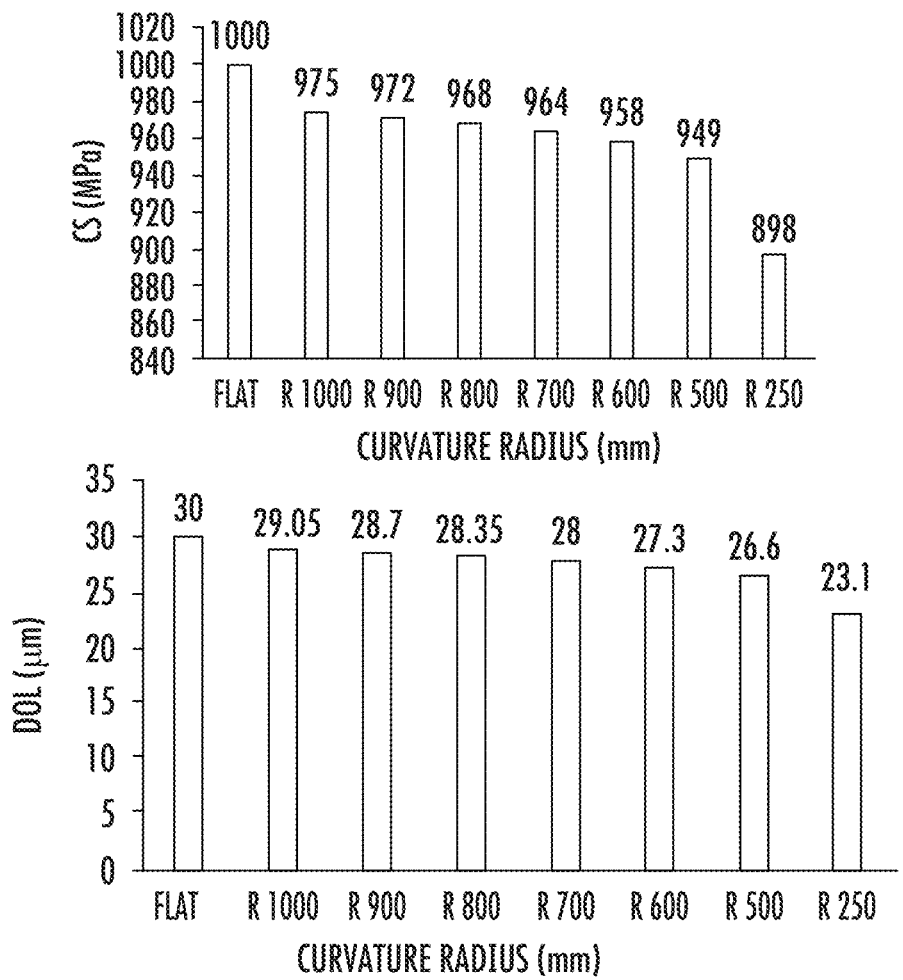

A glass article having a thickness of 0.7 mm was chemically strengthened to exhibit a CSmax of about 1000 MPa and a DOL of about 30 micrometers by immersing in a single molten salt bath. The strengthened glass article was then cold-bent to exhibit various radii of curvature. The maximum CS was measured at the first major concave surface and the second major convex surface for each radius of curvature. In addition, the DOL was measured from the first major concave surface and the second major convex surface. The measured CS and DOL values for each radius of curvature, are shown the table in FIGS. 6A and 6B. When the glass article is cold-bent, the DOL increases significantly with decreasing radius of curvature on the first major concave surface; however, the DOL on the second major convex surface does not decrease significantly for the same radius of curvature. In particular, the DOL on the first major concave surface more than doubles when the glass article is cold bent from a radius of curvature of 500 mm to 250 mm. The DOL on the second major convex surface only decreases by slightly more than 10% when the glass article is cold-bent from a radius of curvature of 500 mm to 250 mm.

Figure 6C:
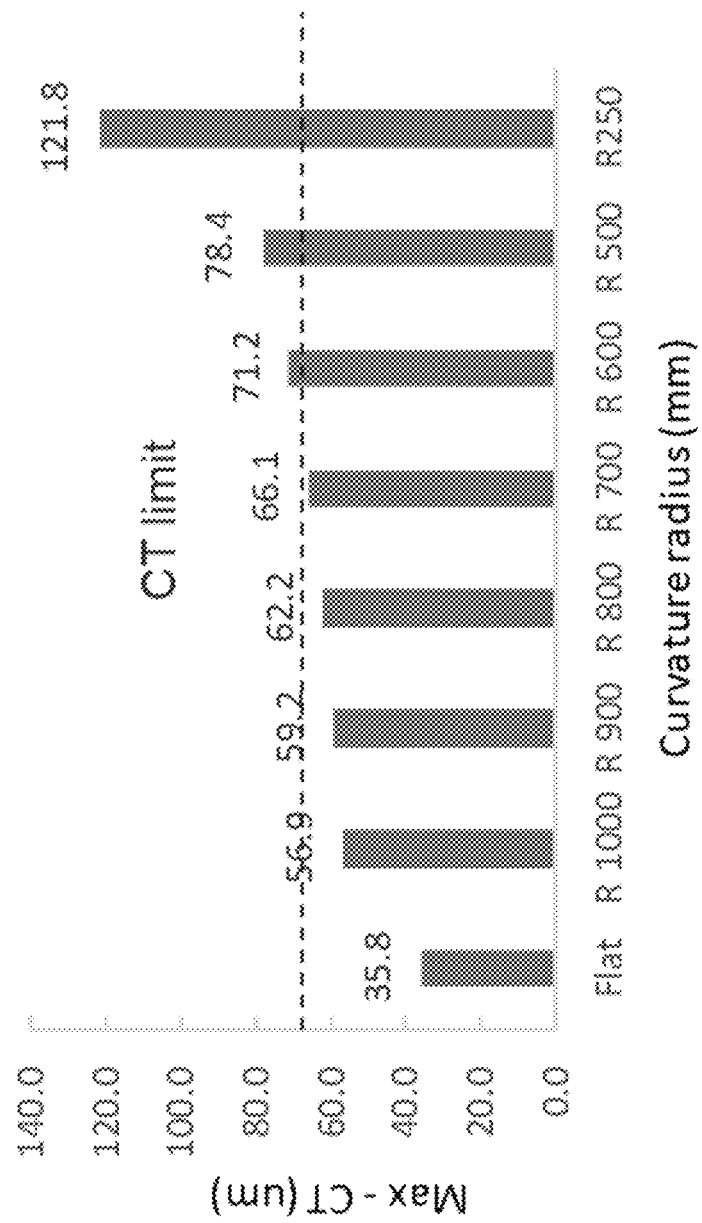
FIG. 6C is a bar chart showing the measured maximum central tension of the strengthened glass article of FIGS. 6A and 6B.

The CTmax was also measured at the various radii of curvature. As shown in FIG. 6C, the CTmax increases with decreasing radius of curvature. At radius of curvatures of 600 mm or greater, the CTmax is maintained below about 70 MPa, which, without being bound by theory, is believed to result in superior headform impact performance.

Example 2

Figure 7:
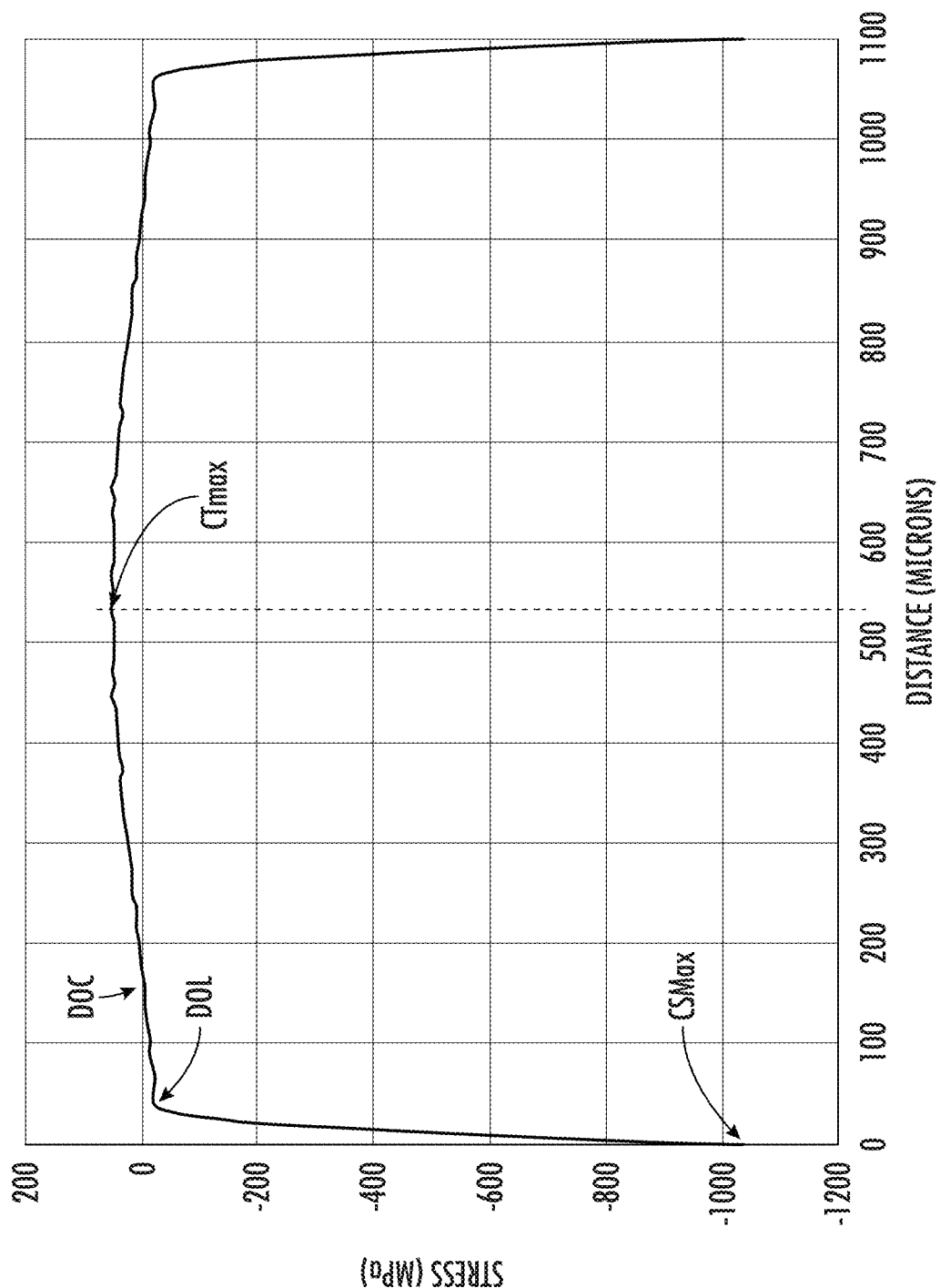
FIG. 7 is a graph showing the stress profile of the glass article of Example 2.

A glass article having a thickness of 1.1 mm and a glass composition of about 63.6 mol % SiO2, 15.7 mol % Al2O3, 10.8 mol % Na2O, 6.24 mol % Li2O, 1.16 mol % ZnO, 2.5 mol % P2O5 and 0.04 mol % SnO2 was chemically strengthened in a two-step ion exchange process. The glass article was first immersed in a first molten salt bath having a composition of 75% KNO3 and 25% NaNO3 and a temperature of 430° C. for 8 hours, and then immersed in a second molten salt bath having a composition of 100% KNO3 and temperature of 390° C. for 4 hours. The resulting strengthened glass article exhibited a CSmax of about 1030 MPa and a DOL of about 37 micrometers, a DOC of 165 micrometers, and a CTmax of about 55 MPa. The stress profile of the glass article is shown in FIG. 7. As shown in FIG. 7, CTmax (or $CT_{uncurved-max}$) is located at a depth of about 0.5t. The CT region comprises a parabolic-like shape, as described herein.

The glass article was then cold-bent to exhibit a radius of curvature of 350 mm. The bend induced stress for such a radius of curvature is plotted in FIG. 8. The maximum tensile stress at the major concave surface is 125 MPa. The bend induced stress is given as: $\sigma = \sigma_{max} - (\sigma_{max}/(t/2))$ where $\sigma_{max} = (E/1-v^2)*(t/2)*(1/R)$. In this example, E=76.3 GPa, Poisson's ratio=0.211, t=1.1 mm, R=350 mm.

Figure 8:
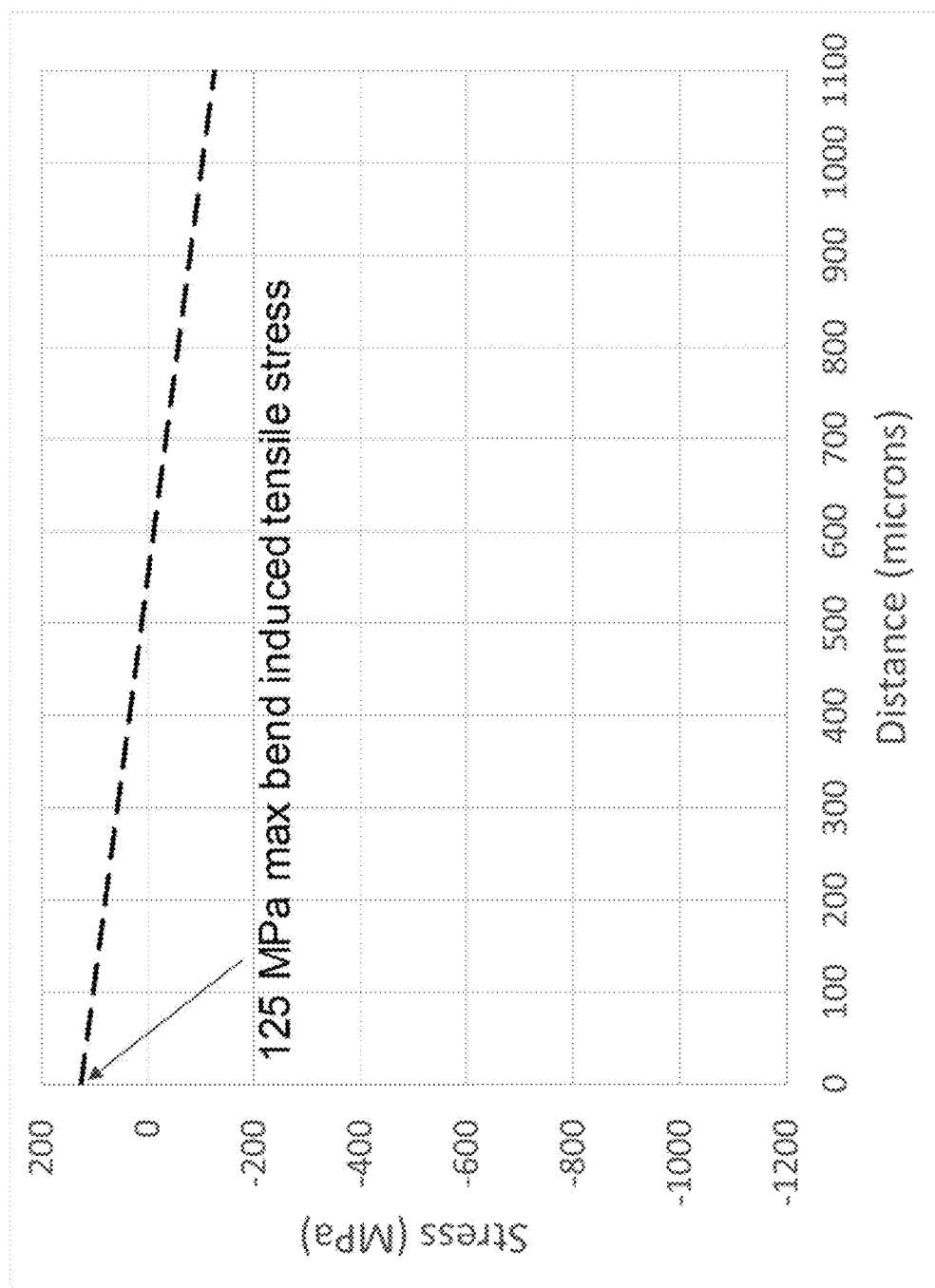
FIG. 8 is a graph showing the bend induced stress for the glass article of Example 2, when bent to a radius of curvature of 350 mm.
Figure 9:
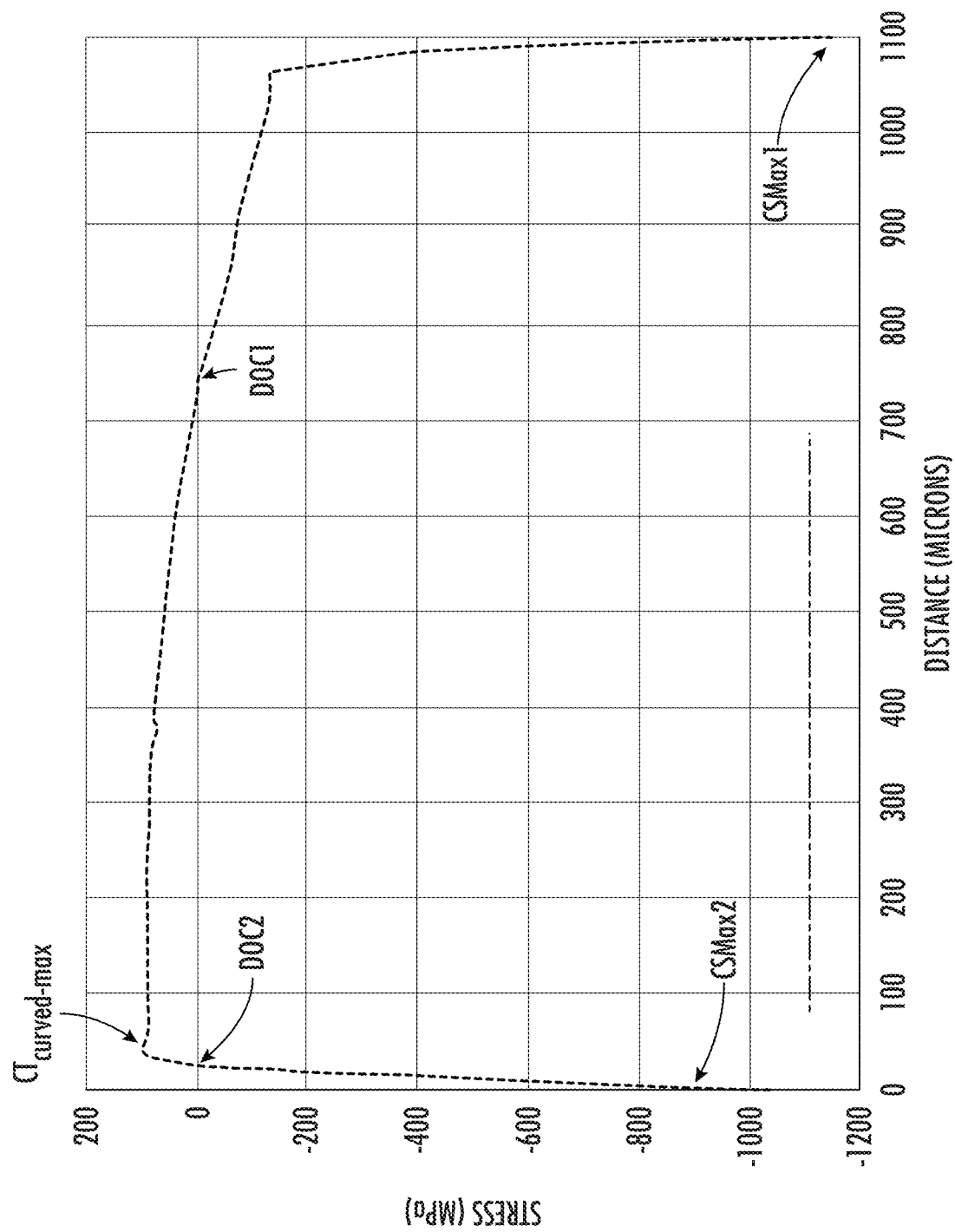
FIG. 9 is the superimposed stress profile of FIG. 7 and the graph of FIG. 8.

In FIG. 9, the stress profile of the glass article from FIG. 7 is superimposed on the bend induced stress plot of FIG. 8. As shown in FIG. 9, the $CT_{curved-max}$ is 99 MPa. The CSmax1 on the concave surface is 1155 MPa, the CSmax2 on the convex surface is 905 MPa. The $DOC_1$ on the concave surface is 377 micrometers and the $DOC_2$ on the convex surface is 27 micrometers.

Comparative Example 3

Figure 10:
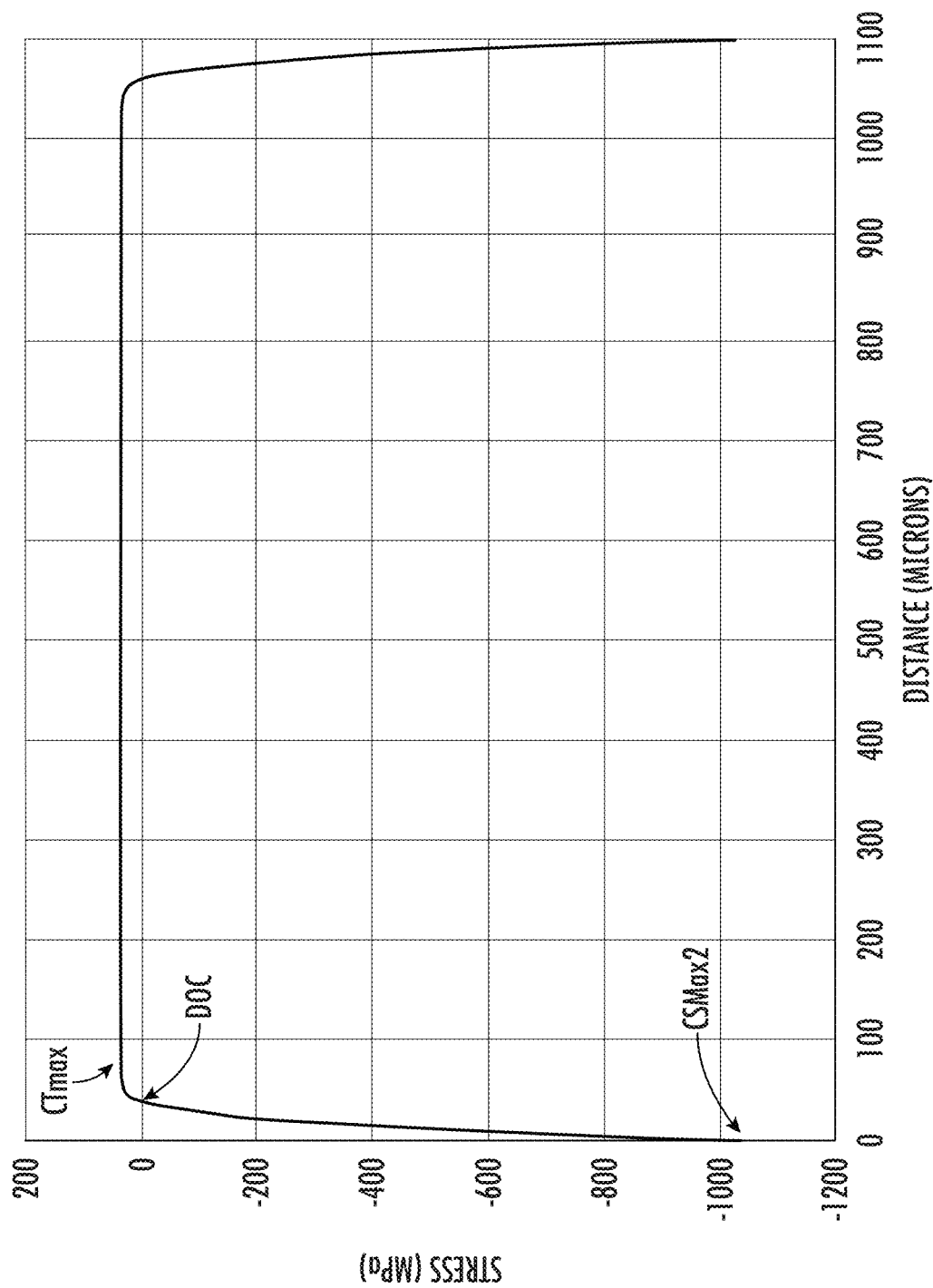
FIG. 10 is a graph showing the stress profile of the glass article of Comparative Example 3.

A glass article having a thickness of 1.1 mm and the same glass composition as Example 2 was chemically strengthened to exhibit a typical error function profile as shown in FIG. 10. As shown in FIG. 10, the CSmax was 1030 MPa, the DOC is 37 micrometers, and the CTmax is 37 MPa and located at a depth of 62 micrometers, which is much closer in location to the first major surface than Example 2.

Figure 11:
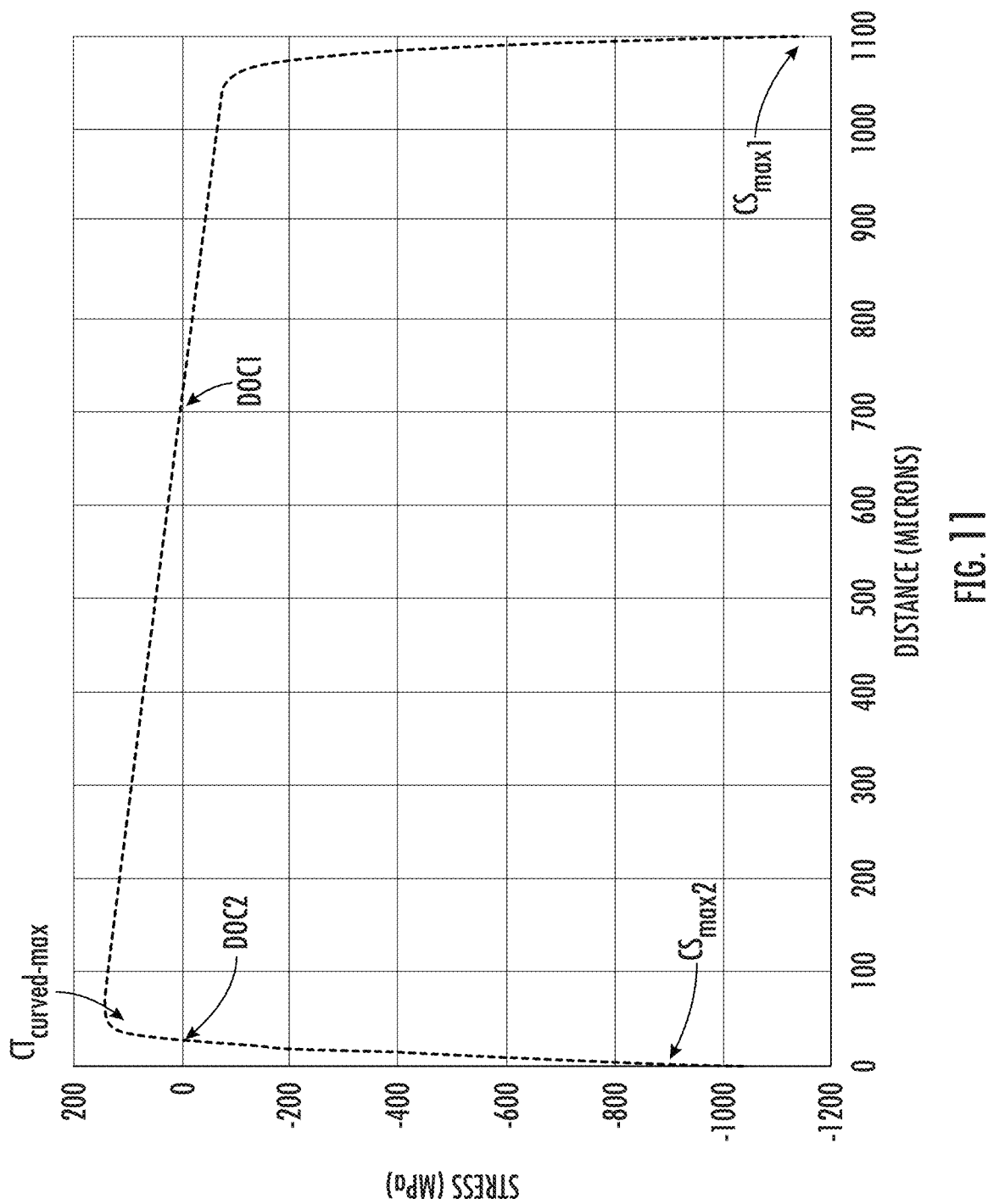
FIG. 11 is the superimposed stress profile of FIG. 10 and the graph of FIG. 8.

The glass article of Comparative Example 3 was cold-bent to a radius of curvature of 350 mm. In FIG. 11, the stress profile of FIG. 10 and the bend induced stress plot of FIG. 8 are superimposed. As shown in FIG. 11, although the CTmax from chemical strengthening is only 37 MPa (as shown in FIG. 10), the resultant $CT_{curved-max}$ following cold-bending is 149 MPa. This resultant $CT_{curved-max}$ value is significantly higher than Example 2 (in FIG. 9). As also shown in FIG. 11, CSmax1 of the first major concave surface was 1155 MPa, and DOC1 of the first major concave surface was 388 micrometers. CSmax2 and DOC2 of the second major convex surface were 905 MPa and 26 micrometers, respectively.

Table 1 shows the $CT_{curved-max}$ for other radii of curvature for Example 2 and Comparative Example 3.

TABLE 1

Comparison of $CT_{curved-max}$ for Example 2 and Comparative Example 3 for various radii of curvature.

| Example 2 | | Comparative Example 3 | |
| --- | --- | --- | --- |
| Radius of curvature (mm) | $CT_{curved-max}$ (MPa) | Radius of curvature (mm) | $CT_{curved-max}$ (MPa) |
| 100 | 391 | 100 | 432 |
| 150 | 255 | 150 | 299 |
| 200 | 181 | 200 | 233 |
| 250 | 146 | 250 | 193 |

TABLE 1-continued

Comparison of $CT_{curved-max}$ for Example 2 and Comparative Example 3 for various radii of curvature.

| Example 2 | | Comparative Example 3 | |
|---|---|---|---|
| Radius of curvature (mm) | $CT_{curved-max}$ (MPa) | Radius of curvature (mm) | $CT_{curved-max}$ (MPa) |
| 300 | 119 | 300 | 167 |
| 350 | 99 | 350 | 149 |
| 400 | 85 | 400 | 134 |
| 450 | 70 | 450 | 123 |

Figure 12:
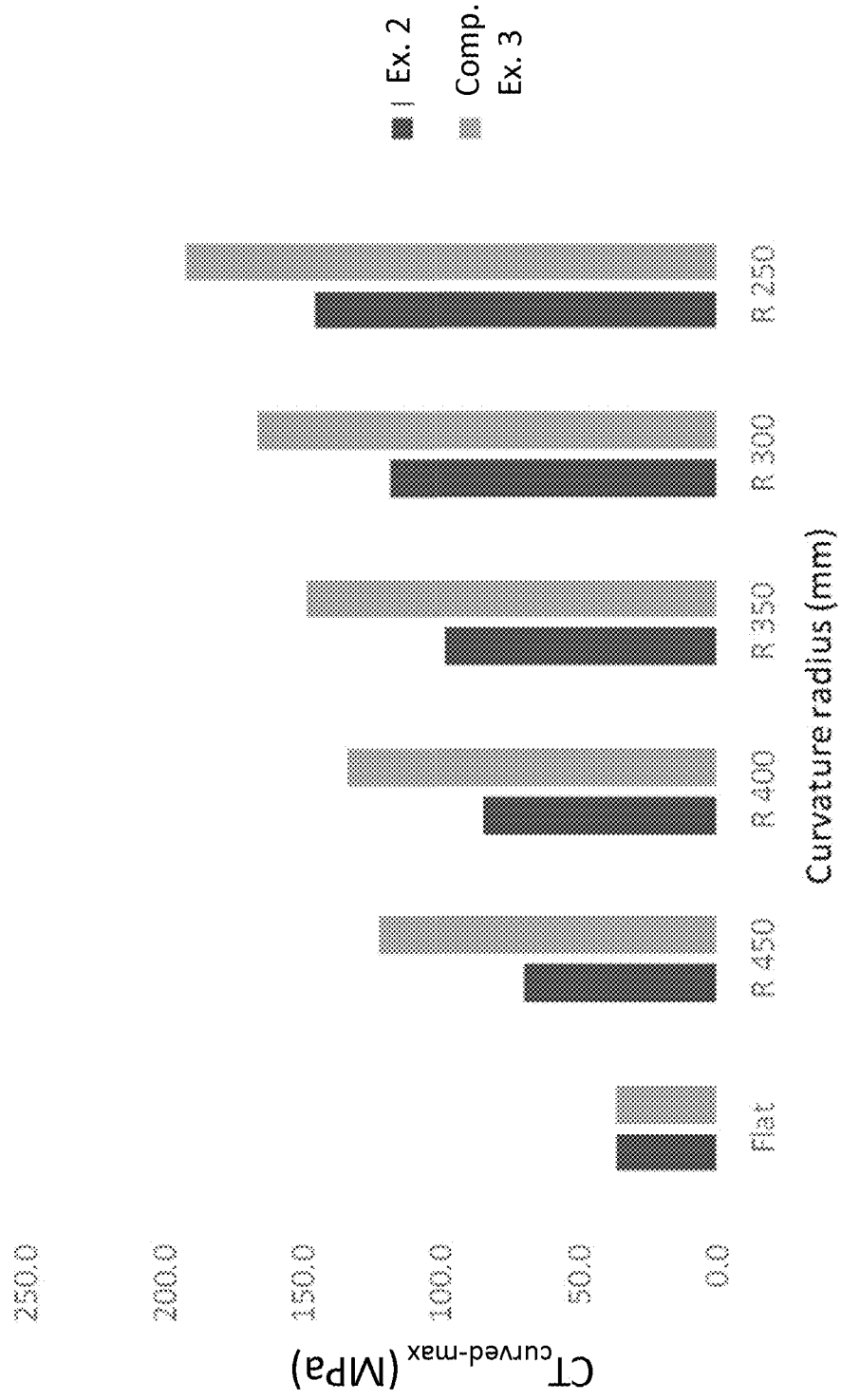
FIG. 12 is a graph comparing the $CT_{curved-max}$ values of Example 2 and Comparative Example 3 for various radii of curvature.

FIG. 12 is a bar chart comparing the CTcurved-max values for Example 2 and Comparative Example 3 for each radius of curvature of Table 1.

As shown in FIG. 12, the strengthened glass articles of Example 2 exhibit a stress profile that maintains CTcurved-max values at lower levels after the glass-article is cold-bent. This permits the glass articles to be shaped into curved shapes having a lower radius of curvature, while maintaining headform impact performance.

Example 4

Figure 13:
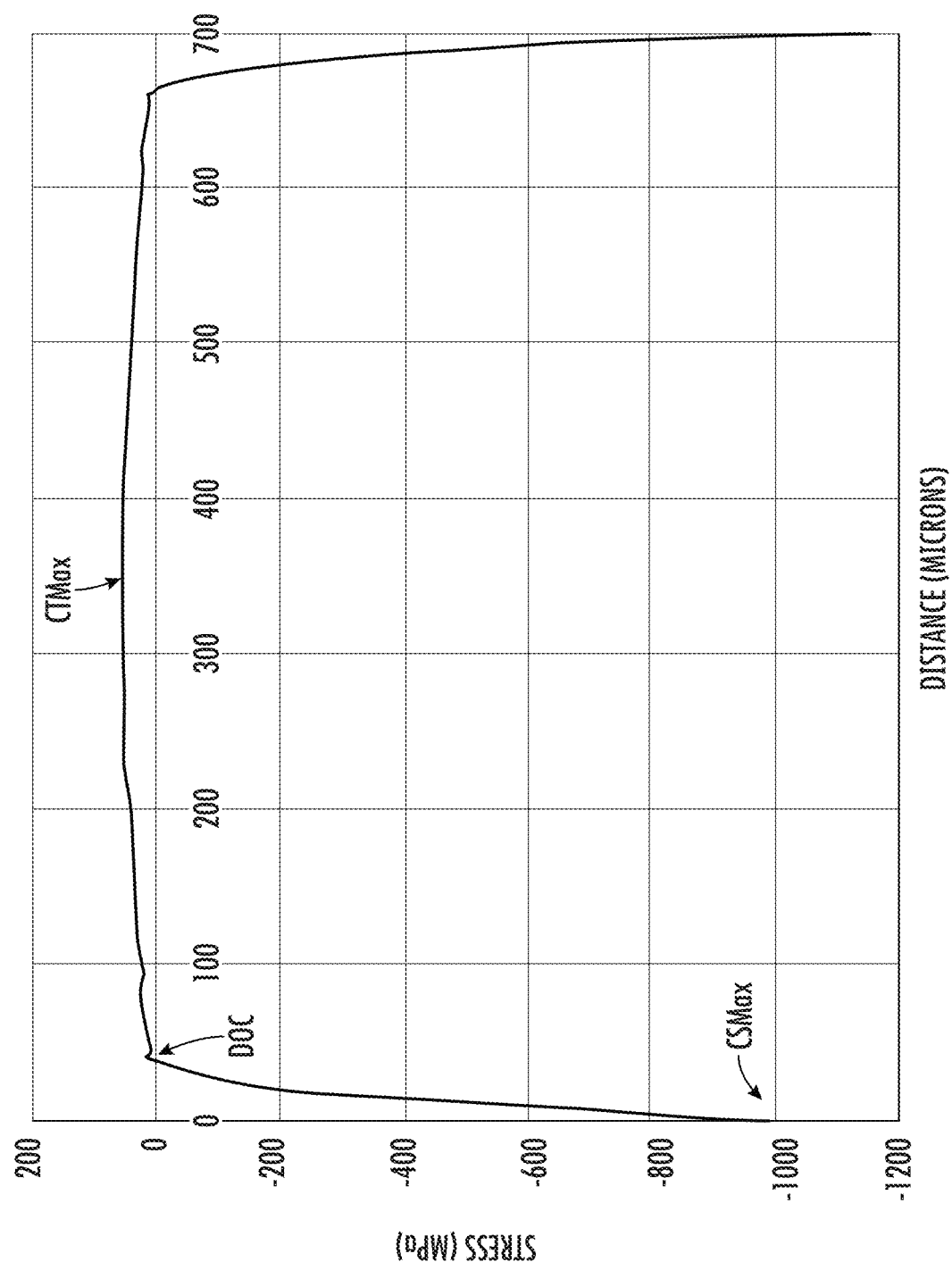
FIG. 13 is a graph showing the stress profile of the glass article of Example 4.

A glass article having a thickness of 0.7 mm and the same glass composition as Example 2 was chemically strengthened in the same two step ion exchange process as Example 2. The resulting strengthened glass article exhibited a CSmax of about 970 MPa and a DOC of about 39 micrometers and a CTmax (or CTuncurved-max) of 53 MPa. The stress profile is shown in FIG. 13. As shown in FIG. 13, the stress profile includes a tail that extends into the center tension region; however, the parabolic-like shape of the stress profile is maintained such that $CT_{max}$ is located at a depth approaching about 0.5t.

The glass article was then cold-bent to exhibit a radius of curvature of 250 mm. The bend induced stress for such a radius of curvature is plotted in FIG. 14. The maximum tensile stress at the major concave surface is 112 MPa. The bend induced stress is given as: $\sigma=\sigma_{max}-(\sigma_{max}/(t/2))$ where $\sigma_{max}=(E/1-v^2)*(t/2)*(1/R)$. In this example, E=76.3 GPa, Poisson's ratio=0.211, t=1.1 mm, R=250 mm.

Figure 14:
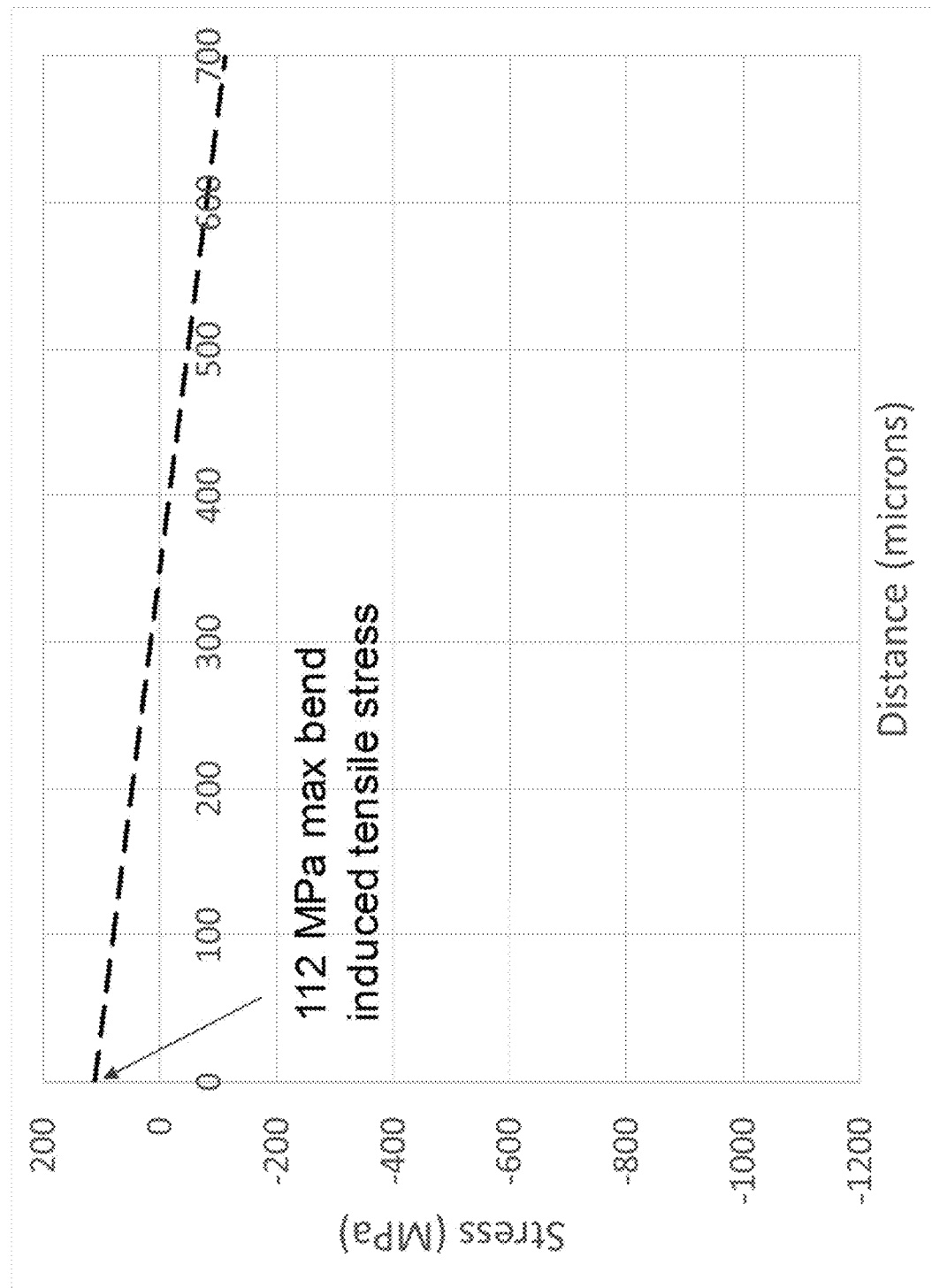
FIG. 14 is a graph showing the bend induced stress for the glass article of Example 4, when bent to a radius of curvature of 250 mm.
Figure 15:
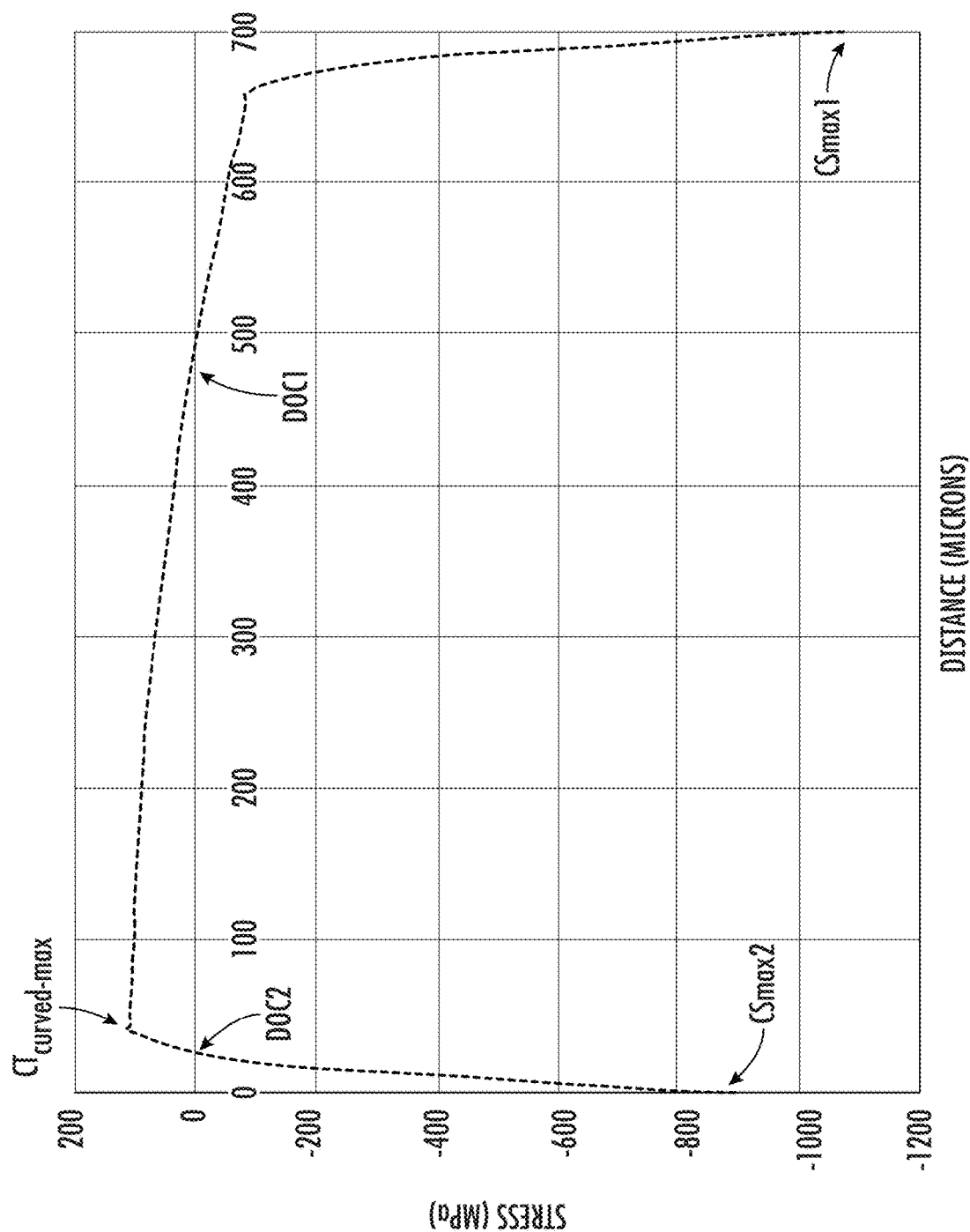
FIG. 15 is the superimposed stress profile of FIG. 13 and the graph of FIG. 14.

In FIG. 15, the stress profile of the glass article from FIG. 13 is superimposed on the bend induced stress plot of FIG. 14. As shown in FIG. 15, the $CT_{curved-max}$ is 112 MPa. The CSmax1 on the concave surface is 1082 MPa, the CSmax2 on the convex surface is 858 MPa. The DOC1 on the concave surface is 216 micrometers and the DOC2 on the convex surface is 26 micrometers.

Comparative Example 5

Figure 16:
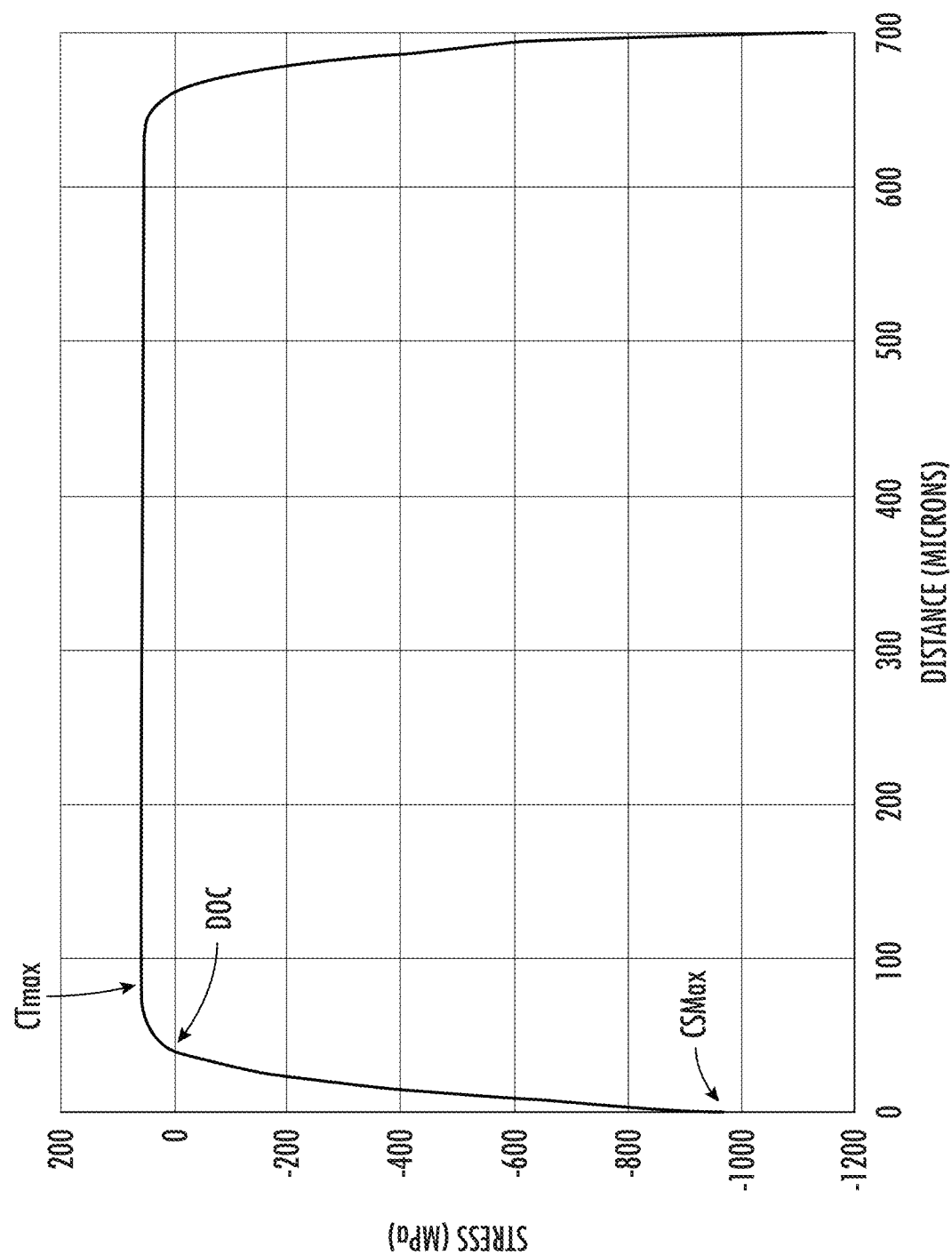
FIG. 16 is a graph showing the stress profile of the glass article of Comparative Example 5.

A glass article having a thickness of 0.7 mm and the same glass composition as Example 2 was chemically strengthened to exhibit a typical error function profile as shown in FIG. 16. As shown in FIG. 16, the CSmax was 970 MPa, the DOC was 39 micrometers, and the CTmax was 60 MPa and located at a depth of 80 micrometers, which is much closer in location to the first major surface than Example 4.

Figure 17:
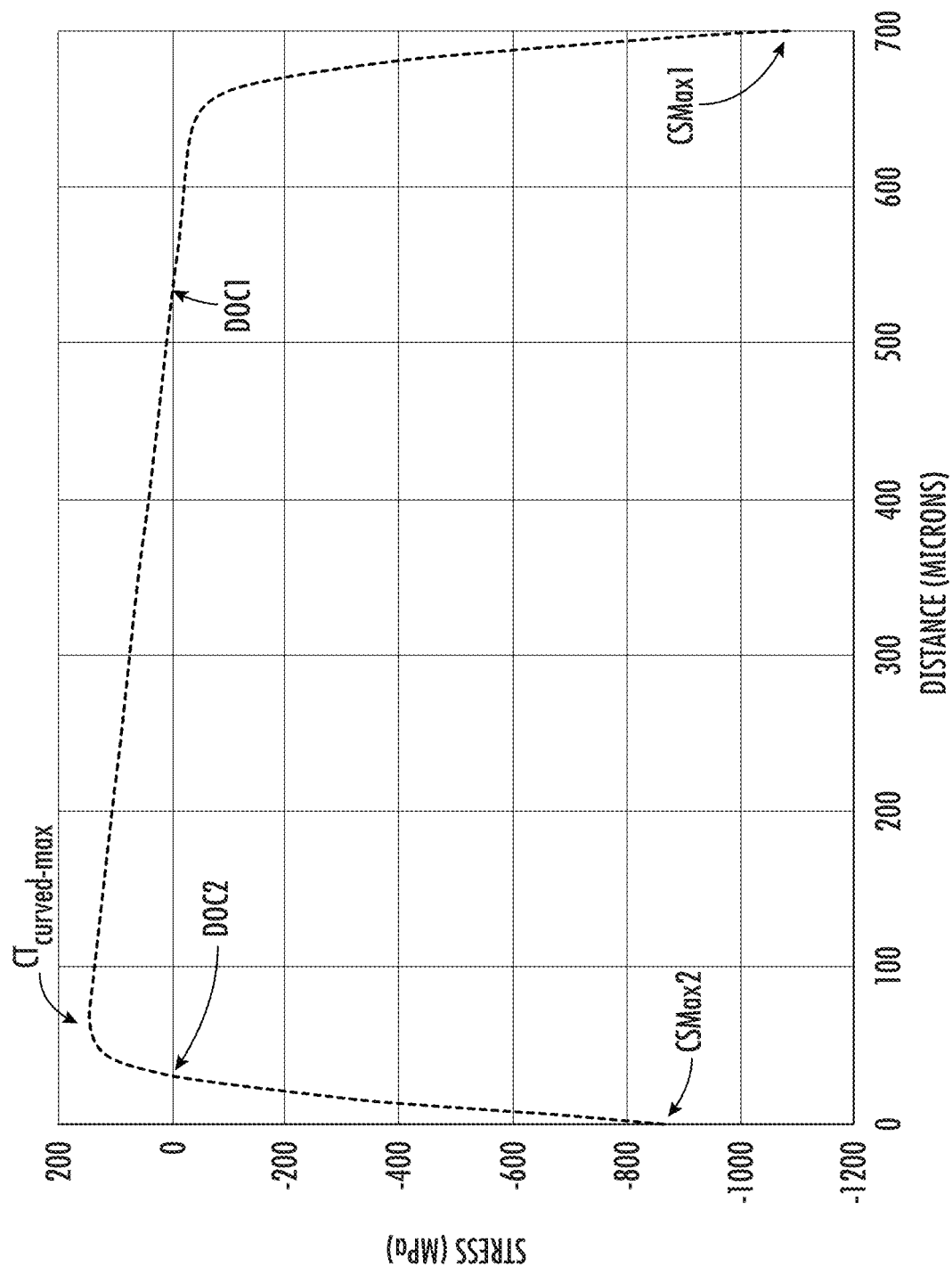
FIG. 17 is the superimposed stress profile of FIG. 16 and the graph of FIG. 14.

The glass article of Comparative Example 5 was cold-bent to a radius of curvature of 250 mm. In FIG. 17, the stress profile of FIG. 16 and the bend induced stress plot of FIG. 14 are superimposed. As shown in FIG. 17, although the CTmax from chemical strengthening is only 60 MPa (as shown in FIG. 16), the resultant $CT_{curved-max}$ following cold-bending is 149 MPa. This resultant $CT_{curved-max}$ value is significantly higher than Example 4 (in FIG. 15). As also shown in FIG. 17, CSmax1 of the first major concave surface was 1082 MPa, and DOC1 of the first major concave surface was 162 micrometers. CSmax2 and DOC2 of the second major convex surface were 858 MPa and 29 micrometers, respectively.

Table 2 shows the $CT_{curved-max}$ for other radii of curvature for Example 4 and Comparative Example 5.

TABLE 2

Comparison of $CT_{curved-max}$ for Example 4 and Comparative Example 5 for various radii of curvature.

| Example 4 | | Comparative Example 5 | |
|---|---|---|---|
| Radius of curvature (mm) | $CT_{curved-max}$ (MPa) | Radius of curvature (mm) | $CT_{curved-max}$ (MPa) |
| 100 | 259 | 100 | 288 |
| 150 | 178 | 150 | 211 |
| 200 | 136 | 200 | 172 |
| 250 | 112 | 250 | 149 |
| 300 | 95 | 300 | 134 |
| 350 | 84 | 350 | 123 |
| 400 | 75 | 400 | 115 |
| 450 | 68 | 450 | 109 |

As shown in Table 2, the strengthened glass articles of Example 4 exhibit a stress profile that maintains CTcurved-max values at lower levels after the glass-article is cold-bent. This permits the glass articles to be shaped into curved shapes having a lower radius of curvature, while maintaining headform impact performance.

Figure 18:
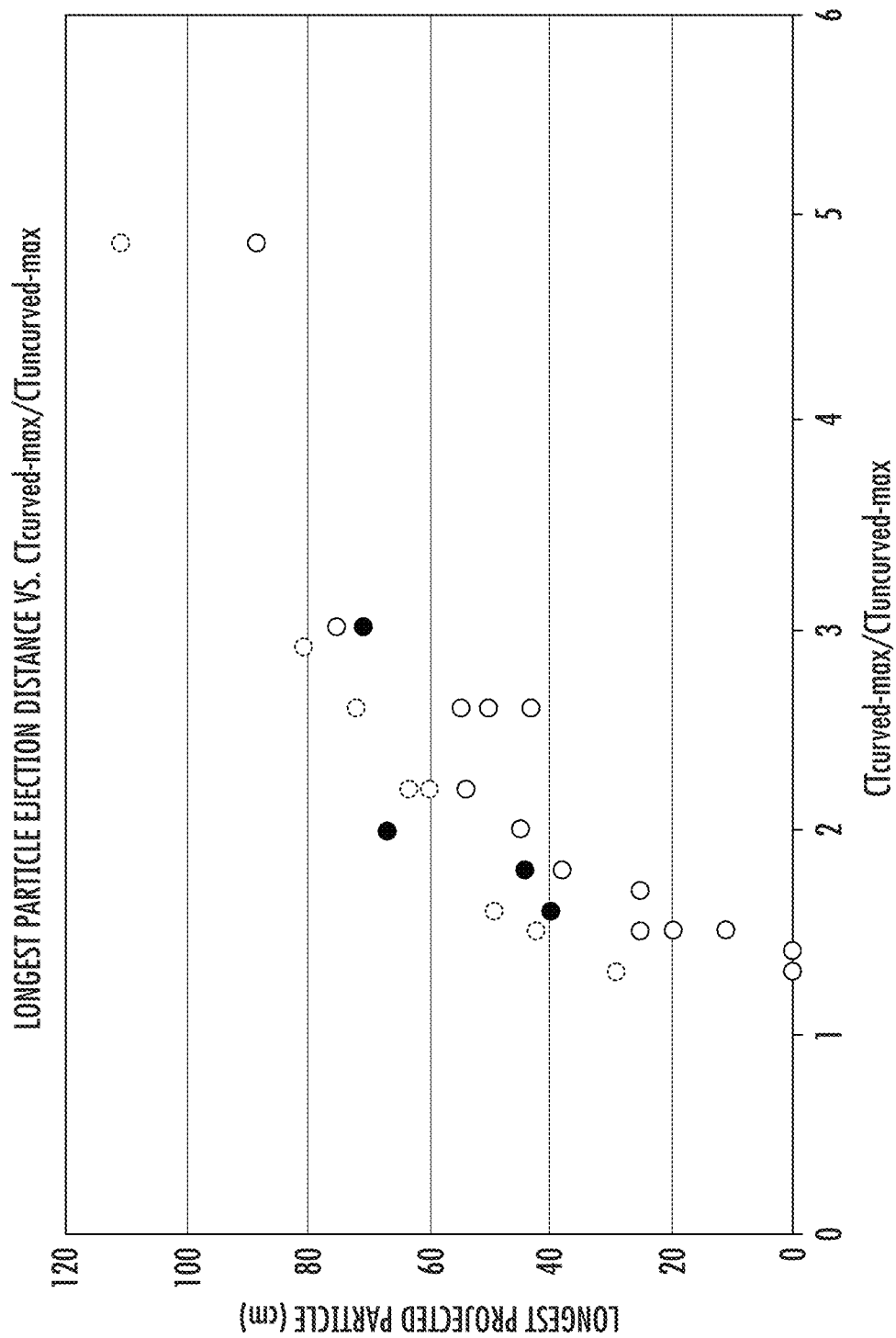
FIG. 18 is a graph comparing the longest distance of particle projection of glass articles exhibiting various CTcurved-max/CTuncurved-max ratios.

FIG. 18 is a graph comparing the longest distance of particle projection of glass articles exhibiting various CTcurved-max/CTuncurved-max ratios. FIG. 18 shows that the stress profiles according to the embodiments described herein have improved headform impact performance. The longest distance of particle projection is a proxy for headform impact test. The longer a particle is ejected, the higher the CTcurved-max. Higher CTcurved-max values indicate poor headform impact performance. Higher CTcurved-max values indicate that when the glass article is impacted in a headform impact test, the glass will break and thus fail the test. As shown in FIG. 18, the open markers all have stress profiles according to the embodiments described herein and exhibited shorter particle projection distances than the corresponding solid markers, indicating known error-function stress profiles.

Example 6

Figure 19:
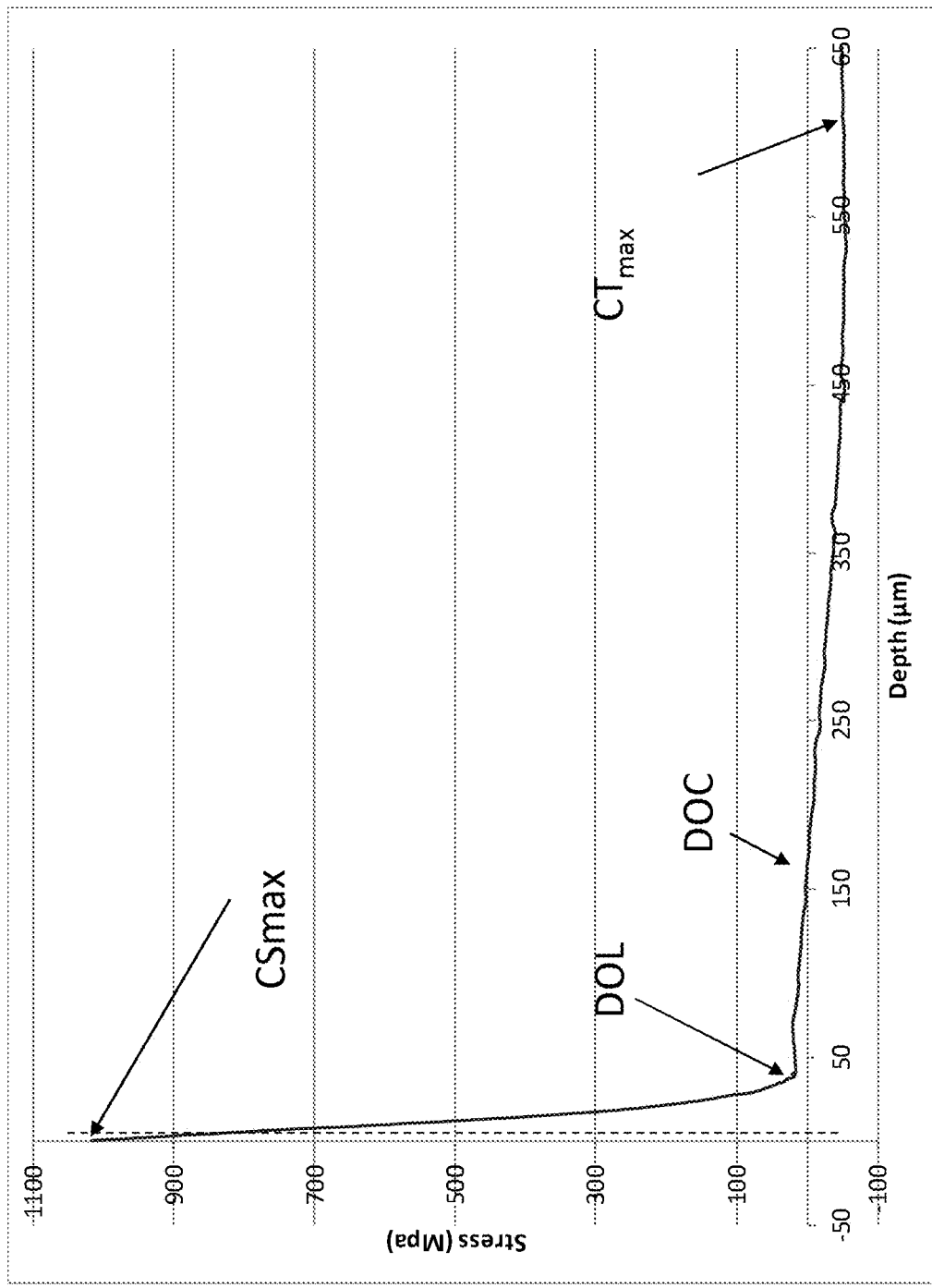
FIG. 19 is a graph showing the stress profile of Example 6.

A glass article having a thickness of 1.1 mm and the same glass composition as Example 2 was chemically strengthened by immersing in a first bath having a composition of 75% KNO3 and 25% $NaNO_3$ and bath temperature of 430° C. for 8 hours, followed by immersing in a second bath having a composition of 100% $KNO_3$ and bath temperature of 390° C. for 4 hours. The chemically strengthened glass article exhibited a stress profile as shown in FIG. 19 (when flat or in a non-cold-bent configuration), which was calculated after measuring various stress profile attributes using RNF, FSM and SCALP. As shown in FIG. 19, the $CS_{max}$ was 1030 MPa, DOC was 165 micrometers, and the $CT_{max}$ was 55 MPa. The knee region had a DOL of about 37 micrometers and the CS in the knee region is about MPa. As shown by the dashed line, the CS at a depth of 5 micrometers is about 750 MPa or greater.

Example 7

Figure 20:
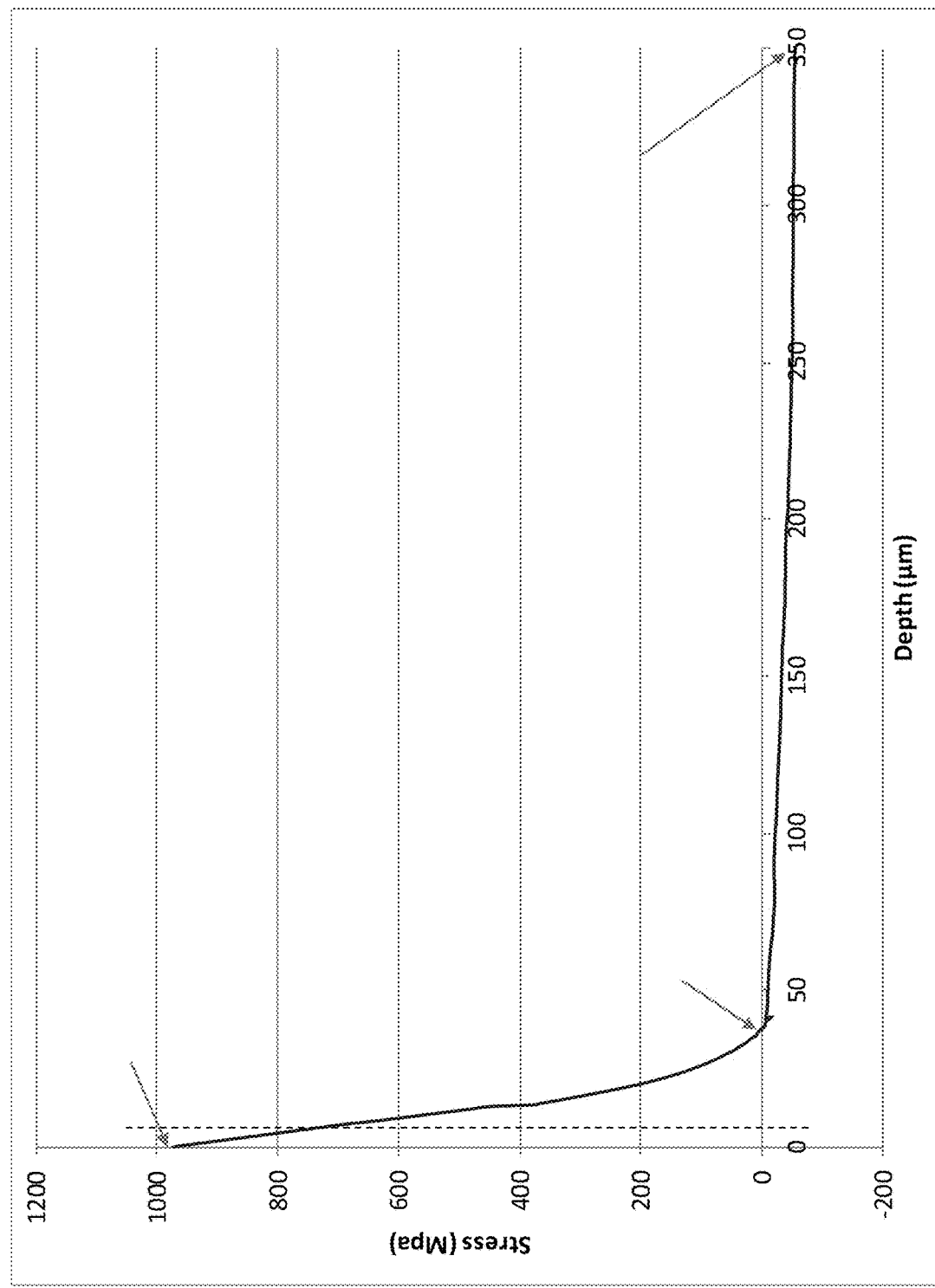
FIG. 20 is a graph showing the stress profile of Example 7.

A glass article having a thickness of 0.7 mm and the same glass composition as Example 2 was chemically strengthened in the same manner as Example 6. The chemically strengthened glass article exhibited a stress profile as shown in FIG. 20 (when flat or in a non-cold-bent configuration), which was calculated after measuring various stress profile attributes using RNF, FSM and SCALP. As shown in FIG. 20, the $CS_{max}$ was 970 MPa, DOC was 39 micrometers, and the $CT_{max}$ was 53 MPa. As shown by the dashed line, the CS at a depth of 5 micrometers is about 750 MPa or greater.

Example 8

Figure 21:
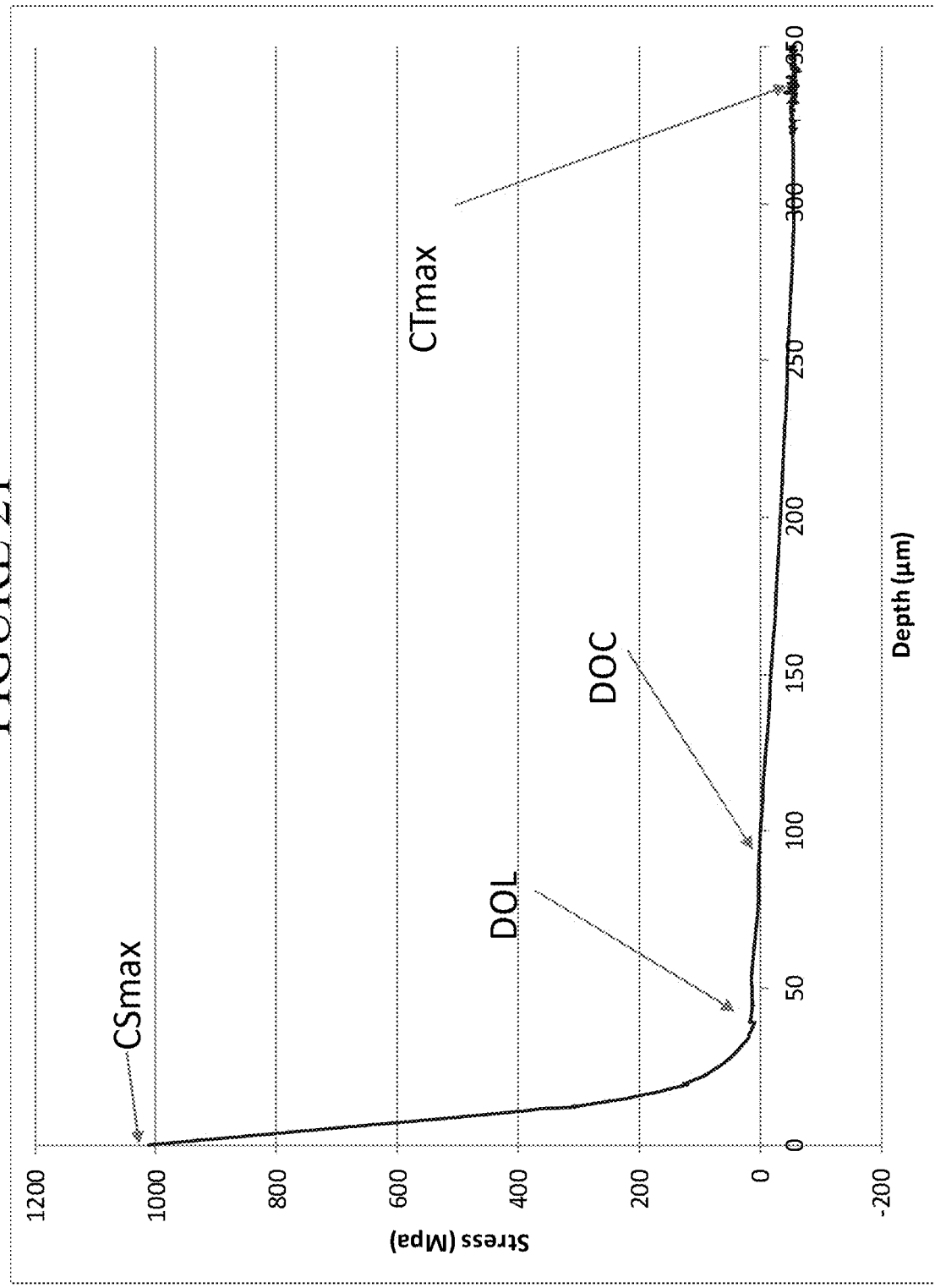
FIG. 21 is a graph showing the stress profile of Example 8.

A glass article having a thickness of 0.7 mm and the same glass composition as Example 2 was chemically strengthened by immersing in a first bath having a composition of 75% KNO3 and 25% $NaNO_3$ and bath temperature of 430° C. for 8 hours, followed by immersing in a second bath having a composition of 100% $KNO_3$ and bath temperature of 390° C. for 2.5 hours. The chemically strengthened glass article exhibited a stress profile as shown in FIG. 21 (when flat or in a non-cold-bent configuration), which was calculated after measuring various stress profile attributes using RNF, FSM and SCALP. As shown in FIG. 21, the $CS_{max}$ was 1011 MPa, DOC was 97 micrometers, and the $CT_{max}$ was 62 MPa. The knee region had a DOL of about 39 micrometers and the CS in the knee region is about 25 MPa. As shown by the dashed line, the CS at a depth of 5 micrometers is about 750 MPa or greater.

Figure 22:
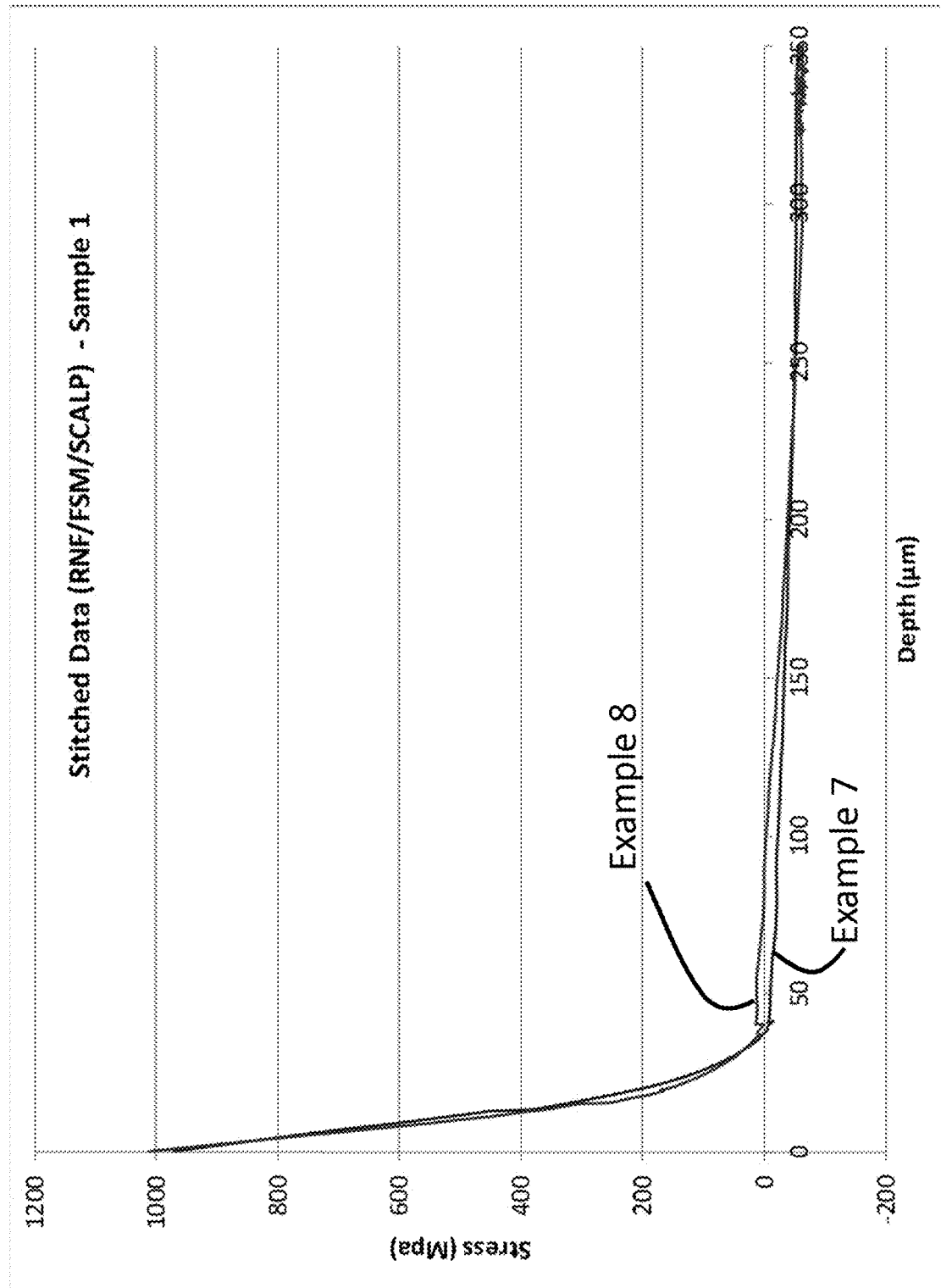
FIG. 22 is the superimposed stress profiles of Example 7 and Example 8.
Figure 23:
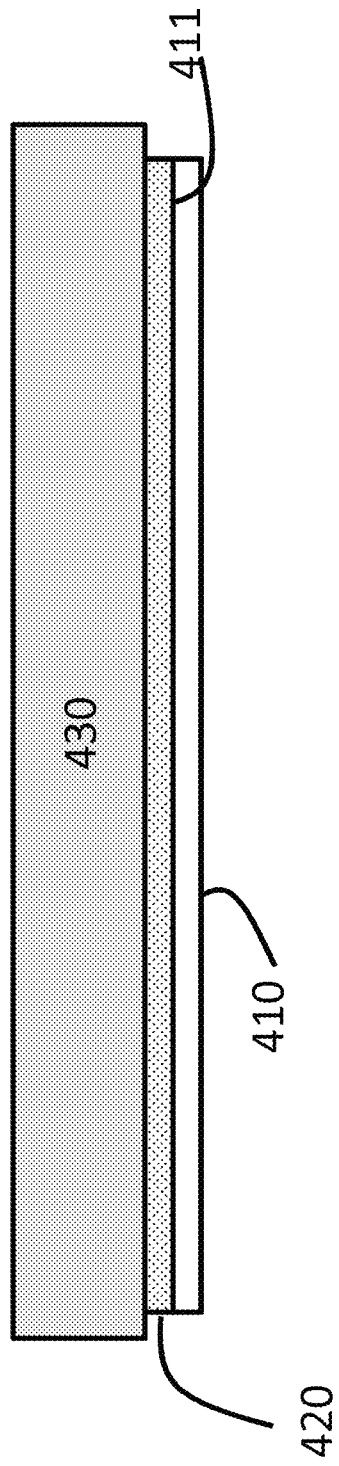
FIG. 23 is a side view illustration of the automotive interior systems of Example 9 and Comparative Examples 10-11.

A comparison of the stress profiles of Example 7 and Example 8 is shown in FIG. 22. As shown in FIG. 22, the modified second immersion shows the stress profile of Example 8 maintains a higher CSmax value and the tail portion of the stress profile is in compression and in tension.

Example 9 and Comparative Examples 10-11

Figure 24A:
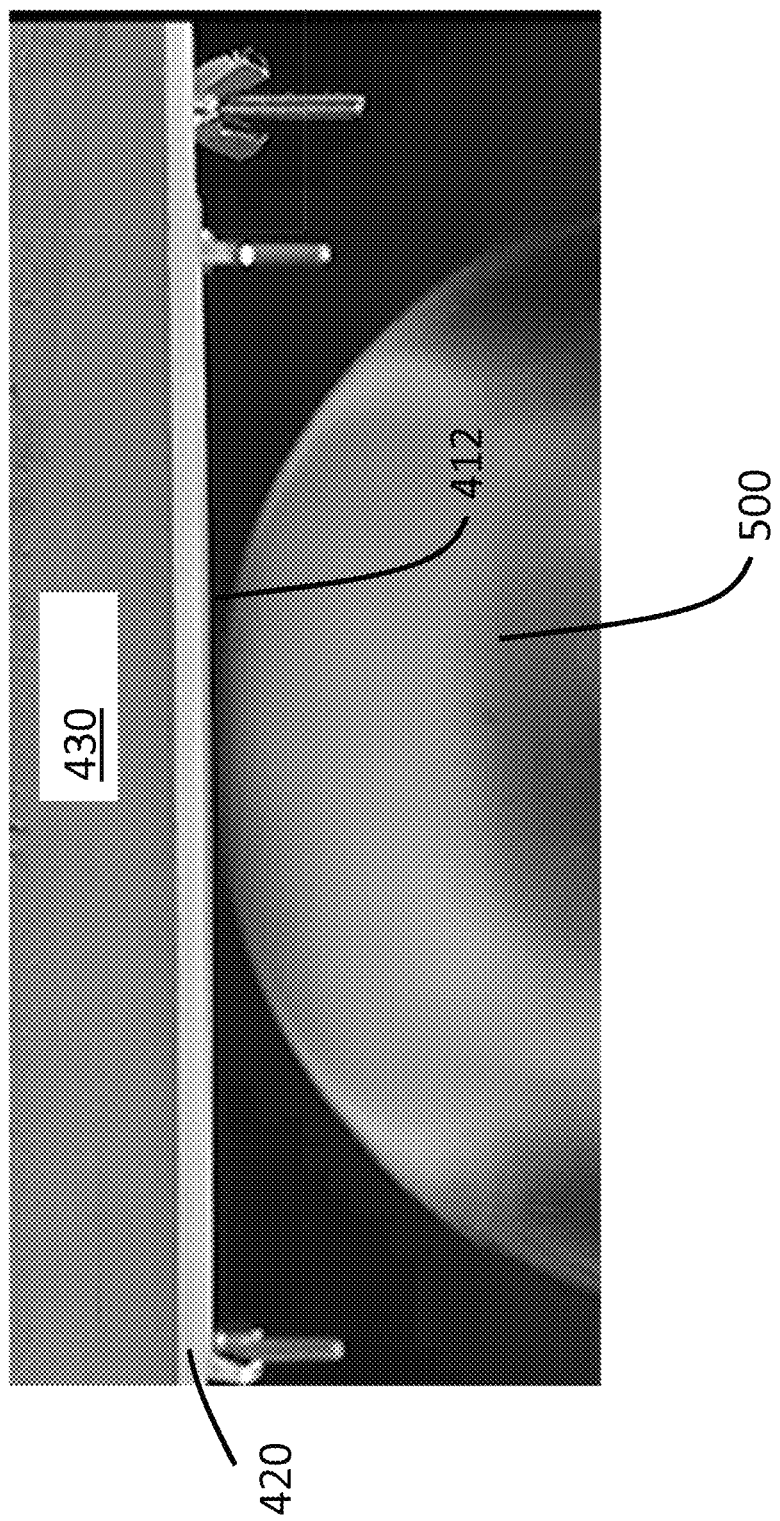
FIGS. 24A, 24B and 24C are images of the automotive interior of Example 9 before impact, during impact and after impact with an aluminum impactor.
Figure 24B:
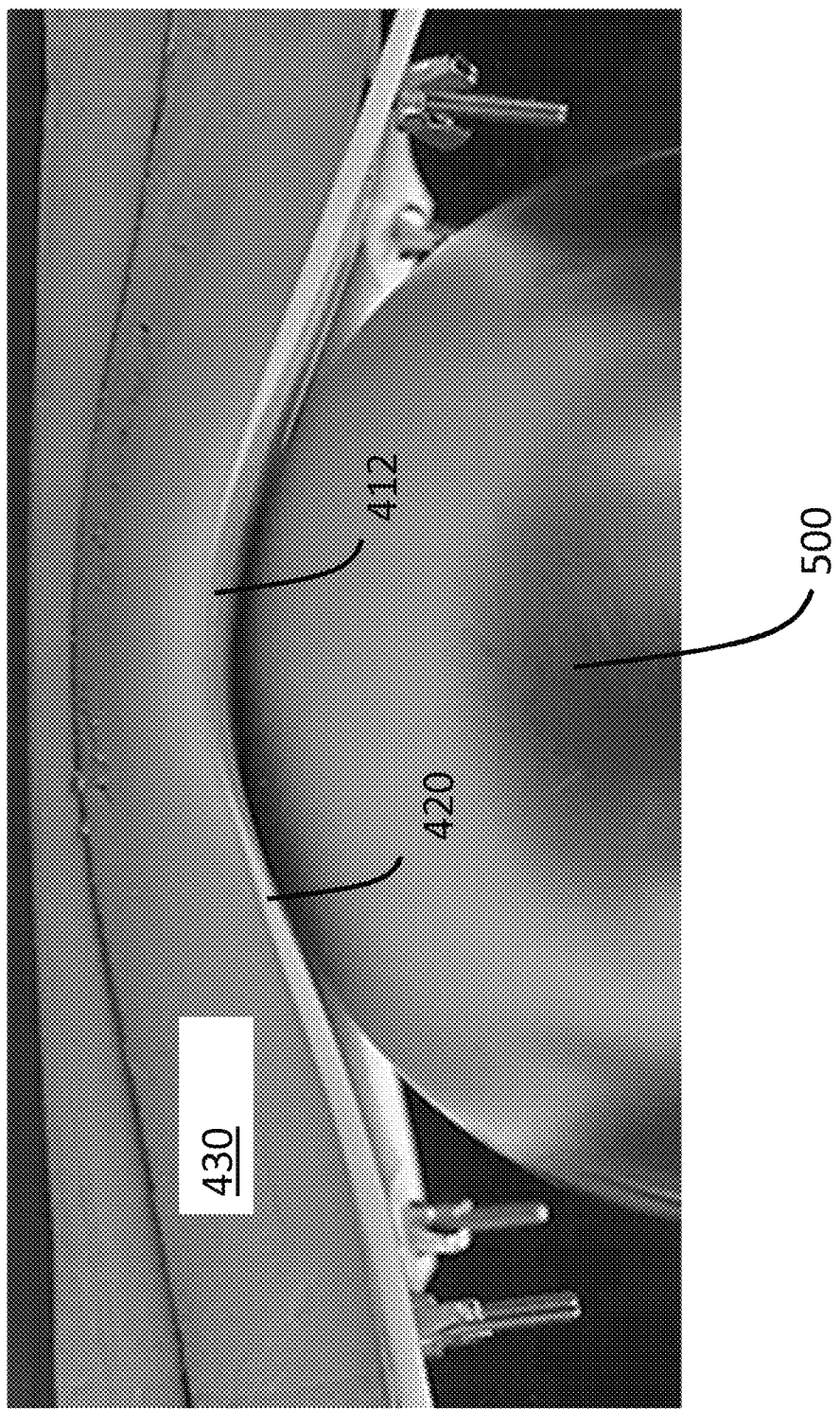
Figure 24C:
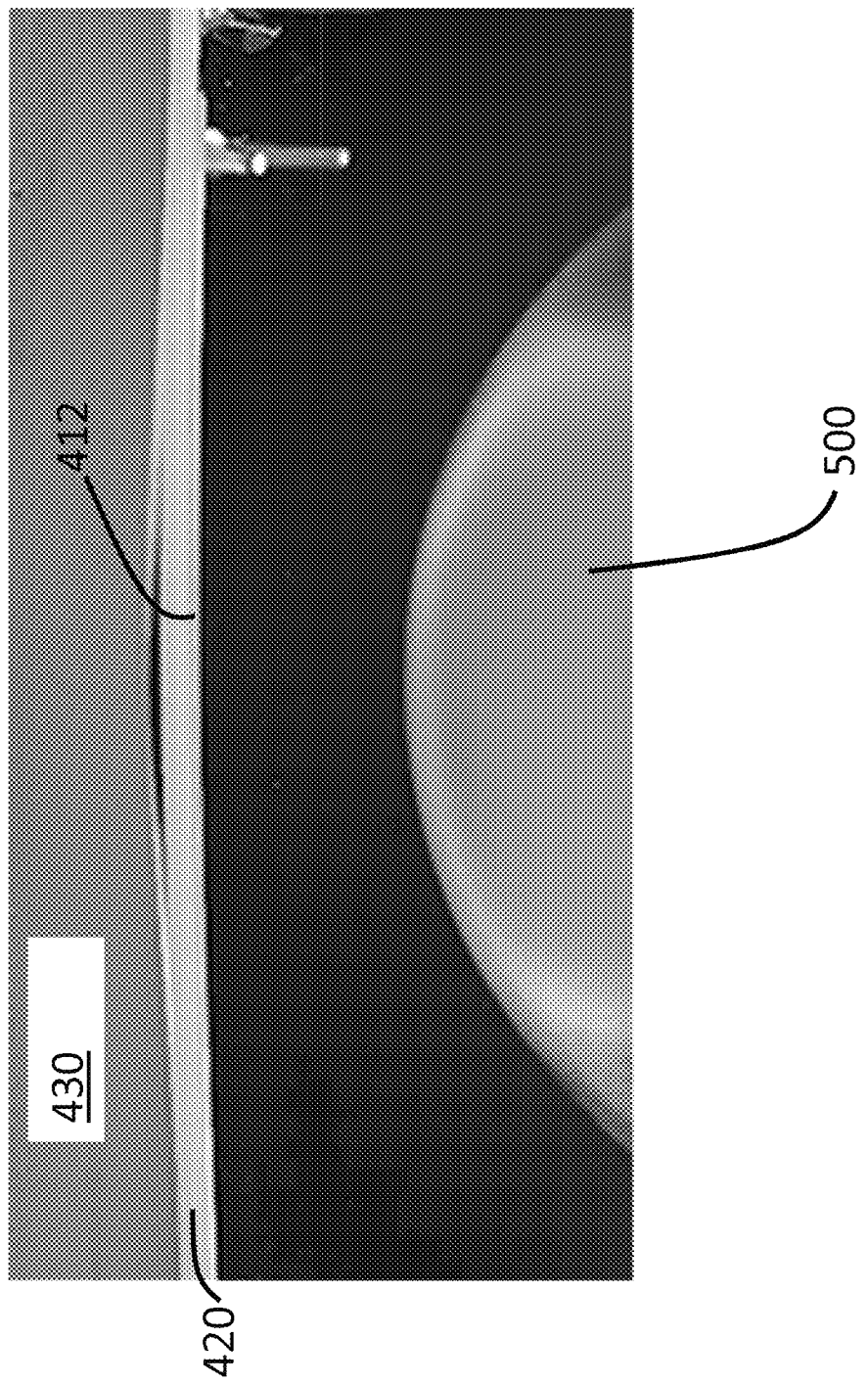

Each of Examples 9 and Comparative Examples 10-11 included an automotive interior system that includes a glass article 410 in which the second major surface 411 is attached to a frame 420 with an intervening adhesive (not shown), and a housing (430) partially surrounding the second major surface and the frame, as shown in FIG. 24. Example 9 included a glass article 412 according to one or more embodiments of this disclosure. Comparative Example 10 included a strengthened soda lime silicate glass article 414 with a known stress profile. Comparative Example 11 included a strengthened aluminosilicate glass article 416 with a known stress profile. The frame and housing were both made of the same metal material.

Each of Examples 9 and Comparative Examples 10-11 was impacted with an aluminum impactor 500 having a mass of 6.8 kg and a diameter of about 165 mm, at a velocity of 6.69 m/s. The energy of impact is 152 Joules.

Figure 25A:
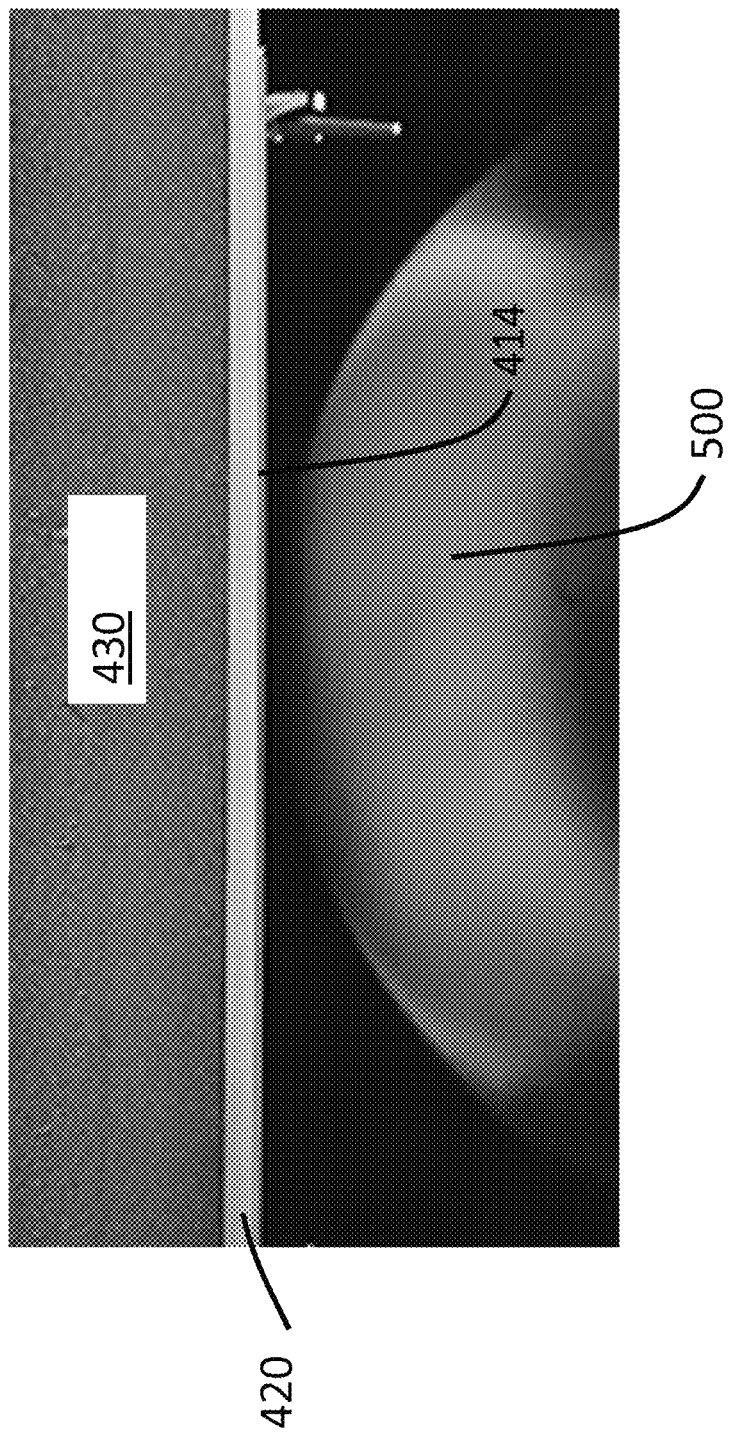
FIGS. 25A, 25B and 25C are images of the automotive interior of Comparative Example 10 before impact, during impact and after impact with an aluminum impactor.
Figure 25B:
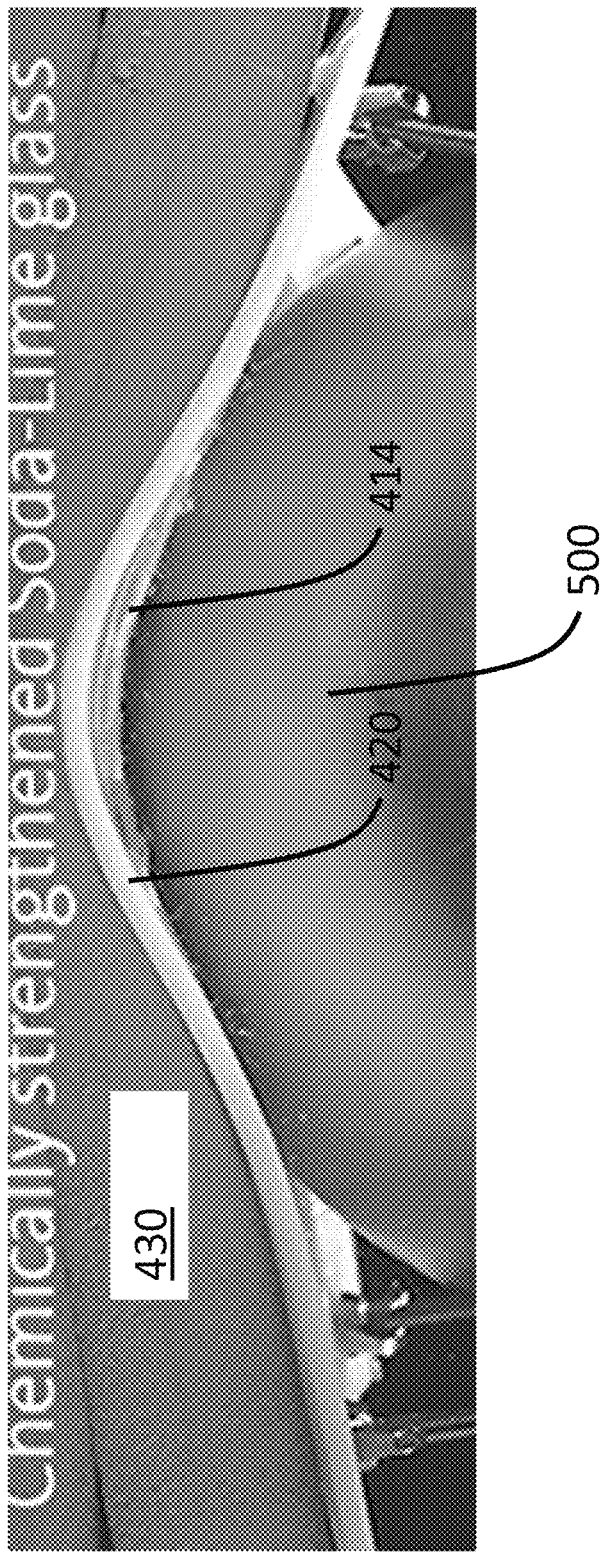
Figure 25C:
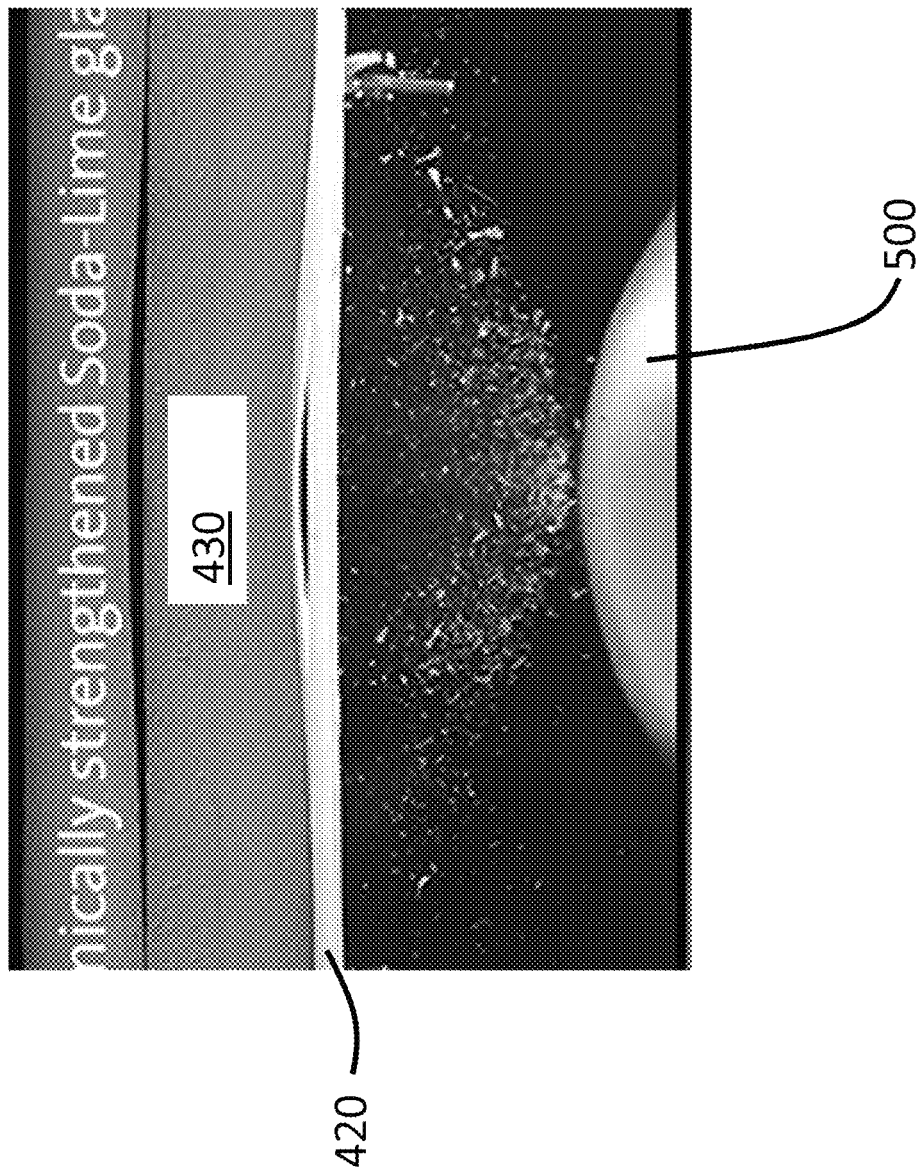

FIG. 25A shows Example 9 before impact. FIG. 25B shows Example 9 during impact. FIG. 25C shows Example 9 after impact. As shown in FIG. 25C, the glass article 412 elastically deforms (and does not break) after impact. The measured displacement of the glass article 412 was 32 mm. In Example 9, the housing plastically deforms, but the glass article does not plastically deform.

Figure 26A:
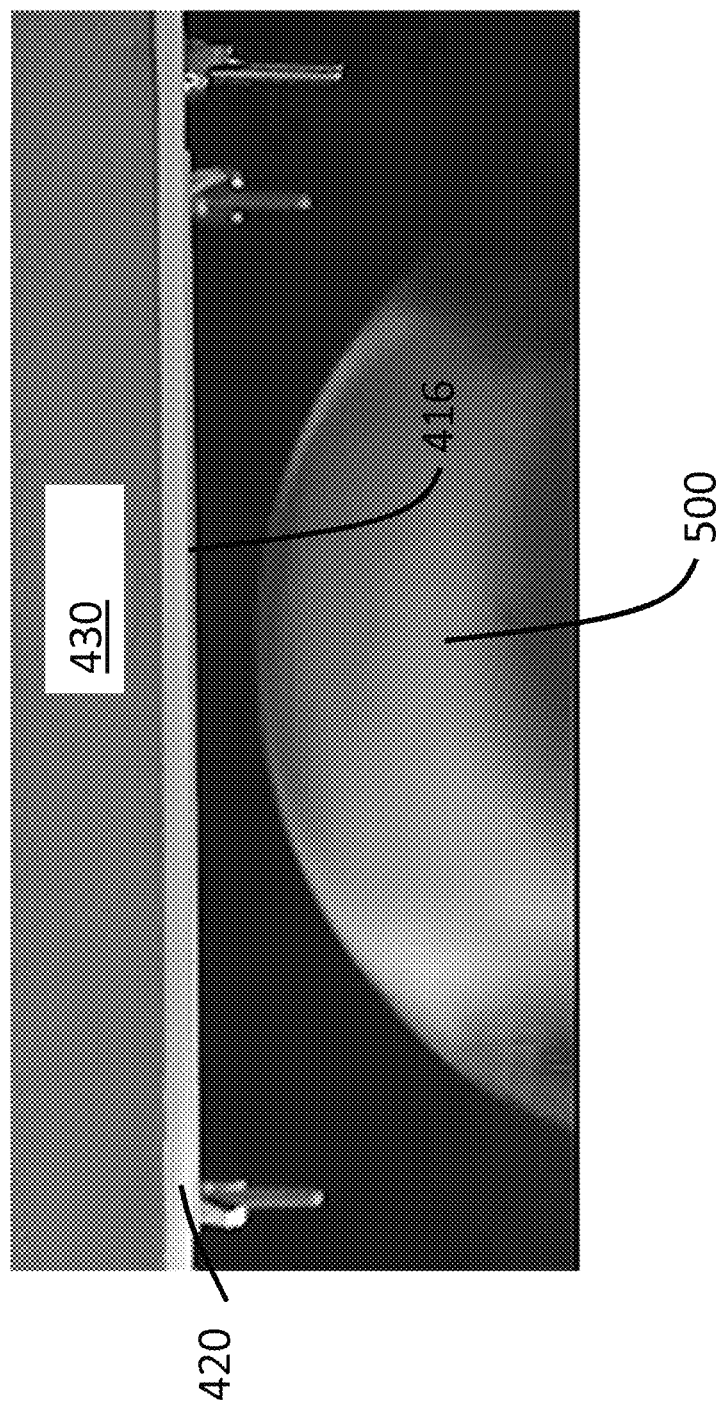
FIGS. 26A, 26B and 26C are images of the automotive interior of Comparative Example 11 before impact, during impact and after impact with an aluminum impactor.
Figure 26B:
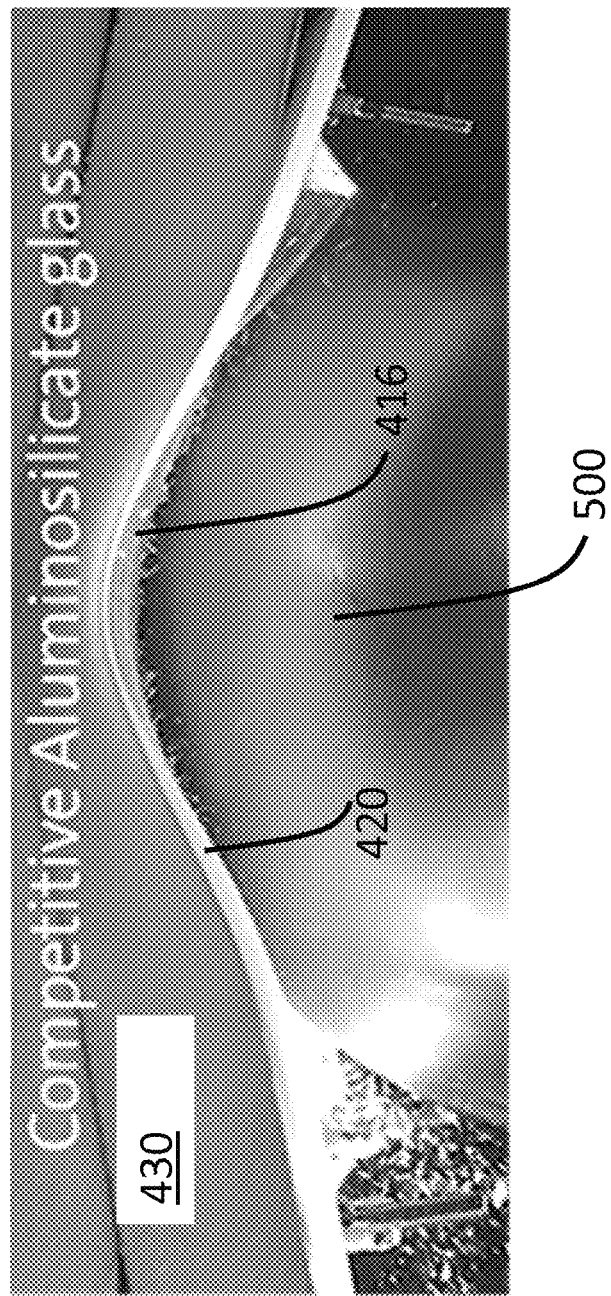
Figure 26C:
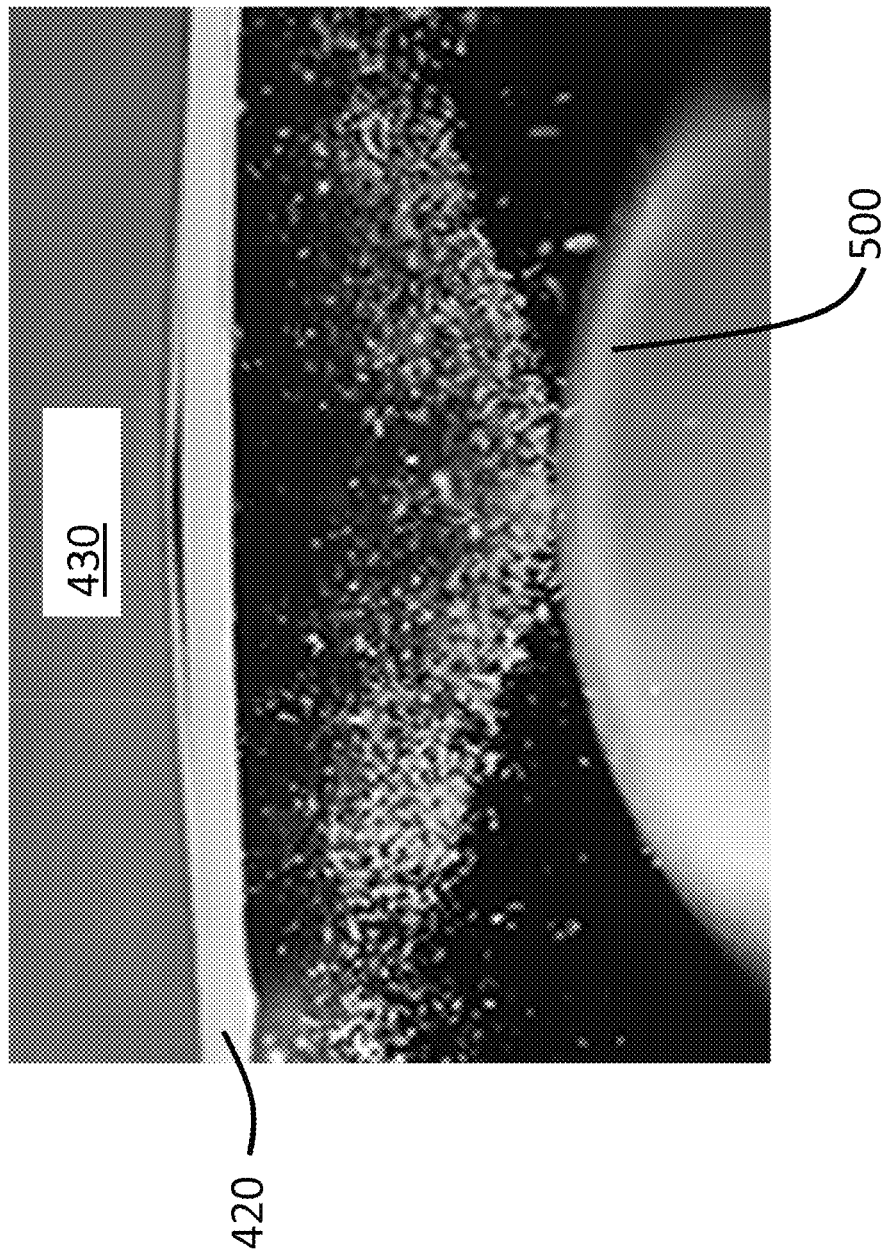

FIG. 26A shows Comparative Example 10 before impact. FIG. 26B shows Comparative Example 10 during impact. FIG. 26C shows Comparative Example 10 after impact. As shown in FIG. 26C, the glass article 414 plastically deforms and breaks after impact. In Comparative Example 10, the housing plastically deforms.

FIG. 27A shows Comparative Example 11 before impact. FIG. 27B shows Comparative Example 11 during impact. FIG. 27C shows Comparative Example 11 after impact. As shown in FIG. 27C, the glass article 416 plastically deforms and breaks after impact. In Comparative Example 11, the housing plastically deforms.

It will be apparent to those skilled in the art that various modifications and variations can be made without departing from the spirit or scope of the invention.

What is claimed is:

1. A glass article comprising:
   a glass substrate comprising:
      a first major surface, a second major surface opposing the first major surface, a minor surface connecting the first major surface and the second major surface defining a thickness (t) (millimeters), wherein the first major surface comprises a concave shape and the second major surface comprises a convex shape, wherein the thickness is from 0.6 mm to 2.0 mm, wherein at least one of the first major surface and the second major surface comprises a first radius of curvature that is from 250 mm to 2500 mm;
   a frame, wherein the frame is curved and has a second radius of curvature that is within 10% of the first radius of curvature; and
   an adhesive disposed between the second major surface and the frame holding the glass substrate in an elastically deformed state, wherein:
   the glass substrate comprises a first stress profile such that stress varies along the thickness between the first major surface and the second major surface,
   the first stress profile comprises:
      a first compressive stress (CS) region extending from the first major surface to a first depth of compression ($DOC_1$), the first CS region comprising a first maximum CS magnitude ($CSmax_1$) of about 900 MPa or greater and a CS magnitude of 750 MPa or greater at a depth of about 5 micrometers;
      a first central tension (CT) region having a maximum CT magnitude ($CT_{curved-max}$) disposed at a depth from of 0.12t or less from the second major surface; and
      a second CS region extending from the second major surface to a second depth of compression ($DOC_2$), the second CS region comprises a second maximum CS magnitude ($CS_{max2}$) that is less than $CS_{max1}$,
   when the glass substrate is removed from the frame, the glass substrate returns to a flat state such that the first stress profile is converted to a second stress profile due to removal of bending stresses in the glass substrate, and
   the second stress profile comprises a second central tension (CT) region having a maximum CT magnitude ($CT_{uncurved-max}$) that is disposed a distance of at least 0.25t from the first major surface.

2. The glass article of claim 1, wherein the $CT_{uncurved-max}$ magnitude is about 80 MPa or less.

3. The glass article of claim 1, wherein all points of the second CT region within 0.1t from the depth of $CT_{max}$ comprise a tangent having a non-zero slope.

4. The glass article of claim 3, wherein the distance is from 0.4t to 0.6t.

5. The glass article of claim 1, wherein at least a portion of the second stress profile comprises a spike region extending from the first major surface, a tail region and a knee region between the spike region and the tail region, wherein all points of the stress profile in the spike region comprise a tangent having a slope in magnitude that is in a range from about 15 MPa/micrometer to about 200 MPa/micrometer and all points in the tail region comprise a tangent having a slope in magnitude that is in a range from about 0.01 MPa/micrometer to about 3 MPa/micrometer.

6. The glass article of claim 5, wherein the CS magnitude in the spike region is in a range from greater than 200 MPa to about 1500 MPa.

7. The glass article of claim 6, wherein the tail region extends from about the knee region to the depth of $CT_{uncurved-max}$, and wherein the tail region comprises one or both of a compressive stress tail region, and a tensile stress tail region.

8. The glass article of claim 1, wherein, along a portion of at least the second CT region, the second stress profile can be approximated as $$\text{Stress}(x) = CT\text{max} - (((CT\text{max} \cdot (n+1))/0.5^n) \cdot |(x/t) - 0.5|^n)$$

where stress (x) is the stress value at position x, x ranges from 0 at one of the first major surface and the second major surface to 5 at the other one of the first major surface and the second major surface, and n ranges from 1.5 to 5 but deviates from 2.

9. The glass article of claim 1, wherein:
$CS_{max1}$ is greater than or equal to 960 MPa and less than or equal to 1500 MPa, and
$CS_{max2}$ is greater than or equal to 800 MPa.

10. The glass article of claim 1, wherein:
$CS_{max1}$ is greater than or equal to 1100 MPa, and
t is greater than or equal 1.1 mm and less than or equal to 2.0 mm.

11. The glass article of claim 1, wherein $CT_{curved-max}/CT_{uncurved-max} \geq 1.4$.

12. A glass article comprising:
a glass substrate comprising:
  a first major surface, a second major surface opposing the first major surface, a minor surface connecting the first major surface and the second major surface defining a thickness (t) (millimeters), wherein the first major surface comprises a concave shape and the second major surface comprises a convex shape, wherein the thickness is from 0.6 mm to 2.0 mm, wherein at least one of the first major surface and the second major surface comprises a first radius of curvature that is from 250 mm to 2500 mm;
a frame, wherein the frame is curved and has a second radius of curvature that is within 10% of the first radius of curvature; and
an adhesive disposed between the second major surface and the frame holding the glass substrate in an elastically deformed state, wherein:
  the glass substrate comprises a first stress profile such that stress varies along the thickness between the first major surface and the second major surface,
  the first stress profile comprises:
    a first compressive stress (CS) region extending from the first major surface to a first depth of compression ($DOC_1$) that is from 0.04t to 0.2t, the first CS region comprising a first maximum CS magnitude ($CS_{max1}$) of about 1000 MPa or greater;
    a first central tension (CT) region having a maximum CT magnitude ($CT_{curved-max}$) disposed at a depth from of 0.12t or less from the second major surface; and
    a second CS region extending from the second major surface to a second depth of compression ($DOC_2$) that is less than $DOC_1$, the second CD region comprises a second maximum CS magnitude ($CS_{max2}$) that is less than $CS_{max1}$,
  within a portion of the first CT region, the first stress profile comprises a non-constant negative slope with increasing distance from the second major surface,
  when the glass substrate is removed from the frame, the glass substrate returns to a flat state such that the first stress profile is converted to a second stress profile due to removal of bending stresses in the glass substrate, and
  the second stress profile comprises a second central tension (CT) region having a maximum CT magnitude ($CT_{uncurved-max}$) that is disposed a distance of at least 0.25t from the first major surface.

13. The glass article of claim 12, wherein the $CT_{uncurved-max}$ magnitude is about 80 MPa or less.

14. The glass article of claim 12, wherein all points of the second CT region within 0.1t from the depth of $CT_{max}$ comprise a tangent having a non-zero slope.

15. The glass article of claim 14, wherein the distance is from 0.4t to 6.0t.

16. The glass article of claim 12, wherein at least a portion of the second stress profile comprises a spike region extending from the first major surface, a tail region and a knee region between the spike region and the tail region, wherein all points of the stress profile in the spike region comprise a tangent having a slope in magnitude that is in a range from about 15 MPa/micrometer to about 200 MPa/micrometer and all points in the tail region comprise a tangent having a slope in magnitude that is in a range from about 0.01 MPa/micrometer to about 3 MPa/micrometer.

17. The glass article of claim 16, wherein the tail region extends from about the knee region to the depth of $CT_{uncurved-max}$, and wherein the tail region comprises one or both of a compressive stress tail region, and a tensile stress tail region.

18. The glass article of claim 12, wherein:
$CS_{max1}$ is greater than or equal to 1100 MPa and less than or equal to 1500 MPa, and
$CS_{max2}$ is greater than or equal to 800 MPa.

19. The glass article of claim 12, wherein:
$CS_{max1}$ is greater than or equal to 1100 MPa, and
t is greater than or equal 1.1 mm and less than or equal to 2.0 mm.

20. The glass article of claim 12, wherein $CT_{curved-max}/CT_{uncurved-max} \geq 1.4$.

* * * * *

UNITED STATES PATENT AND TRADEMARK OFFICE
CERTIFICATE OF CORRECTION

| | | |
|---|---|---|
| PATENT NO. | : 12,139,435 B2 | Page 1 of 1 |
| APPLICATION NO. | : 18/232588 | |
| DATED | : November 12, 2024 | |
| INVENTOR(S) | : Matthew Lee Black et al. | |

It is certified that error appears in the above-identified patent and that said Letters Patent is hereby corrected as shown below:

In the Claims

Claim 15, Column 38, Line 33, delete "0.4t to 6.0t" insert -- 0.4t to 0.6t --

Signed and Sealed this
Thirteenth Day of January, 2026

John A. Squires
*Director of the United States Patent and Trademark Office*